(12) United States Patent
Fein et al.

(10) Patent No.: US 7,498,684 B2
(45) Date of Patent: Mar. 3, 2009

(54) SYSTEM AND METHOD FOR CREATING A PORTABLE NETWORKED VEHICLE INFRASTRUCTURE DISTRIBUTION PLATFORM OF SMALL WIND GATHERING DEVICES

(75) Inventors: Gene S. Fein, Lenox, MA (US);
Edward Merritt, Lenox, MA (US)

(73) Assignee: Genedics LLC, Lenox, MA (US)

( * ) Notice: Subject to any disclaimer, the term of this patent is extended or adjusted under 35 U.S.C. 154(b) by 224 days.

(21) Appl. No.: 11/674,352

(22) Filed: Feb. 13, 2007

(65) Prior Publication Data

US 2008/0150284 A1 Jun. 26, 2008

Related U.S. Application Data

(63) Continuation-in-part of application No. 11/645,109, filed on Dec. 22, 2006.

(51) Int. Cl.
*B60K 1/00* (2006.01)
*F03D 9/00* (2006.01)

(52) U.S. Cl. .......................... 290/44; 290/55; 180/65.3

(58) Field of Classification Search .............. 290/1 R, 290/1 A, 43, 44, 54, 55; 180/2.2, 65.3
See application file for complete search history.

(56) References Cited

U.S. PATENT DOCUMENTS

| | | | |
|---|---|---|---|
| 3,971,454 A | 7/1976 | Waterbury |
| 4,117,900 A | 10/1978 | Amick |
| 4,119,863 A | 10/1978 | Kelly |
| 4,314,160 A | 2/1982 | Boodman et al. |
| 4,315,402 A | 2/1982 | Sadhukhan |

(Continued)

FOREIGN PATENT DOCUMENTS

WO    WO 2006/121414 A    11/2006

(Continued)

OTHER PUBLICATIONS

Holmes, Andrew S., et al., "Axial-Flux Permanent Magnet Machines for Micropower Generation," Journal of Microelectrical Systems, vol. 14, No. 1, Feb. 2005.

(Continued)

*Primary Examiner*—Nicholas Ponomarenko
(74) *Attorney, Agent, or Firm*—Hamilton Brook Smith & Reynolds, PC

(57) ABSTRACT

Creating a large fleet of vehicles to gather wind energy and generate wind generated energy, such as electricity, is impeded by the cost to an individual vehicle owner. Accordingly, a portable system and corresponding method to gather wind energy and deposit stored wind generated energy for system credit is provided. The present invention includes a wind energy gathering device, an energy storage system, means for depositing stored wind generated energy for system credit, and a configuration of any one or combination of the aforementioned, the configuration adapted to at least be movable from a first vehicle to a second vehicle. As such, there is an incentive for individual vehicle owners to participate in gathering wind energy and depositing wind generated energy. By taking advantage of potentially millions of participants and participating vehicles, the present invention creates a format for generating energy from multiple forms of wind energy on a wide-scale.

31 Claims, 36 Drawing Sheets

U.S. PATENT DOCUMENTS

| | | | |
|---|---|---|---|
| RE31,156 E | 2/1983 | Dessert | |
| 4,592,136 A * | 6/1986 | Hirsch | 29/812.5 |
| 4,883,823 A | 11/1989 | Perry et al. | |
| 5,075,564 A | 12/1991 | Hickey | |
| 5,254,876 A | 10/1993 | Hickey | |
| 5,272,378 A | 12/1993 | Wither | |
| 5,296,746 A * | 3/1994 | Burkhardt | 290/55 |
| 5,606,233 A | 2/1997 | Davis | |
| 5,920,127 A * | 7/1999 | Damron et al. | 290/44 |
| 6,391,205 B1 | 5/2002 | McGinnis | |
| 6,409,467 B1 | 6/2002 | Gutterman | |
| 6,624,530 B1 * | 9/2003 | Toulon | 290/55 |
| 6,809,432 B1 | 10/2004 | Bilgen | |
| 6,882,059 B1 * | 4/2005 | DePaoli | 290/44 |
| 6,897,575 B1 * | 5/2005 | Yu | 290/44 |
| 6,959,993 B2 | 11/2005 | Gross et al. | |
| 6,981,377 B2 | 1/2006 | Vaynberg et al. | |
| 7,098,553 B2 | 8/2006 | Wiegel et al. | |
| 7,127,328 B2 | 10/2006 | Ransom | |
| 7,192,146 B2 | 3/2007 | Gross et al. | |
| 7,193,332 B2 | 3/2007 | Spinelli | |
| 7,226,536 B2 | 6/2007 | Adams | |
| 7,226,542 B2 | 6/2007 | Zemel et al. | |
| 7,339,286 B1 * | 3/2008 | Chen et al. | 290/55 |
| 7,434,636 B2 * | 10/2008 | Sutherland | 180/2.2 |
| 7,453,164 B2 * | 11/2008 | Borden et al. | 290/42 |
| 2004/0113291 A1 | 6/2004 | Klausner et al. | |
| 2004/0159536 A1 | 8/2004 | Kamen et al. | |
| 2005/0230238 A1 | 10/2005 | Klausner et al. | |
| 2006/0113118 A1 | 6/2006 | Kim | |
| 2006/0137348 A1 | 6/2006 | Pas | |
| 2007/0138797 A1 | 6/2007 | Reidy et al. | |
| 2007/0284885 A1 * | 12/2007 | Menges | 290/55 |
| 2008/0054638 A1 * | 3/2008 | Greene et al. | 290/1 R |
| 2008/0148549 A1 | 6/2008 | Fein et al. | |
| 2008/0148732 A1 | 6/2008 | Fein et al. | |
| 2008/0148733 A1 | 6/2008 | Fein et al. | |
| 2008/0149302 A1 | 6/2008 | Fein et al. | |
| 2008/0149403 A1 | 6/2008 | Fein et al. | |
| 2008/0149573 A1 | 6/2008 | Fein et al. | |
| 2008/0150286 A1 | 6/2008 | Fein et al. | |
| 2008/0150288 A1 | 6/2008 | Fein et al. | |
| 2008/0150289 A1 | 6/2008 | Fein et al. | |
| 2008/0150291 A1 | 6/2008 | Fein et al. | |
| 2008/0150295 A1 | 6/2008 | Fein et al. | |
| 2008/0150296 A1 | 6/2008 | Fein et al. | |
| 2008/0150298 A1 | 6/2008 | Fein et al. | |
| 2008/0152492 A1 | 6/2008 | Fein et al. | |
| 2008/0154800 A1 | 6/2008 | Fein et al. | |
| 2008/0154801 A1 | 6/2008 | Fein et al. | |
| 2008/0163919 A1 | 7/2008 | Fein et al. | |
| 2008/0196758 A1 * | 8/2008 | McGuire | 136/245 |

FOREIGN PATENT DOCUMENTS

| | | |
|---|---|---|
| WO | WO 2006/138516 A | 12/2006 |
| WO | WO 2008/079369 | 7/2008 |
| WO | WO 2008/115479 A2 | 9/2008 |
| WO | WO 2008/118321 A2 | 10/2008 |
| WO | WO 2008/136901 A2 | 11/2008 |

OTHER PUBLICATIONS

Zhong Lin Wang and Jinhui Song, "Piezoelectirc Nanogenerators Based on Zinc Oxide Nanowire Arrays," Science, vol. 312, Apr. 14, 2006.

www.metropolismag.com, 6 pages, retrieved from Internet Apr. 19, 2007.

www.greencarcongress.com, 4 pages, retrieved from Internet Apr. 19, 2007.

www.panasonic.co.jp, 8 pages, retrieved from Internet Jan. 26, 2007.

Bourouni, K., et al., Experimentation and Modelling of an Innovative Geothermal Desalination Unit, *Desalination 125*, pp. 147-153 (Nov. 9-12, 1999).

Tzen, E., et al., "Renewable Energy Sources for Desaliniation," *Solar Energy 75*(5), pp. 375-379 (Nov. 1, 2003).

Garcia-Rodriguez, L., "Seawater Desalination Driven by Renewable Energies: A Review," *Desalination 143*(2), pp. 103-113 (May 20, 2002).

Kalogirou, S.A., "Seawater Desalination Using Renewable Energy Sources," *Progress in Energy and Combustion Science 31*(3), pp. 242-281 (Jan. 1, 2005).

Belessiotis, V., et al., "The History of Renewable Energies for Water Desalination," *Desalination 128*, pp. 147-159 (2000).

Awerbuch, L., et al., "Geothermal Energy Recovery Process," *Desalination 19*, pp. 325-336 (1976).

International Search Report for PCT/us2008/006034, date of mailing Oct. 24, 2008.

International Search Report for PCT/US2008/003603, date of mailing Oct. 31, 2008.

* cited by examiner

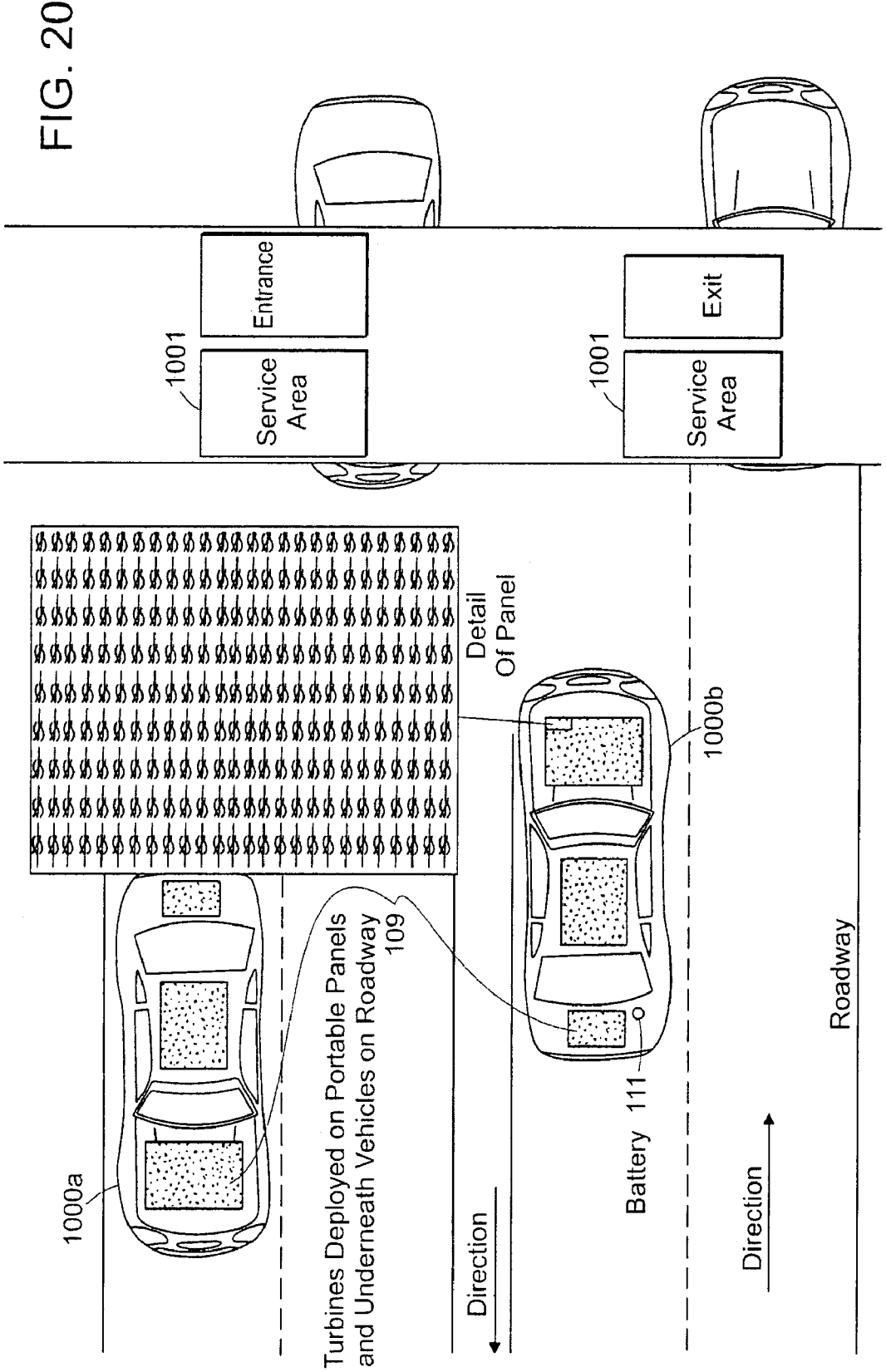

SYSTEM AND METHOD FOR CREATING A PORTABLE NETWORKED VEHICLE INFRASTRUCTURE DISTRIBUTION PLATFORM OF SMALL WIND GATHERING DEVICES

RELATED APPLICATION

This application is a Continuation-in-Part of U.S. application Ser. No. 11/645,109 entitled "SYSTEM AND METHOD FOR CREATING A NETWORKED INFRASTRUCTURE DISTRIBUTION PLATFORM OF FIXED AND MOBILE SOLAR AND WIND GATHERING DEVICES" filed on Dec. 22, 2006. The entire teachings of the above application are incorporated herein by reference.

BACKGROUND OF THE INVENTION

It is well known that solar power is derived by photovoltaic systems, solar panels made from silicon and other materials and thin film solar deployments. Solar power installations where one or more of these solar power gathering unit devices are tied together are referred to as 'arrays'; are a method of generating clean energy that is used throughout the globe. Solar power generation, as mentioned previously, can come from thin film solar applications, panelized silicon crystal applications and also from passive solar design schemes and many other sources. The cost of solar power gathering systems has gone down in recent years while the efficiency of such systems has continued to improve. It is also well known that wind power turbines can generate power that can be delivered via interconnection to existing grid systems or can be used to power individual homes, businesses and utilities. Most, if not all wind power systems that are used to gather large amounts, in the MegaWatt range of power are large structure wind turbines many of which are at least 100 feet high. In the past, small wind powered turbines have also been placed high up from the ground usually at least 15 feet high. Also, most small wind power turbine systems are utilized to power a single home, business or elements of that home or business Currently, solar power creates under 10% of the energy market share in the United States. Isolated uses of solar power are effective, but there incremental installation does not create a convenient solar infrastructure. For wind power systems large wind installations in order of 100 foot or more sized turbines dot the landscape of the planet. These turbines are often positioned in remote fields out to sea or on private property away from public infrastructure. Small wind installations of turbines and other gathering devices in the 5 to 30 foot range are typically utilized in three deployments. The first deployment features clusters of small to mid sized turbines set up in remote windy areas such as the desert environment near Palm Desert in California. The second deployment features isolated powering of small homes and businesses such as those in remote arctic or extreme cold climates where heating and cooling infrastructure does not exist, or is augmented at the micro use level for one home or business by small wind turbine implementation. The third deployment model features isolated powering of entities for government utilities such as isolated powering of single light stands at the Hanauma Bay National Park public parking lot in Oahu Hi. As of now, there are no known models for gathering wind power that may be reclaimed from moving vehicles. Projects for the reclamation of carbon and heat from water pipes and the like are under way commercially.

Conventional models have solar power being used to power individual homes and businesses via installations on those homes and businesses. Solar power plants are becoming more popular and new isolated site power plants are being developed in places like Korea where GE is supplying panels for a new 3 megawatt facility project in Yong Gwang. Isolated solar panels are also in use on roadways to light signs, lights and power emergency telephones and telephone boxes. Conventional models for vehicles have vehicles outfitted with solar panels being used to power those same vehicles exclusively. Conventional wind models address power plant and isolated use models for the generation and distribution of wind power. Large turbines generate Megawatt volumes of power to be utilized locally or interconnected back to the grid system. Small wind generation systems are typically used to solve local power issues, such as street lights or home or business power needs as well as having the ability to be interconnected to a grid system for the purpose of selling the power generated by the wind gathering system to a public or private utility. Small solar and small wind deployments could be currently utilized on vehicles on a case by case basis based upon the vehicle owner purchasing and installing the available equipment installed on an isolated vehicle by vehicle basis.

Unfortunately, the lack of cohesive solar and wind gathering and distribution resources have limited solar and wind power to a single digit market shares of the overall energy use in the United States. The ideas of powering individual homes and businesses, while very effective, constitute incremental gains in the distribution and use of solar power. The same can be said for privately funded solar power plants because many of them must be built in remote, sunny, desert like locations far from easy access to the grid or direct power access to homes or businesses. Solar vehicles have been focused in a single priority to make vehicles run from the solar power that they are gathering, either solely, or via the use of a hybrid power system that combines other energy sources to power the vehicle. Wind powered existing conventional uses have certain limitations in distribution and deployment. Large turbines have faced environmental and Defense Department concerns. Environmentalists fear that the noise and size of turbines will disrupt both scenic and habitat conditions, in addition to threatening the well being of birds that may be caught in the large turbine blades. Department of Defense concerns have been raised over the large turbines interfering with radar signals and tracking. Large turbine systems that are placed far away from existing infrastructure also incur a large expense in the transportation or building of infrastructure to carry the power generated by the turbine system. Finally, the large turbine system represents a large investment for a single turbine that is a volatile investment in that if the wind is not present or wind currents change then the turbine would be viewed as a poor investment because it will not generate enough power. Also, if the turbine breaks for any reason it is going to produce zero power as it is a large and single entity. Large turbines also require labor intensive maintenance and monitoring. The life cycle for large wind turbines is 20 years and decommissioning and waste generated by manufacture, installation and decommissioning is another environmental issue to contend with. Small wind power utilized in isolated areas and for private homes, businesses and individual is a great way to introduce clean energy on a unit by unit grass roots level. The issue with isolated uses which the instant invention addresses is that isolated uses are isolated by definition. Isolated uses do not carry out the ability to directly power businesses or residential sites over a long stretch of land covering tens, hundreds, thousands or hundreds of thousands of miles providing easy access to direct powering of entities as well as multiple grid interconnection points. Current models also require each individual vehicle owner to make an individual investment in wind power or solar power gathering devices in order to be able to install and generate power from such devices. This is a major impediment toward being able to create a large fleet of vehicles gathering energy from small wind and solar gathering mechanisms or devices. Another impediment is that the power generated from such systems requires a second device or hardware system in order to utilize, receive credit for energy gathered and economically benefit from the power that is derived by the wind and/or solar gathering system.

SUMMARY OF THE INVENTION

The present invention provides a solution to the problems of the prior art.

One embodiment of the present invention is a portable wind energy gathering system to gather wind energy and deposit wind generated energy for system credit. The portable system including: i) a wind energy gathering device to gather wind energy and generate wind generated energy, ii) an energy storage system, electrically coupled to the wind energy gathering device, to store wind generated energy, iii) means for depositing the stored wind generated energy for system credit, and iv) a configuration of any one or combination of the wind energy gathering device, the energy storage system, and the means for depositing the stored wind generated energy for system credit, the configuration adapted to at least be movable from a first location to a second location (e.g., from a first vehicle to a second vehicle).

Another embodiment of the present invention is a method for gathering wind energy and depositing wind generated energy for system credit. The method includes: i) gathering wind energy and generating wind generated energy using a wind energy gathering device, ii) storing the generated wind generated energy in a energy storage system, and iii) depositing the stored wind generated energy for system credit. Additionally, the method includes configuring any one or combination of the wind energy gathering device, the energy storage system, and means for depositing the stored wind generated energy for system credit into a configuration, the configuration adapted to at least be movable from a first location to a second location (e.g., from a first vehicle to a second vehicle).

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views.

FIG. 20 is a plan view of vehicles deployed with small helix wind turbine vehicle installation sheets or placards in accordance with an embodiment of the present invention.

DETAILED DESCRIPTION OF THE INVENTION

Figure 1:
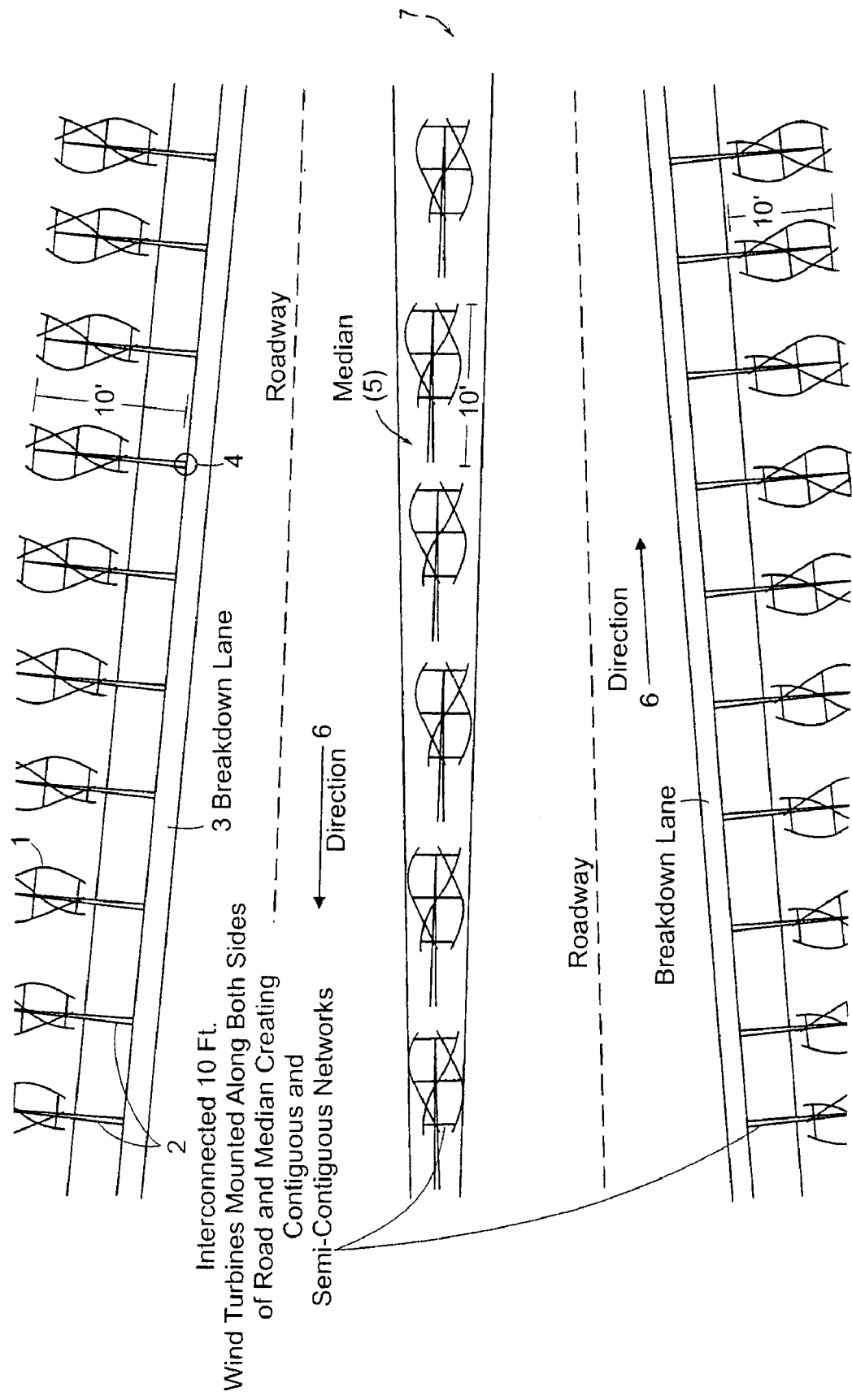
FIG. 1 illustrates the implementation of the small, fixed wind turbine arrays along the roadway.

The present invention provides a roadway system that can provide the basis for a national or global clean or renewable energy infrastructure.

A "road" (hereinafter also "roadway") as used herein, is an identifiable route or path between two or more places on which vehicles can drive. A road is typically smoothed, paved, or otherwise prepared to allow easy travel by the vehicles. Also, typically, a road may include one or more lanes, one or more breakdown lanes, one or more medians or center dividers, and one or more guardrails. For example, a road may be highway, turnpike, pike, toll road, state highway, freeway, clearway, expressway, parkway, causeway, throughway, interstate, speedway, autobahn, superhighway, street, railroad, train track, car race tack airplane runway and the like.

A "vehicle" as used herein, is any device that is used at least partly for ground-based transportation, for example, of goods and/or humans. For example, a vehicle may be an automobile, a car, a bus, a truck, a tractor, a tank, a motorcycle, a train, an airplane or the like.

A "vehicle owner," as used herein refers generally to a person or entity participating in embodiments of the present invention. Accordingly, the phrase vehicle owner is used interchangeably throughout the specification with the term "participant." It should be understood, a person or entity need not own a vehicle (i.e., have property rights to the vehicle) to participate in the embodiments of the present invention. Rather, embodiments of the present invention also encompass instances where a person or entity participates without owning a vehicle. Consider for example a rental car which is owned by a car rental provider (e.g., AVIS and HERTZ). The car rental provider rents a car to a rentee. The rentee in turns participates in embodiments of the present invention despite not owning the rental car.

Preferably, a vehicle can be an automobile, a car, a bus, a truck, a tank, and a motorcycle. More preferably, a vehicle can be an automobile, a car, a bus, and a truck. Most preferably, a vehicle can be an automobile and a car.

"Wind" as used herein refers to both, wind created by the movement of vehicles (hereinafter also "dirty wind") and atmospheric wind.

A "wind energy generating device" as used herein, is a device that converts wind energy into electrical energy. Typically, a wind energy generating device can include one or more "wind turbine generators." A "wind turbine generator" (hereinafter also "wind turbine") as referred to herein, is a device that includes a turbine and a generator, wherein the turbine gathers or captures wind by conversion of some of the wind energy into rotational energy of the turbine, and the generator generates electrical energy from the rotational energy of the turbine. These wind turbine generators can employ a turbine rotating around an axis oriented in any direction. For example, in a "horizontal axis turbine," the turbine rotates around a horizontal axis, which is oriented, typically, more or less parallel to the ground. Furthermore, in a "vertical axis turbine," the turbine rotates around a vertical axis, which is oriented, typically, more or less perpendicular to the ground. For example, a vertical axis turbine can be a Darrieus wind turbine, a Giromill-type Darrieus wind turbine, a Savonius wind turbine, a "helix-style turbine" and the like. In a "helix style turbine," the turbine is helically shaped and rotates around a vertical axis. A Helix-style turbine can have a single-helix design or multi-helix design, for example, double-helix, triple-helix or quad-helix design. The "height" of a wind energy generating device or wind turbine generator as used herein, is the height measured perpendicularly from the ground adjacent to the device or generator to the highest point of the device or generator. Wind energy generating devices can have a height between about a few micrometers and several hundred feet. Wind energy generating devices that employ a plurality, for example, up to millions of small wind turbine generators in one device unit are also referred to herein as "wind turbine installation sheets", "wind turbine installation placards." Wind energy generation devices can be spatially positioned in any pattern or distribution that conforms to safety and other regulations. Generally the distribution can be optimized in view of the given road and road environment. For example, they can be positioned in a linear equidistant distribution, a linear non-equidistant distribution and a stratum configuration. Wind energy generating devices can optionally include solar energy generating devices as described below.

A "stratum configuration" as used herein, is a distribution of wind energy generation devices, in which wind energy generation devices that are further away from the nearest lane of a road, are higher. For example, a stratum configuration of wind energy generation devices results from positioning the smallest wind energy generation devices nearest to a road and successively larger wind energy generation devices successively further from the road.

Typically, the average distance between any two closest ground-based wind energy generating devices is in the range between about 5 micrometer and about 200 meters.

Wind energy generating devices can be "vehicle-based," that is, they are affixed to any part of the surface of a vehicle that allows normal and safe operation of the vehicle. Vehicle-based wind energy generating devices can be permanently affixed or mounted to the car, for example, during the vehicle manufacturing process or overlay bracing, or they can be removable affixed using, for example, one or a combination of snap on clips, adhesive magnetic bonding, a locking screw mounting system, THULE-type locking and the like. A vehicle and a vehicle-based wind energy generating device can also include directional spoilers or wings that are positioned to thereby decrease air resistance of a moving vehicle and increase wind energy generation. A vehicle and a vehicle-based wind energy generating device can also include a device for measuring the direction of the atmospheric wind at or near the positions of one or more vehicle-based wind energy generating devices and movable directional spoilers or wings that are moved based on the measured wind direction information to thereby decrease air resistance of a moving vehicle and increase wind energy generation. Vehicle-based wind energy generating devices can generate energy while a vehicle is parked or moving. Typically, vehicle-based wind energy generating devices have a height of between about a few micrometers and about a few feet.

Any wind energy generating device that is not affixed to a vehicle is hereinafter referred to as "ground-based." Typically, a ground-based wind energy generating device can be positioned on part of a road on which its presence does not hinder the flow of traffic or pose a safety risk, near to a road, and on any road object on or near to a road. Examples of road objects are traffic signs, for example, traffic lights, guardrails, buildings and the like. Ground-based wind energy generating devices can be permanently affixed or mounted into the ground multiples of feet deep and sometimes set into a foundation, or they can be affixed such that they are easily removed using, for example, one or a combination of snap on clips, adhesive magnetic bonding, a locking screw mounting system, magnets, braces and ties to metal structures, THULE-type locking and the like.

The phrase "near" a road as used herein, refers to the distance of a given ground-based wind energy generating device from a given road that allows the ground-based wind energy generating device to capture wind from passing vehicles (hereinafter also "dirty wind") to generate energy. This distance can be determined in view of the height of the turbine and the average velocity of an average vehicle passing the wind energy generating device. Typically, this distance can be up to about 40 feet. For example, for a helical axis turbine of 10 feet height, positioned along a road on which vehicle travel with an average velocity of 55 miles per hour, the distance can be up to about 20 feet and for one of 5 feet height, the distance can be up to about 25 feet.

A "wind turbine array" as used herein is a plurality of wind energy generating devices.

A "roadway system electricity grid" as used herein, refers to any network of electrical connections that allows electrical energy to be transported or transmitted. Typically, a roadway system electricity grid can include energy storage systems, systems for inverting energy, single power source changing units, electricity meters and backup power systems.

A "utility grid" (hereinafter also "grid") as used herein, refers to the existing electrical lines and power boxes, such as EDISON and NSTAR systems.

A "direct power load" is any system, that is directly electrically connected to the roadway system electricity grid, that is, without electrical energy being transmitted via a utility grid, and has a demand for electrical energy, for examples, any business or home.

An "energy storage system" as used herein is any device that can store electrical energy. Typically, these systems transform the electrical energy that is to be stored in some other form of energy, for example, chemical and thermal. For example, an energy storage system can be a system that stores hydrogen, which for example, is obtained via hydrogen conversion electrolysis. It can also be any rechargeable battery. "Ground-based energy storage systems" can be positioned below or above the ground. "Vehicle-based energy storage systems" can be permanently affixed or mounted in or on the car, for example, during the vehicle manufacturing process, or they can be removable affixed using, for example, one or a combination of snap on clips, adhesive magnetic bonding, a locking screw mounting system, THULE-type locking and the like.

The phrase "connected to the roadway system electricity grid" as used herein, refers to any direct or indirect electrical connection of a solar or wind energy generating device to the roadway system electricity grid that allows energy to be transferred from the energy generating device to the grid.

A "solar energy generating device" as used herein, is any device that converts solar energy into electricity. For example, a solar energy generating device can be a single solar or photovoltaic cell, a plurality of interconnected solar cells, that is, a "photovoltaic module", or a linked collection of photovoltaic modules, that is, a "photovoltaic array" or "solar panel." A "solar or photovoltaic cell" (hereinafter also "photovoltaic material") as used herein, is a device or a bank of devices that use the photovoltaic effect to generate electricity directly from sunlight. For example, a solar or photovoltaic cell can be a silicon wafer solar cell, a thin-film solar cell employing materials such as amorphous silicon, poly-crystalline silicon, micro-crystalline silicon, cadmium telluride, or copper indium selenide/sulfide, photoelectrochemical cells, nanocrystal solar cells and polymer or plastic solar cells. Plastic solar cells are known in the art to be paintable, sprayable or printable roll-to-roll like newspapers.

A "solar energy generating device" can be ground-based or vehicle based. A vehicle-based solar energy generating device can be permanently affixed or mounted to the car, for example, during the vehicle manufacturing process or overlay bracing, or they can be removable affixed using, for example, one or a combination of snap on clips, adhesive magnetic bonding, a locking screw mounting system, THULE-type locking and the like.

A ground-based solar energy generating device can be attached to any surface that allows collection of solar energy and where its installation does not pose a safety risk or is not permitted by regulations. For example, it can be positioned on part of a road on which its presence does not hinder the flow of traffic or pose a safety risk, near to a road, and on any road object on or near to a road. Examples of road objects are traffic signs, for example, traffic lights, guardrails, buildings and the like. Ground-based wind energy generating devices can be permanently affixed or mounted into the ground multiples of feet deep and sometimes set into a foundation, or they can be affixed such that they are easily removed using, for example, one or a combination of snap-on clips, adhesive magnetic bonding, a locking screw mounting system, magnets, braces and ties to metal structures, THULE-type locking and the like.

A description of example embodiments of the invention follows.

One embodiment of the present provides lines of wind turbines and solar power arrays running along and in the median of major roadways and highways combined with the gathering and distribution of power resulting from vehicle installations of wind and solar energy gathering devices installed permanently or temporarily, for free or for pay, with or without deposit, in use with existing highway systems like FASTLANE or run as a completely independent program for affixing solar and wind power gathering devices on vehicles to create a widespread portable solar energy gathering network of vehicles. Vehicles can be affixed with 'vehicle arrays' on or adjacent to major roadways and highways potentially creating a solar power gathering network infrastructure of hundreds of thousands of miles long, augmented by millions of vehicles installed with solar arrays designed for vehicles for the purpose of gathering solar power enabling vehicle owners to take advantage of the solar network energy gathering and distribution system to be easily equipped and compensated and for their participation via power gathered by their vehicle system, most of both sets, vehicle and line, of solar arrays will be convenient to the grid and to powering individual homes, public infrastructure and businesses. The present invention also carries with it the potential to move solar power into the double digit overall energy market share in the United States. Additionally, there is a need for an integrated small wind power infrastructure that is easily connected to multiple direct sources or various grid interconnection points. The use of public and private highways via median and outside of breakdown lane installations of small wind generating devices offers numerous advantages. First, private highways and municipalities have existing maintenance crew as well as existing relationships with contracted infrastructure building providers who can be trained to install the wind generation systems along specified parts of roadways. Second, the wind power generation systems can be small and noiseless, small enough to fit on a median between opposite sides of a divided highway with existing median. Third, using a highway or other roadway allows for the installation of many wind generating devices per mile with over 500 wind generating devices possible per mile. Fourth, the energy generated by the devices may be distributed directly to homes or businesses along the highway route, such as powering homes or clean power for the electrolysis of hydrogen for filling stations along a highway, either utilizing hydrogen conversion at individual filling stations or at a conveniently located hydrogen conversion plant adjacent to the highway or roadway. Fifth, other clean energy sources such as solar, geothermal and other heat conversion technologies may be used to create a multi-source clean energy 'power grid' along with or in tandem with the 'grid' in place via potential for the connection of miles of wind power gathering, storage and transfer of generated power. Sixth, these infrastructures benefit the wind power generator companies; the roadway owners via lease or easement revenue, provide a stable and consistent infrastructure project generating a service provider economy for clean energy production as well as the environment. Seventh, roadways are a consistent source of wind and by having small wind energy capture generating devices close to the ground the wind energy capture devices, such as small noiseless spiral or helix-style turbines, enable the devices to capture wind energy generated by passing vehicles as well as existing currents. Eighth, the power generated by this system may also be connected to a grid system at many different and convenient points located very close to the existing grid infrastructure. This fixed system can be utilized in tandem and complimentary ways to deploy installations, maintenance, billing and depositing of gathered power with the present vehicle system, and solar systems allowing for portable, semi-permanent or permanent wind small wind turbines to be affixed to vehicles at or near the point of entry to major roadways and highways. Vehicle owners may pay little or no charge to have the wind turbine device or devices installed on their vehicles. Deposits from vehicle owners securing the safe return of the wind turbine energy generating system device may be secured through participating vehicle owner's financial institutions or via cash deposit. Participating vehicle owners, turbine installers, roadway owners or municipalities in control of the roadways and the owners of the turbines that are installed may all receive a share of the revenue from energy generated, stored and transferred into the grid or via direct distribution by the system after energy is generated by the individual vehicles and that electricity is off-loaded at designated, easily accessible, vehicle wind system network electricity collection stations or substations. This model creates a situation where drivers of vehicles do not have to spend significant time or financial resources to begin generating wind energy with their vehicles. This model creates a friendly format for wide-scale distribution of wind energy generating devices for thousands of miles of installations on roadways and millions of installations deployed on vehicles to take advantage of. By combining solar and wind power systems within this infrastructure and distribution plan the creation of a complimentary clean energy distribution network is achieved because both wind and solar power systems gather energy under different conditions. By having two gathering systems, if one method is not efficient at a particular time, then the other method may still have conditions that are effective for it to gather energy at that time. Thus the deployment of both sources of energy gathering systems, wind and solar, along this massive infrastructure of roadways enhances the ability to provide a more constant and stable clean power infrastructure.

One embodiment of the invention is a roadway system for energy generation and distribution, comprising: a plurality of ground-based wind energy generating devices; one or more roads; and a roadway system electricity grid; wherein each of substantially all of the ground-based wind energy generating devices is electrically connected to the roadway system electricity grid and positioned on part of one of the roads or near to one or more of the roads to thereby allow energy generation from wind created from passing vehicles in addition to energy generation from atmospheric wind.

Typically, each of substantially all of the ground-based wind energy generating devices can be positioned on part of one of the roads or within between about 0 feet and about 100 feet, within between about 0 feet and about 80 feet, or within between about 0 feet and about 60 feet from one or more of the roads. More typically, they can be on part of one of the roads or within between about 0 feet and about 40 feet from one or more of the roads. Preferably, they can be on part of one of the roads or within between about 0 feet and about 25 feet from one or more of the roads. More preferably, they can be on part of one of the roads or within between about 0 feet and about 10 feet from one or more of the roads The present invention relates to a contiguous or semi contiguous line of interconnected solar panels or thin films combined with a network of wind turbines running for thousands of total miles along public or private roadways. Deployments of energy gathering systems will be both fixed stationary systems as well as mobile systems mounted on vehicles traveling the roadways & highways. By running the solar power gathering network on or adjacent to highways or trafficked roadways the solar power gathering network will have easy access to both grid interconnection and local powering of public and private entities. New advances in solar energy gathering techniques allow for this kind of power gathering line system to be deployed in a more flexible, multi-form and cost efficient manner for power generation resulting in the development of a solar energy distributed power network with multi-gigawatt potential which may power entities directly or via interconnection with existing grid power systems. This roadway solar "line array" deployed in the median, on the side or breakdown lane or as lane dividers creates a system that produces DC current that is then passed through inverter, which converts to AC current and voltage. Power is also fed to the system by a network of vehicles deployed and installed with portable or permanent solar power gathering devices seamlessly mounted to their vehicles and containing linked battery packs that can be stored either in the trunk, inside the vehicle or attached to the exterior of the vehicle, small noiseless to low noise wind turbines to utilizing large stretches of continuous available public and private roadways via easements, leases or the purchase specified rights to create thousands of miles of contiguous and semi-contiguous networks of interconnected wind turbine power generation. The wind turbines may be mounted in the median, breakdown lanes or just off of the highway or major roadway. This deployment may run with a complimentary set of installations that uses small noiseless to low noise wind turbines to generate wind power by affixing those wind power generating devices to motor vehicles. Large fleets of motor vehicles driving along available public and private roadways may each be affixed with wind power gathering devices and the energy derived from these devices may be used to power elements of the vehicle directly, or may be used to gain credits for fuel, goods or sold for currency. Rest areas and service stations along with all retail outlets can make these vehicle wind generating systems available for easy purchase and installation for the motor vehicle owner. Power depots where energy is deposited from fixed and vehicle deployments, installation areas and billing systems can be combined to service both fixed and vehicle deployment installations to gain efficiency and save on infrastructure cost The power generated by the solar and wind energy gathering systems can be used to both connect to a grid or to power homes businesses or systems without connecting to existing grid systems. Power generated and stored in the portable battery system can be transferred into the network power system at Power Depots which can be designed and installed at the same or different points of interconnection and direct distribution as the line array panel outputs. Power is logged by the electricity meters and is either consumed immediately by home or business loads, or is sent out to the general utility grid network. The utility meter spins backwards, or two meters are used to record incoming and outgoing power. The inverter shuts down automatically in case of utility power failure for safety, and reconnects automatically when utility power resumes. Solar power arrays and fixed wind turbines can be situated on a median, breakdown lane or nearby running contiguous with major roadways and offer numerous conveniences such as easy access to the grid, easy maintenance access and direct powering opportunities to homes and businesses with a potential installation footprint of hundreds of thousands of miles of available roadways.

The present invention, in accordance with one embodiment relates to the creation of a massive solar power generating infrastructure system where solar power generating devices are networked together along public and private roads creating the largest contiguous and semi-contiguous solar power generating and distributing system ever built. This specific embodiment envisions nearly continuous solar panel and or thin film and "solar paint" mounted and deployed in the median, breakdown lane and lane dividers and connected or networked together either through a battery pack system or then to one kind of inverter for grid interconnection or another kind of inverter for direct distribution to power users. Using an inverter applies power conditioning to the solar generated power to enable the connection of the solar generated power to the grid system or locally distributed power users depending on the specific type of inverter. There may also be instances where continuous solar 'strip arrays' may be connected to a single power source changing unit, or simply tied together in a parallel line connection before being connected to the inverter. Whatever network inverter is used may also need to have an electric meter installed between the power generated by the system to the grid or customer and the inverter. Unlike most solar gathering arrays the implementations of the arrays in this system will be mounted close to the ground, some on the ground, lane dividers or guardrails and rise no more than ten to fifteen feet high to fit into the environmental constraints of highway and roadway deployments and enabling easy access for maintenance crew. These solar 'strip arrays' may be connected together in parallel along with a battery back up or backup power system in the event that the grid system fails. The parallel 'strip array' systems power deployments and distribution points will be based upon local usage locations and access to grid points. The 'strip array' system may be automated containing switches to feed the grid from the local, strip array, that is networked together via battery system or wired in parallel to pass the electricity to the next closest strip array parallel line or battery storage facility or to local power distribution users based upon need. The effect of hundreds or thousands of miles of this implementation is to form a sub grid of solar, and possibly other, clean power energy sources, where each distribution or interconnection point may be measured with a standard electricity power meter at or near the electricity's point of entry into the grid or direct distribution customer system to gauge accurate electricity usage for billing purposes. In a preferred embodiment solar strip arrays are deployed on a highway system in the median on the ground level, or on top of the median barriers, or on top of other clean power gathering devices in the median such as wind turbines. Solar voltaic paint systems would gather energy from painted lane dividers and solar film would be mounted upon guardrails. These mixed systems would also be used as is most efficient on or around breakdown lanes and on or around toll booth installations. The strip arrays would be networked together and then joined by running a power line in parallel or battery storage and then through an inverted to condition the electricity properly for use in a grid system or via direct distribution. Power lines may be connected directly to sources or buried or flown to appropriate distribution points based upon the physical characteristics of specific implementations as well as private, local, state and federal regulations and specifications. The vehicle solar energy gathering system is made to run in tandem and be complimentary with the 'line array' system. With the potential deployment of millions of vehicles whose owners have elected to participate in, and be compensated by, the vehicle solar energy gathering network system creating one of the largest semi-contiguous solar power generating network installation and distributing systems ever built. This specific embodiment envisions millions of solar paneled, thin film and "solar paint" mounted and deployed vehicles installed with these solar energy gathering devices for little or no charge to the vehicle owner. The cost of acquisition of the equipment is borne by the network owners, who work in conjunction, or can be the same party as, various parties who have economic or strategic initiatives to participate in the network including the vehicle installation entity for the network system, the roadway or highway municipality owners and the power distribution and billing depots. The installation systems, billing systems and payment systems described for solar and wind energy herein can be combined into a single unified network. A specific embodiment to incorporate the wind energy gathering infrastructure systems relates to the creation of a massive wind power generating infrastructure system where small, nearly noiseless wind power generating devices are networked together along public and private roads creating the largest contiguous and semi-contiguous wind power generating and distributing system ever built. This specific embodiment envisions five hundred wind turbines per mile mounted in the median and connected or networked together either through a battery pack system or then to one kind of inverter for grid interconnection or another kind of inverter for direct distribution to power users. Using an inverter applies power conditioning to the wind generated power to enable the connection of the wind generated power to the grid system or locally distributed power users depending on the specific type of inverter. There may also be instances where multiple turbines may be connected to a single power source changing unit before being connected to the inverter. Whatever network inverter is used may also need to have a electric meter installed between the power generated by the system to the grid or customer and the inverter. Unlike most wind gathering turbines the turbines in this system will be mounted close to the ground and rise no more than ten feet high to catch wind generated by passing cars and enabling easy access for maintenance crew. Pods of wind turbines will be connected together along with a battery back up or backup power system in the event that the grid system fails. The pod systems will be based upon local usage locations and access to grid points. The pod system may be automated containing switches to feed the grid in the local pod, pass the electricity to the next closest pod or to local power distribution users based upon need. The effect of hundreds or thousands of miles of this implementation is to form a sub grid of wind, and possibly other, clean power energy sources, each distribution or interconnection point may be measured with a standard electricity power meter at or near the electricity's point of entry into the grid or direct distribution customer system to gauge accurate electricity usage for billing purposes. In a preferred embodiment small helix or double helix designed wind turbines are positioned in the median or breakdown lane to take advantage of the wind generated by vehicles as they pass. This kind of wind is known as "dirty" or uneven wind in the wind turbine business, but the helix or double helix style wind turbines are suited to take advantage of this condition to generate power, even when the wind is in cross directions from the wind currents of traffic headed in opposite directions. This condition will cause the helix-style turbine to speed up, while it may hinder the ability of a windmill style turbine to generate energy efficiently. This embodiment also runs in tandem to a complimentary deployment that relates to the creation of a massive wind power generating infrastructure system where small, nearly noiseless wind power generating devices are affixed to vehicles who secure the acquisition of the devices through a special lane, similar to the FASTLANE designee on a toll road, or local access point to a busy roadway. The portable wind power turbine system pack consists of a small wind turbine and battery charging system. The turbine may be metered to provide charge to an existing car battery or electric car battery or it may be gathered to a separate unit battery, which when a light indicates the battery is full, is then available for drop off for deposit of power into the system electricity depot for a credit against toll costs or for cash credit. The portable wind turbine devices may be installed on the hood, top, sides, rear bumper area or undercarriage of a vehicle using magnets or bracing system that takes as quickly as under 1 minute to install . . . the battery pack may be stored next to the device or in the trunk of the vehicle.

The wind turbines may be propeller, helix, double helix or triple helix style wind turbines. At a wind turbine network distribution or maintenance center the individual vehicle wind system batteries are drained of their gathered power by connection to an inverter and then the vehicle owner or user is credited for the energy that has been gathered, via a credit to that users electronic account, which can be merged with existing FASTLANE accounts or separately monitored and maintained. Transactions may also be handled on a cash or credit card basis. The electricity processed by the inverter is then distributed back into the grid using one kind of inverter or distributed directly by another kind of inverter. Both distribution methods are measured with meters to effectuate accurate billing. Billing revenue is then shared by the remaining stakeholders, i.e. the company owning the devices, the roadway and the installation and power Maintenance Company. There may be more sub-contractors that are compensated in this process. There may also be fewer compensated parties in the event that one party controls multiple pieces of the system process or in the event that a roadway or public highway is not compensated.

The two systems, wind energy and solar energy gathering systems, can share some or all Power Depot points, maintenance stations and billing systems. Specific energy distribution depots may be designed into the system to store, channel and recondition energy for use in the grid system or to power direct distribution to entities seeking power from the network.

The concept of using roadways as distribution points, fixed solar and wind installations along roadway systems and portable solar and wind energy gathering devices on vehicles and for vehicle owners who do not have to pay to enlist the wind energy gathering devices on their vehicles, where infrastructure to run solar and wind energy gathering and distribution systems via both the fixed installations and vehicle energy gathering systems are easily accessible via roadway distribution points are completely new innovations to the clean energy arena.

FIG. 1 illustrates part of a roadway system implementation that contains fixed wind turbine arrays along a roadway. These ten foot double helix type wind turbine generators (Item 1) are positioned in a linear-equidistant distribution, any consecutive pair of wind turbine generators about fifteen feet apart (Item 2) along a continuous row at the edge of breakdown lanes (Item 3), or within medians or center dividers of a roadway (Item 5). The wind turbine generators are either mounted into the ground multiples of feet deep and sometimes set into a foundation, or secured via magnets, braces and ties to metal structures (Item 4). Helix type wind turbine generators are not dependent on single direction wind, which is good because wind created from passing vehicles comes in uneven and multiple directions or even cross directions (Item 6) at the median point of the roadway and helix type wind turbine generators, in particular, of the double-helix type are suited to work well in these conditions. Double helix wind turbine generators are also relatively noiseless in operation which allows using these turbines very close to humans. These double helix type wind turbine generators are linked together in an energy gathering chain with one or more turbines feeding a single or array of batteries appropriate to the power generation of the individual and groupings of turbines. There can be many, for examples, thousands of battery arrays along a single roadway implementation (Item 7).

The electrical energy of a ground-based energy storage system storing energy generated, for example, from one or more wind energy generating devices, for example, a battery or battery array, can be fed to an inverter and then passed through a power meter as the power generated, for example, by the wind turbine generators is either delivered into a utility grid system, directly distributed to a home or business, or stored for later use, for example, at peak energy demand times, by either larger battery arrays, or via the use of the wind energy to convert to hydrogen and then conversion of the hydrogen back to energy using a hydrogen fuel cell technology for vehicles or grid power usage (See FIG. 5).

Figure 2:
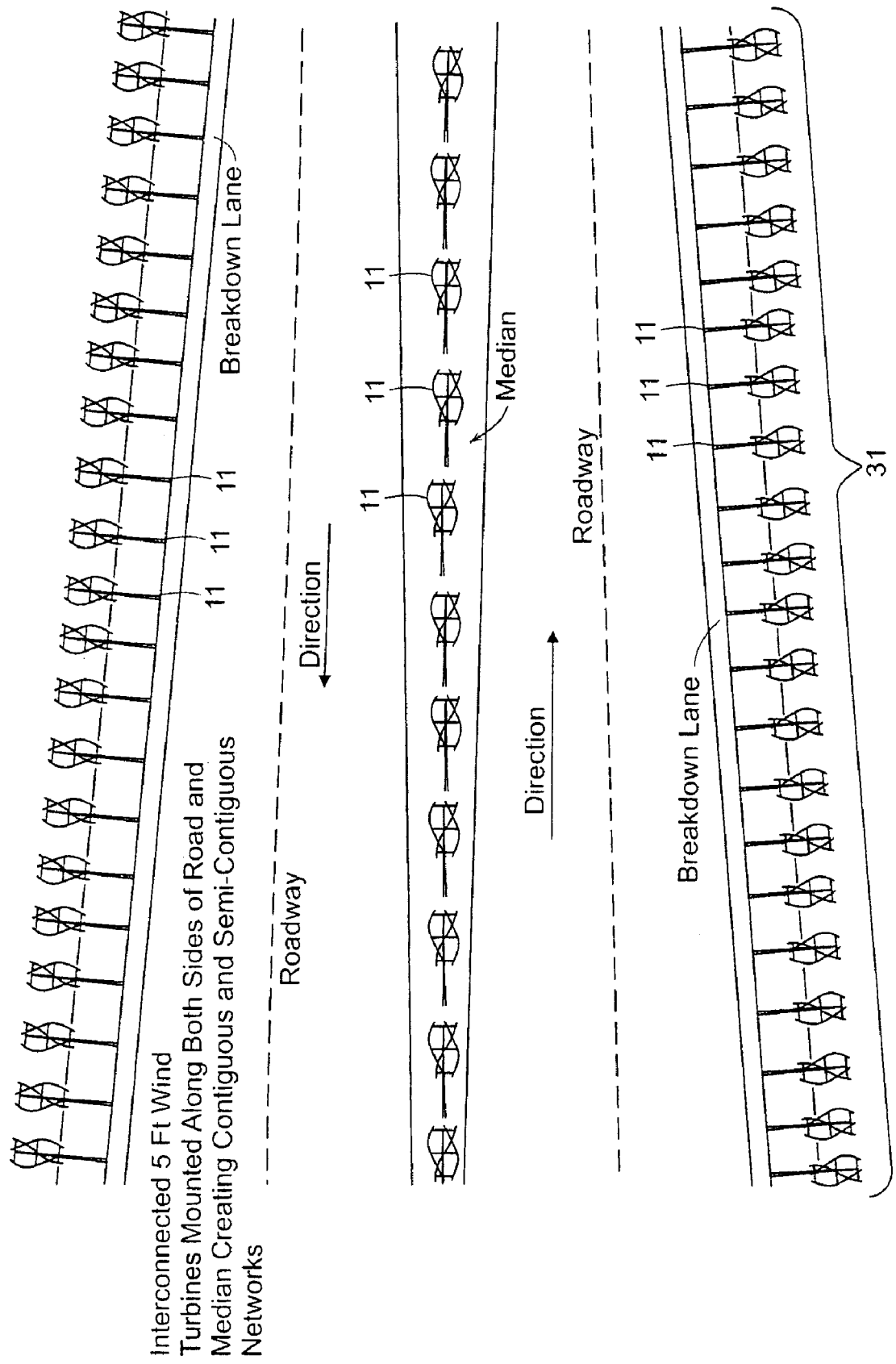
FIG. 2 illustrates the use of 5 foot high turbines.

FIG. 2 illustrates part of a roadway system implementation that contains fixed wind turbine arrays along a roadway. Here, the use of five foot double helix type wind turbine generators (Item 11) is shown. Typically, these five foot double helix type wind turbine generators can generate less energy than the ten foot double helix type wind turbine generators, but because they are smaller, they only need to be 5 to 7 feet apart or less. Accordingly, they can be used at higher density along roadways. Because the ten foot variety is higher up, the five foot variety may be installed within the ten foot variety installation and both turbines may work along the same roadway virtually side by side creating a layered effect. Generally, this layered distribution in which different sized turbines function at their own height can be used with wind turbine generators having heights from about 25 feet down to about a few micrometers. The established concept of using battery arrays, inverters and meters and distributing the power to the grid, direct distribution or reserve storage remains in force for all sizes of turbines. The turbines may be deployed in a total contiguous manner (Item 31) or in a semi contiguous manner based upon roadway wind conditions, roadway design constraints, access to utility grid, access to power storage and access to direct distribution sources (See FIG. 5).

Figure 3:
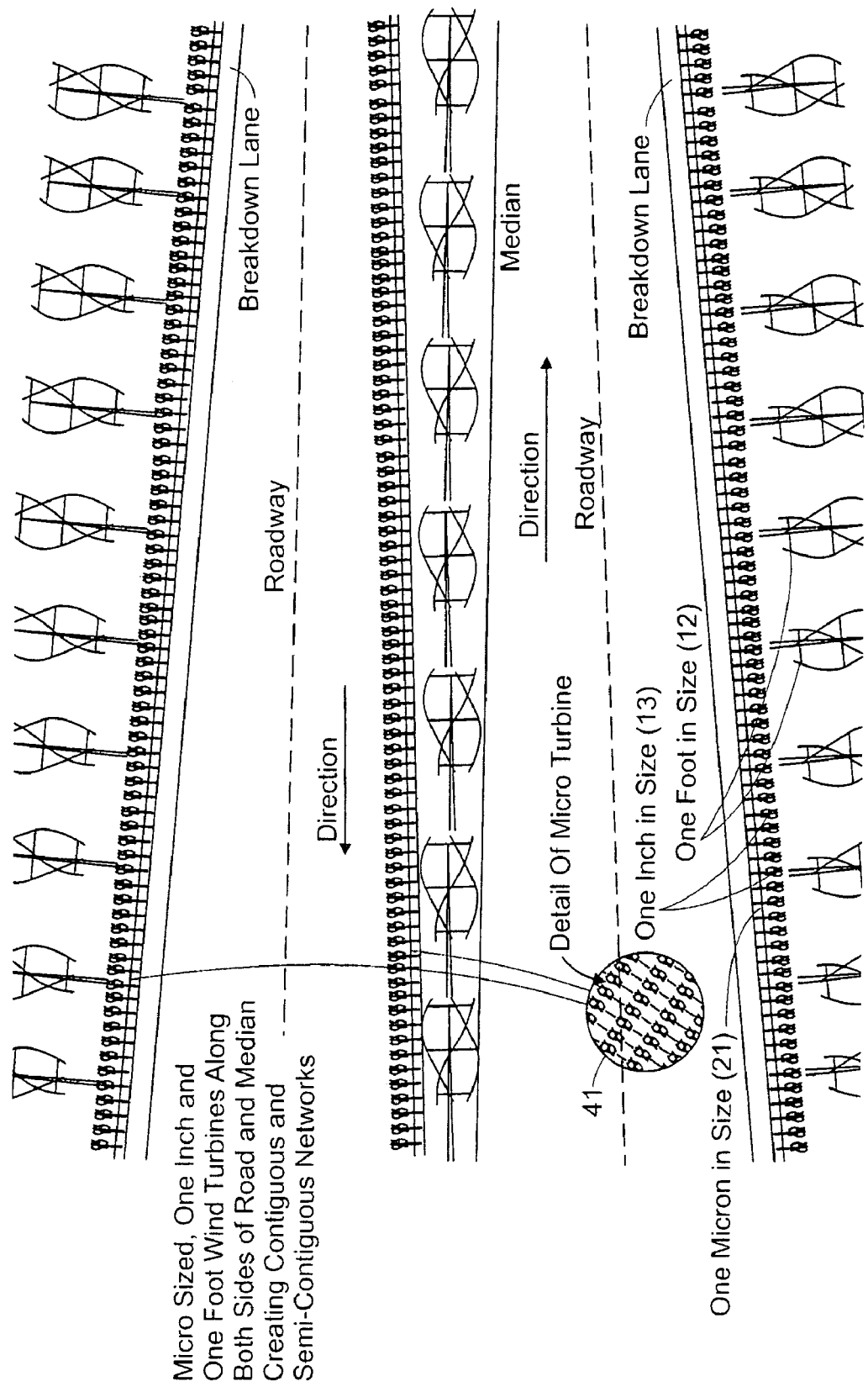
FIG. 3 illustrates the contiguous deployment of one foot long and tiny one micron to multiple micron height wind turbines.

FIG. 3 illustrates the contiguous deployment of one foot double helix type wind turbine generators (Item 12), one inch double helix type wind turbine generators (Item 13) and one micrometer to multiple micrometer high double helix type wind turbine generators (Item 21). Smaller wind turbine generators allow a larger number of wind turbine generators to be deployed within a given area than large wind turbine generators. Foot long turbines (Item 1) may be deployed only 1.5 or less feet apart depending on the terrain and angles of deployment relative to each turbine in the contiguous or semi-contiguous installation, while micron length turbines can be deployed in the millions over a square foot (Item 41).

Figure 4:
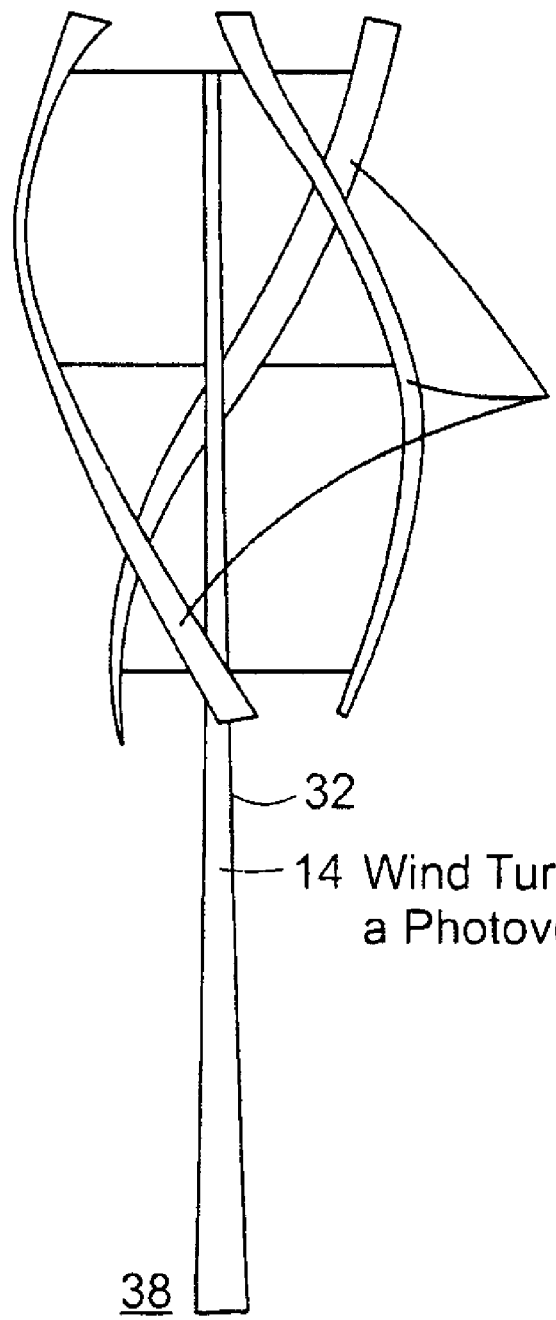
FIG. 4 illustrates the use of wind turbines that may be covered in solar gathering materials such as thin films that may be molded to parts of the turbine.

FIG. 4 illustrates a helix type wind turbine generator (Item 14) that may be covered in solar gathering photovoltaic materials such as silicon thin films that may be molded to parts of the wind turbine generator that do not interfere with the wind turbine generator's fundamental operation, for example, the parts indicated by Item 22. The solar energy that is gathered is then fed to a central rod (Item 32) and carried down the base of the wind turbine generator (Item 38) where it can then be channeled via wiring typical to the industry into a ground-based energy storage system, for example, a battery pack or battery array deployment.

Figure 5:
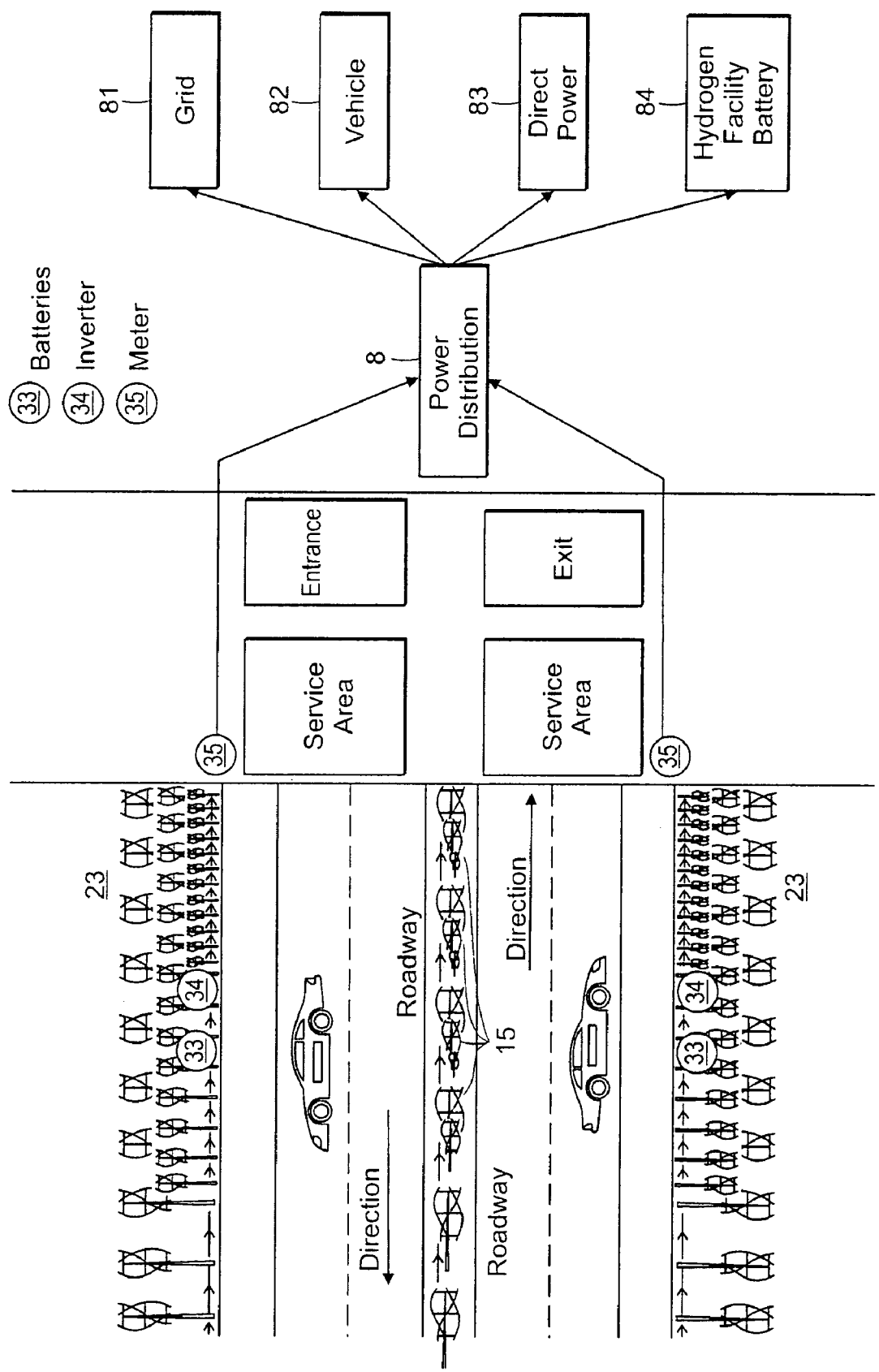
FIG. 5 illustrates the helix-designed wind turbines implemented in a stratum layered design along the median and breakdown lanes of a roadway.

FIG. 5 illustrates helix type wind turbine generators implemented in stratum layered design along the median (Item 15) and breakdown lanes of a roadway (Item 23). Power generated from the wind turbine generators is passed to battery arrays (Item 33), then inverters (hem 34) and registered through meters (Item 35) before being distributed (Item 8) to the utility grid (Item 81), direct power of homes or businesses (Item 82), powering of vehicles (Item 83) or stored in auxiliary battery arrays or to a hydrogen facility (Item 84) that can use the power to form hydrogen using an electrolysis process, store the hydrogen, and release the energy stored in the hydrogen, that is, convert the hydrogen to produce power. The hydrogen facility could produce power from the stored hydrogen, for example, in times of an emergency or at peak demand times.

Figure 6:
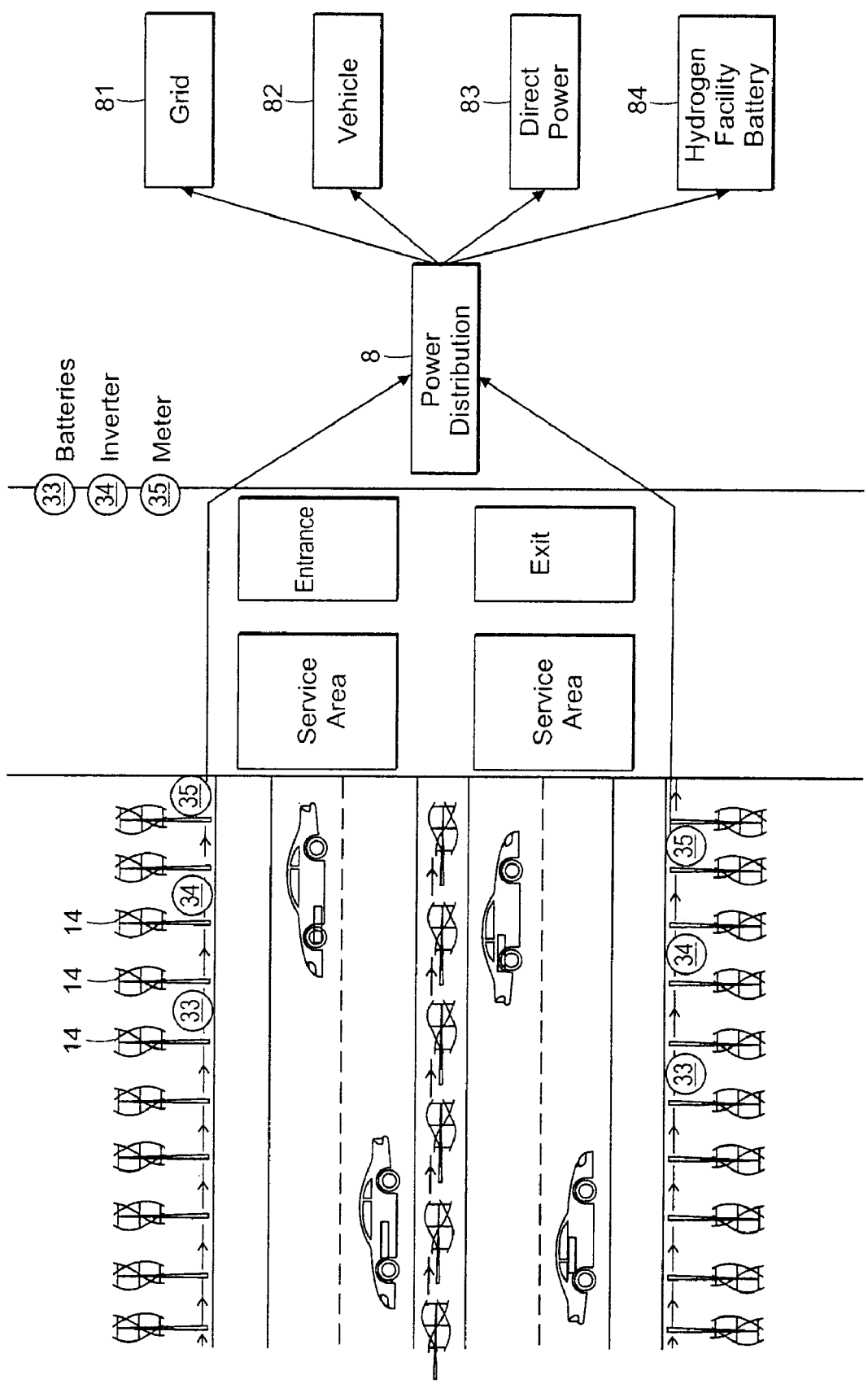
FIG. 6 illustrates the helix wind turbine power generation installed on roadways in a single uniform height.

FIG. 6 illustrates helix type wind turbine generators (Item 14) implemented as a single uniform height turbine system delivering power into battery arrays (Item 33) then to inverters (Item 34) and registered in power meters (Item 35) then distributing the power (Item 8) to the utility grid (Item 81), direct distribution (Item 83), auxiliary power storage (Item 84) or vehicle usage (Item 82).

Figure 7:
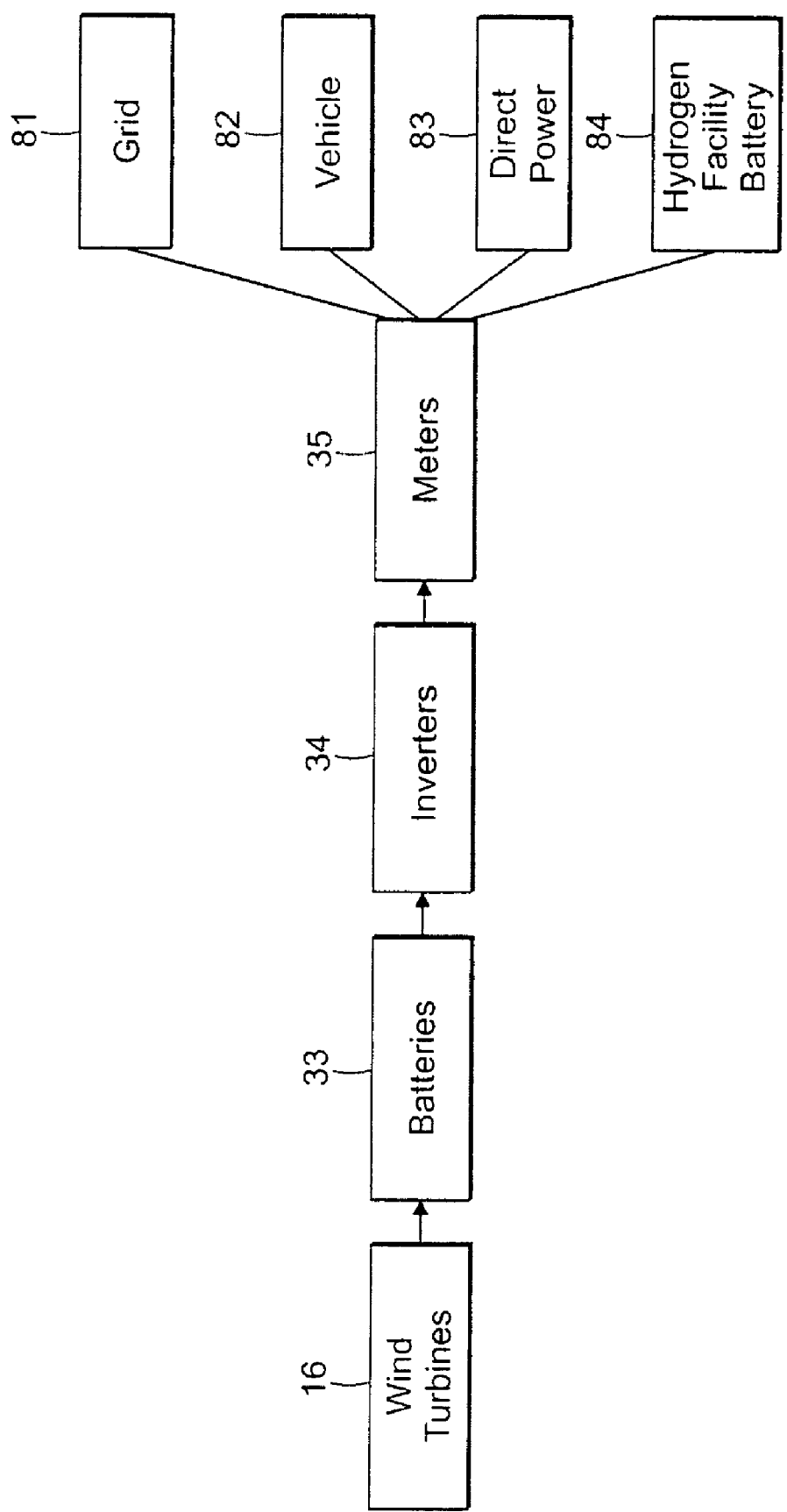
FIG. 7 illustrates a flow chart for how the wind energy generation by the helix designed turbines flows through the system.

FIG. 7 illustrates schematically the flow of electrical energy or power generated by wind energy generating devices, for example, wind turbine generators (herein also "wind turbines") (Item 16) through a roadway system. The wind turbines generate energy (Item 16) which is passed via connected wiring to one or more ground-based energy storage systems, for example, battery arrays (Item 33). The energy is then passed from the battery in DC form to one ore more inverter (Item 34) which change the electricity to AC form and conditions the electricity to the specifications needed by the distribution point, where it is run through a meter (Item 35) then distributed to the utility grid (Item 81), one or more vehicles (Item 82), a direct distribution point such as a home or business (Item 83), fueling of an electric or hydrogen electrolysis machine or further storage via hydrogen conversion electrolysis or auxiliary battery array storage (Item 84).

Figure 8:
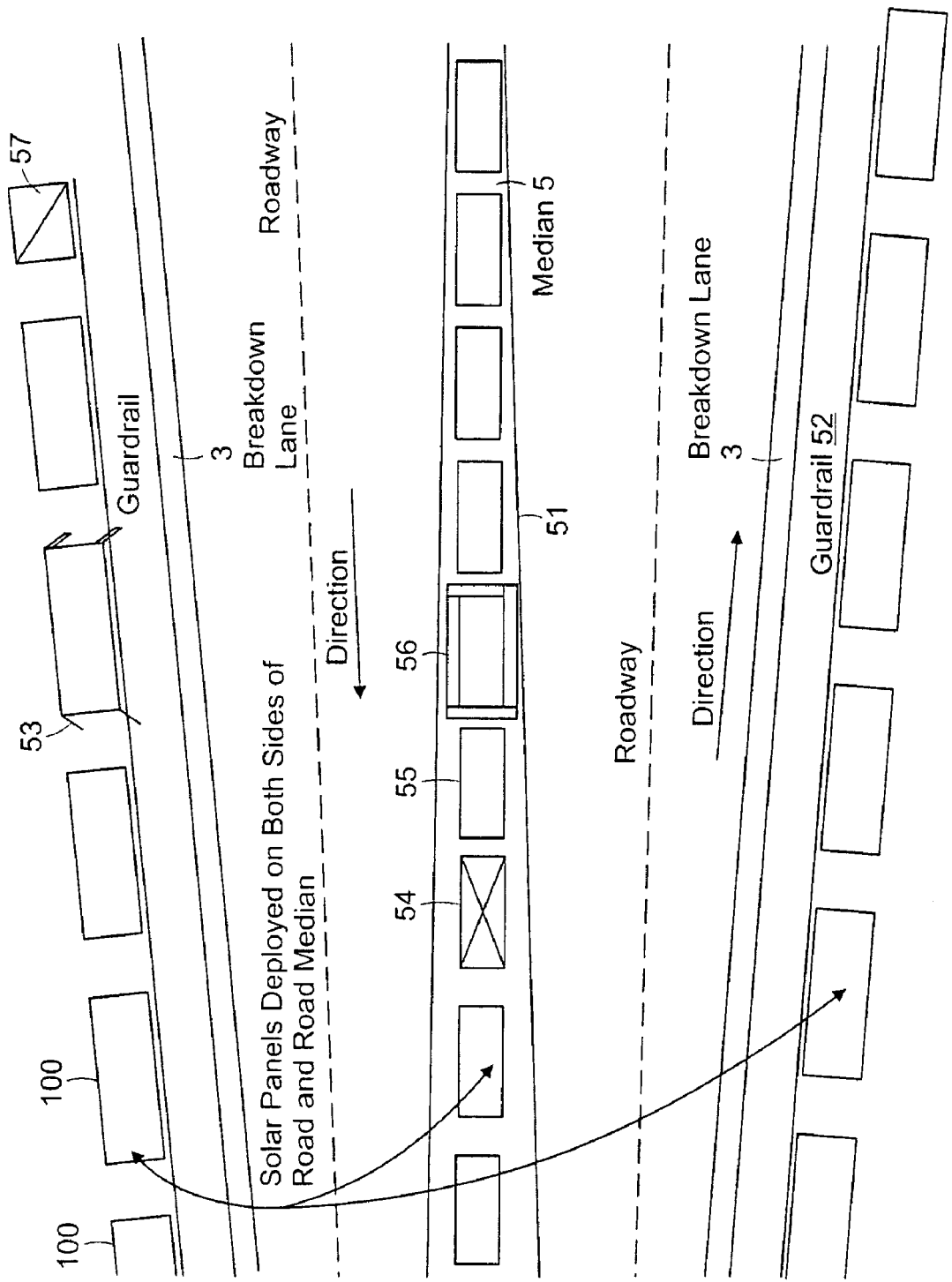
FIG. 8 illustrates solar panels positioned as contiguous strips of solar backed films deployed along the sides and the median of a roadway.

FIG. 8 illustrates solar panels, which may also be contiguous strips of solar backed films (Item 100) deployed along the sides (Item 3) and the median of a roadway (Item 5). Solar films may be easier to implement because they can be cut to fit and they can be printed out in miles of consecutive film during the manufacturing process. Some new films are also not using silicon and are using nanotechnology to create new kinds of solar films such as those developed by NANOSOLAR (nansolar.com). The ability to manufacture miles of film or to cut smaller pieces in a variety of lengths and widths are preferable in view of road breaks, replacements, maintenance and physical and governmental building restrictions that are factors in individual roadway implementations. Panels or backed films may be mounted to median guardrails (Item 51) or roadside guardrails (Item 52) or may be erected upon rails or beam supporting devices that have been secured into the ground via depth or piling techniques (Item 53). Displays of the panels or films may include custom formation around objects, pyramid configurations (Item 54), facing flat towards the sky (Item 55), mirrored sides (Item 56), or electronic tilts (Item 57) built to maximize the solar gathering materials access to direct contact with the suns rays.

Figure 9:
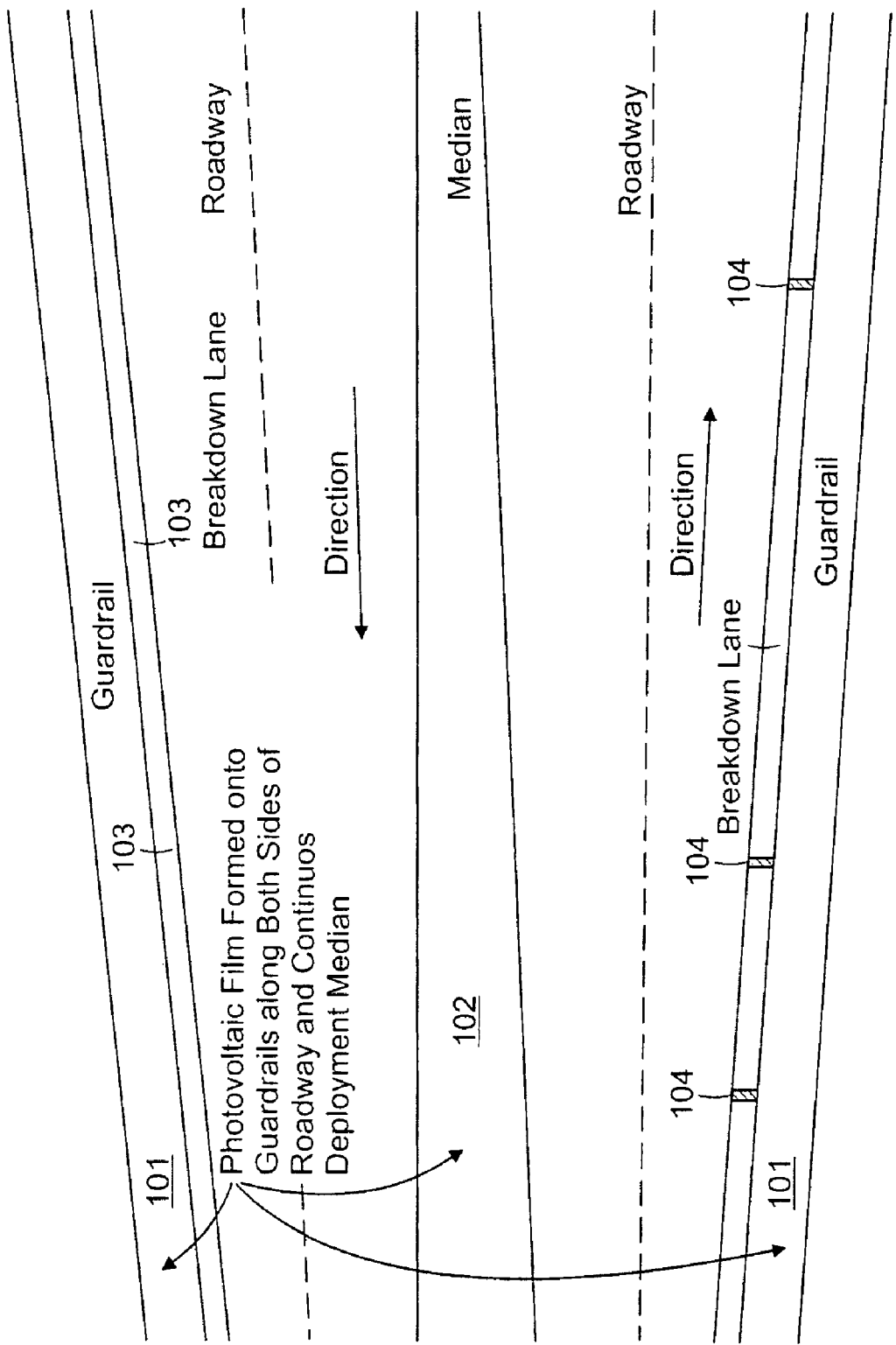
FIG. 9 illustrates solar film molded at the installation site to specific areas of installation to provide a cohesive and continuous or semi-continuous implementation.

FIG. 9 illustrates how solar film can be molded at the installation site to specific areas of installation to provide a cohesive (Items 101, 102 and 103) and continuous (Item 101) or semi-continuous implementation of solar gathering material (Item 104) along a roadway on existing structures of uniform and non-uniform shapes such as guardrails on the side and median of roadways.

Figure 10:
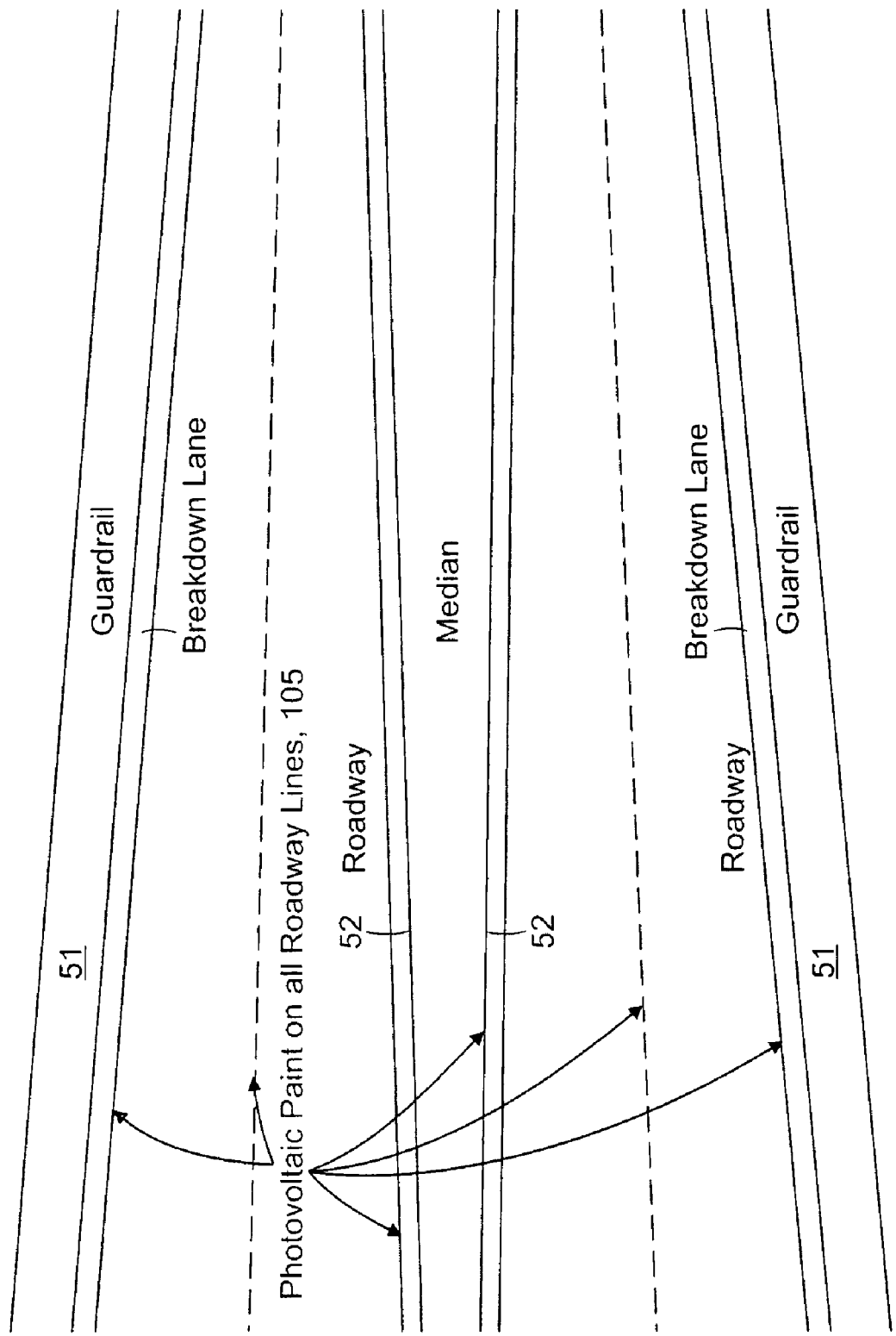
FIG. 10 illustrates the use of spray on solar power cells, herein referred to as solar voltaic paint which may be sprayed onto the roadway.

FIG. 10 illustrates the use of spray on solar power cells, herein referred to as solar voltaic paint which may be sprayed onto the roadway itself as lane markers (Item 105) or onto guardrails (Items 51 and 52) to collect both solar energy and infrared heat using a spray on solar power cell material that utilizes nanotechnology to mix quantum dots with a polymer to create an energy gathering material that may be five times more efficient than current solar cell technology. The sprayed on materials would have conductive infrastructure underneath it similar to solar films and panels with efficiently planned depot points for the energy gathered by the sprayed on materials to be transferred to battery arrays and inverters and then to energy distribution points such as the utility grid, direct distribution or auxiliary storage (See FIG. 5).

Figure 11:
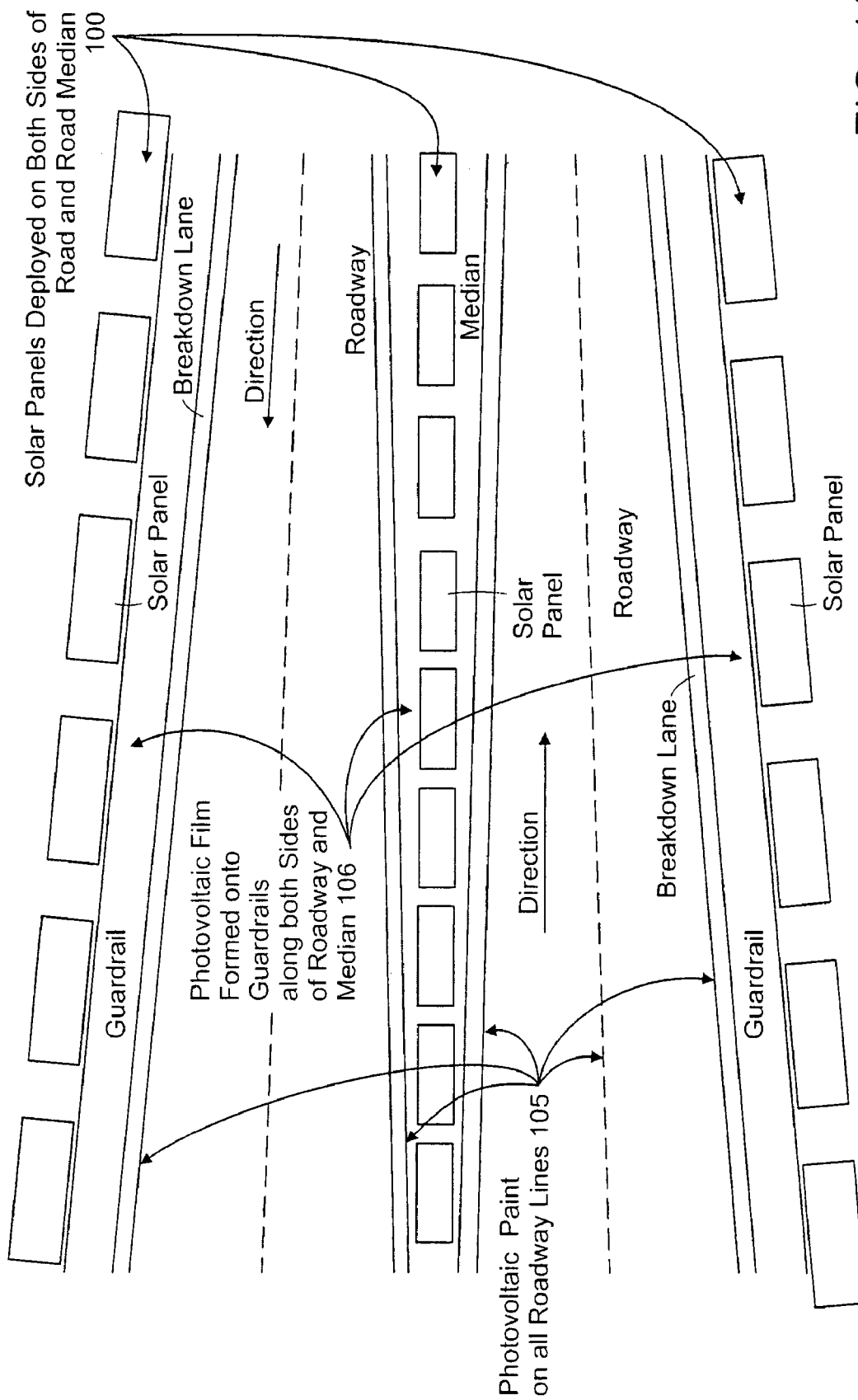
FIG. 11 illustrates solar panels deployed on the roadside lanes in a continuous manner complemented by formed solar films.

FIG. 11 illustrates solar panels (Item 100) deployed on the roadside lanes in a continuous manner complemented by formed solar films with backing formed over guardrails (Item 106) and spray on solar material. Various solar technologies may be used in concert to implement a comprehensive and contiguous or semi-contiguous implementation of solar energy gathering materials along a roadway system. The solar panels, which may also be solar films, deployed on the sides of the roadway and the median along with solar sprayed on power cells, "solar paint", sprayed as roadway markers (Item 105). These roadway markers may also be deployed in wider use on the roadway, particularly in breakdown lanes, to maximize coverage and power gathering potential.

Figure 12:
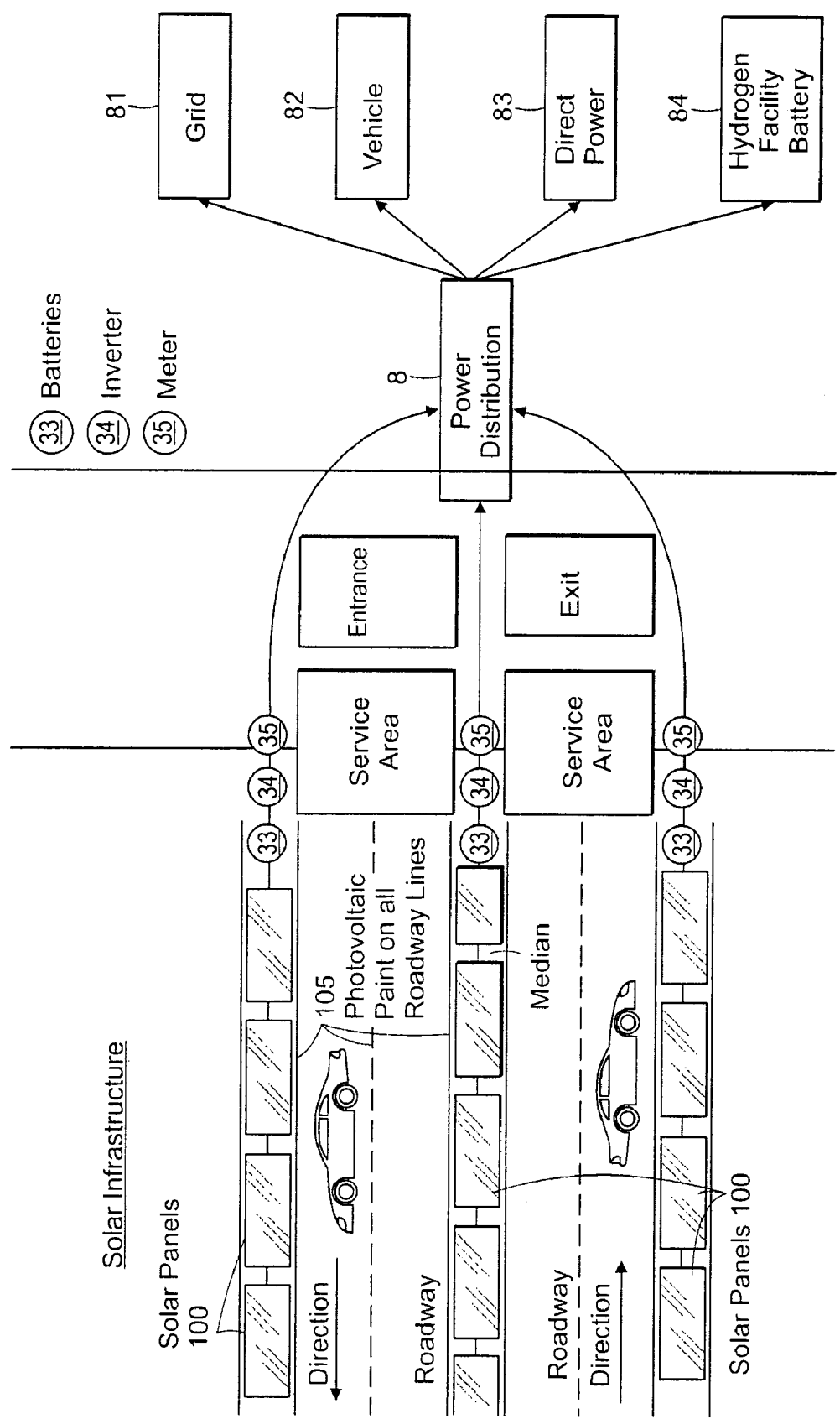
FIG. 12 illustrates solar panels, which may also be solar films, deployed on the sides of the roadway.

FIG. 12 illustrates solar panels, which may also be solar films, deployed on the sides of the roadway (Item 100) and the median along with solar sprayed on power cells, "solar paint", sprayed as roadway markers (Item 105). These roadway markers may also be deployed in wider use on the roadway, particularly in breakdown lanes, to maximize coverage and power gathering potential. The gathered power is transferred via wired connection to battery (Item 33), then to inverters (Item 34) and then to meters (Item 35) which register the amount of energy that is distributed (Item 8) to the utility grid (Item 81), to homes or businesses (Item 83), to vehicles (Item 82) or to and auxiliary energy storage or hydrogen facility (Item 84).

Figure 13:
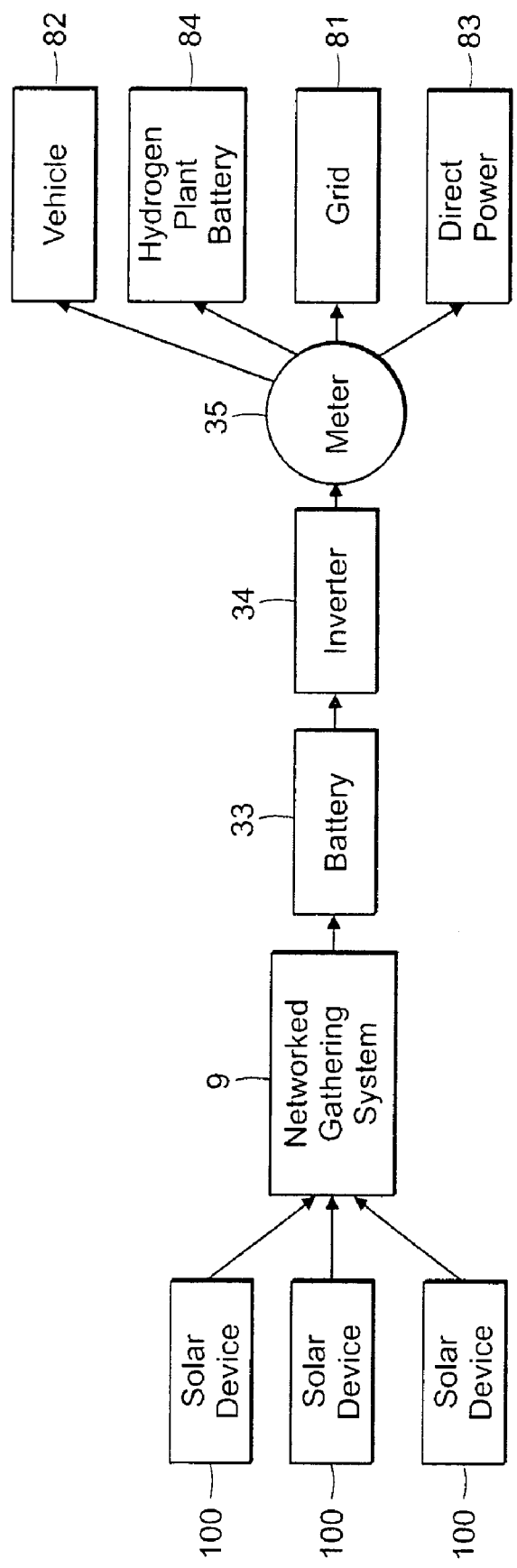
FIG. 13 illustrates a flow chart that defines the steps from gathering to distribution of the solar energy roadway system.

FIG. 13 illustrates a flow chart that defines the steps from gathering to distribution of the solar energy in a roadway system. One or more solar gathering devices such as solar panels, solar films with backing and solar spray on power cells are installed along a roadway in a contiguous or semi-contiguous configuration (Item 100). The solar energy generating devices are networked through a roadway system electricity grid via wiring and input and output connections (Item 9) to efficiently take advantage of batteries and battery arrays as are standard in the solar energy gathering industry (Item 33). The energy stored in the batteries is then passed through an inverter or inverters (Item 34) to condition the energy transmission to a distribution point. As the energy is passed to a distribution point the electricity provided to that point is gauged via the use of an electricity meter (Item 35). Distribution points that may be delivered to include the utility grid (Item 81), a vehicle (Item 82), direct distribution to a business or home (Item 83), hydrogen electrolysis and storage facility or a battery storage facility (Item 84).

Figure 14:
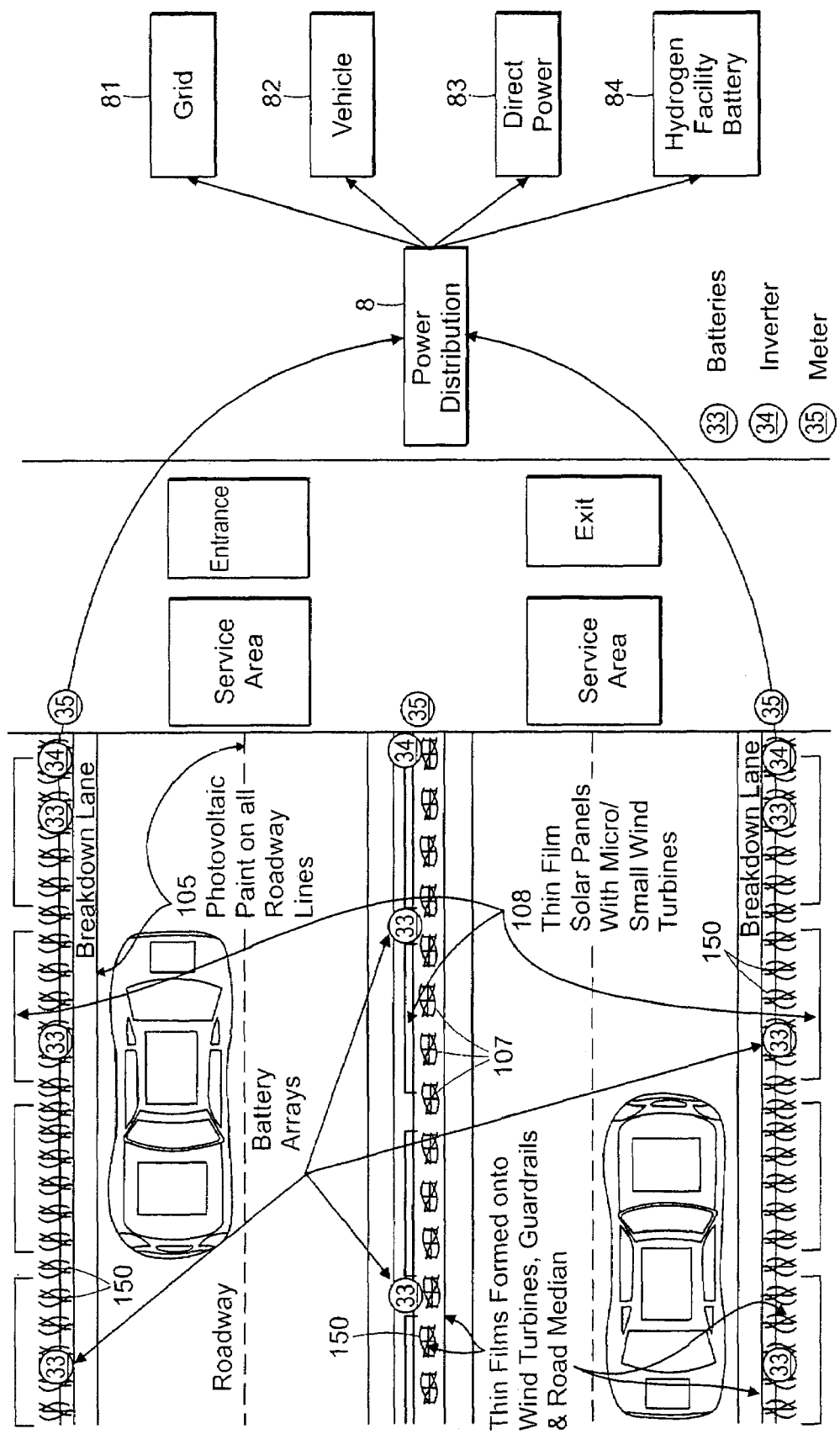
FIG. 14 illustrates the integration of both wind and solar energy gathering systems in tandem implementation along a roadway system.

FIG. 14 illustrates the integration of both wind and solar energy gathering systems in tandem implementation along a roadway system. The system includes installations of both wind and solar systems side by side, next to and even within energy gathering devices. Wind energy generating devices are implemented in stratum layered design along the median and breakdown lanes of a roadway (Item 150). Power generated from the devices is passed to battery arrays (Item 33), then inverters (Item 34) and registered through meters (Item 35) before being distributed (Item 8) to the grid, direct power of homes or businesses, powering of automobiles or stored in auxiliary battery arrays or stored by converting to hydrogen using an electrolysis process and held until the power is needed at such times that would include emergencies or strategically held to be sold to the grid system or direct distribution uses at peak demand times. Wind energy generating devices may also be covered with solar energy generating devices, that is, they may be covered with solar gathering materials such as thin films or spray on solar power cells ("solar paint") that may be molded to parts of the device that do not interfere with the turbines fundamental operation (Item 107). Thin film solar panels may also be combined with small, for example, micrometer sized wind energy generating devices (Item 108). The solar energy that is gathered can either by used to power the wind energy generating device, for example, helix-type wind turbine generator directly when wind power is not available, or make the turbine of the helix-type wind turbine generator spin faster when wind is available, or the gathered solar power is fed to the central rod and carried down the base of the turbine where it is channeled via wiring typical to the industry into a battery pack or battery array deployment (Item 33), then to an inverter (Item 34), meter (Item 35) and then distributed as discussed above. The wind system is part of a complimentary installation where designed areas are allotted for both wind and solar power systems implementation along roadways. The solar system alongside the wind system is comprised of one or more solar gathering devices such as solar panels, solar films with backing and solar spray on power cells are installed along a roadway in a contiguous or semi-contiguous configuration. The solar energy generating devices are then networked via wiring and input and output connections to efficiently take advantage of batteries and battery arrays as are standard in the solar energy gathering industry (Item 33).

Figure 16:
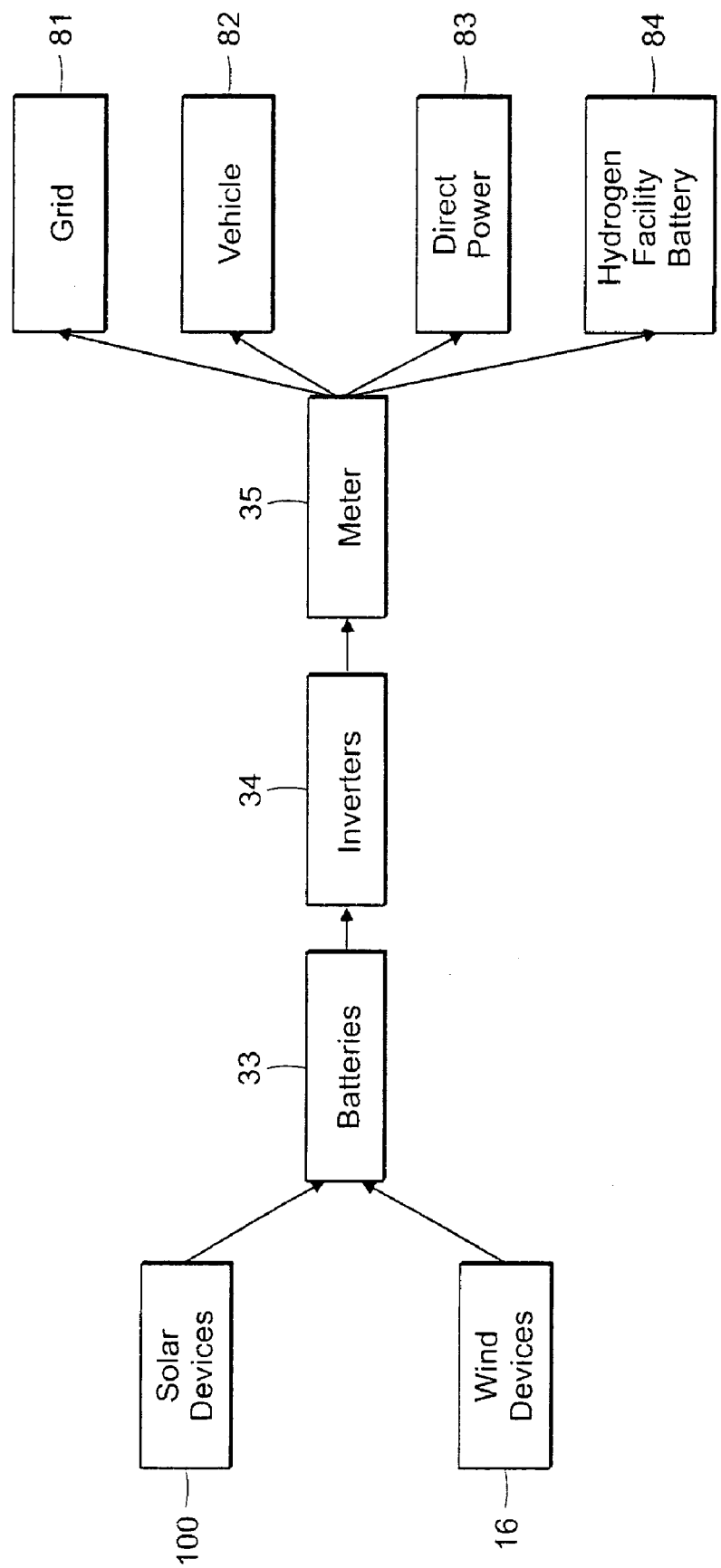
FIG. 16 illustrates a flow chart where both wind and solar energy gathering devices are implemented together.

FIG. 16 illustrates a flow chart where both wind (Item 16) and solar energy generating devices (Item 100) as described in FIGS. 14 transfer their energy to batteries (Item 33) then to inverters (Item 34) then registering the amount of energy via the meters (Item 35) before being distributed to the utility grid (Item 81), vehicles (Item 82), direct distribution of homes and businesses (Item 83) or utilized as stored energy via large battery arrays or via conversion to hydrogen to be held in compressed tanks via the creation of hydrogen via electrolysis (Item 84).

Figure 17A:
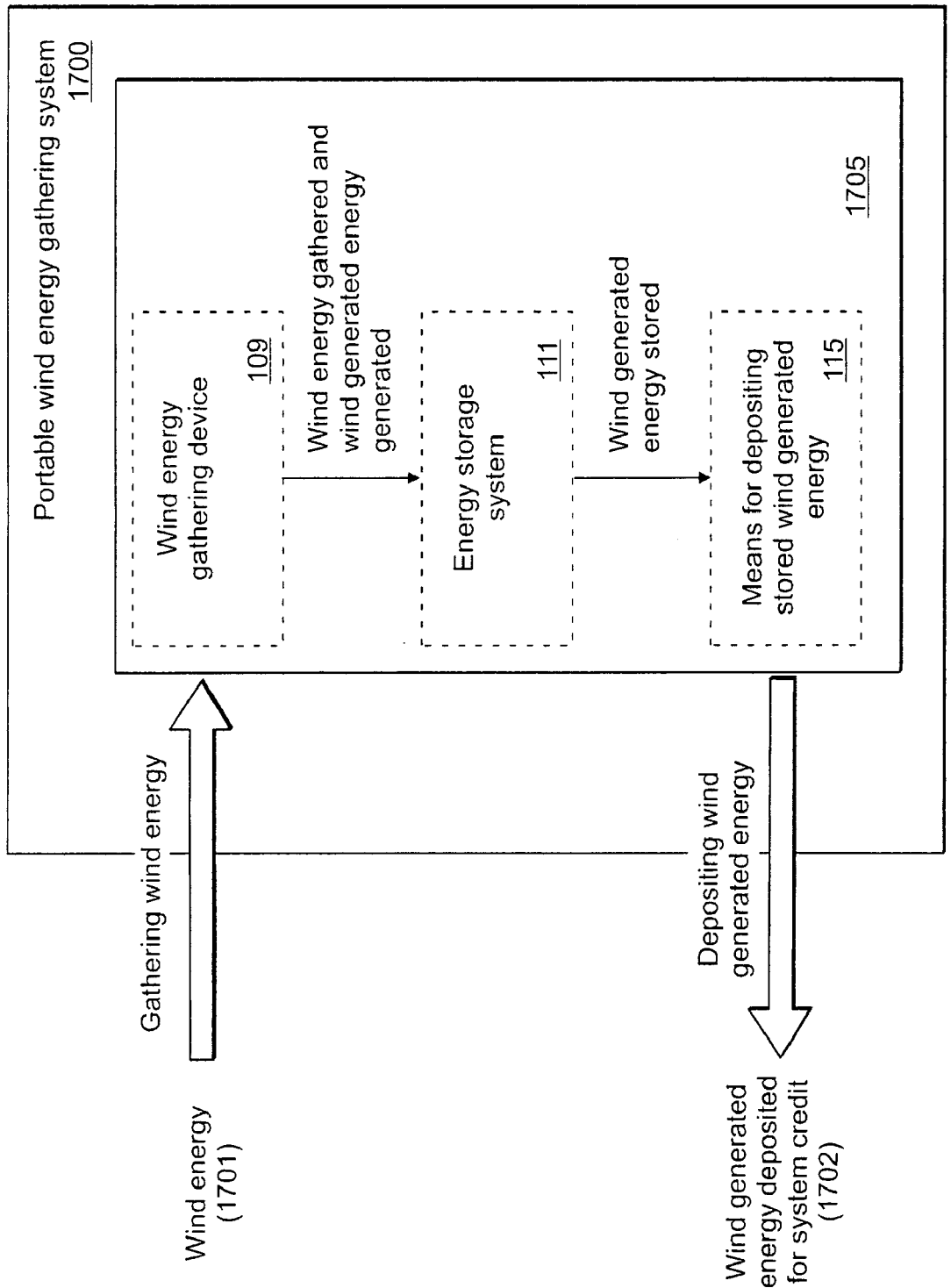
FIG. 17A is a block diagram of an example portable wind energy gathering system in accordance with an embodiment of the present invention.

FIG. 17A illustrates an example portable wind energy gathering system (Item 1700) to gather wind energy and deposit wind generated energy for system credit. The portable wind energy gathering system (Item 1700) includes a wind energy gathering device (Item 109), an energy storage system (Item 111), means for depositing the stored wind generated energy for system credit (Item 115), and a configuration (Item 1705) of any one or combination (denoted by broken lines) of the wind energy gathering device (Item 109), the energy storage system (Item 111), and the means for depositing (Item 115). The configuration (Item 1705) is adapted to be "portable" or otherwise at least capable of being movable from a first location to a second location.

The first location and the second location themselves may or may not be capable of being movable. For example, the configuration (Item 1705) is adapted to be movable from a first house (first location) to a second house (second location). In another example, the configuration (Item 1705) is adapted to be movable from a house (first location) to a vehicle (second location) and vice versa. In yet another example, the configuration (Item 1705) is adapted to be movable from a first vehicle (first location) to a second vehicle (second location). The capability of being movable from a first location to a second location is but one characteristic of portability. Other characteristics of portability are also considered by embodiments of the present invention.

For example, the portable wind energy gathering system (Item 1700) may be designed or otherwise configured to be removed from a first location (e.g., a first vehicle) and installed in a second location (e.g., a second vehicle) with little or no training or technical skill. For example, written or graphical instructions alone are sufficient to install and remove the portable wind energy gathering system (Item 1700). Aids, such as color coded connectors and labels, may further reduce the level of training or skill required to install and to remove the portable system (Item 1700).

Furthermore, the portable wind energy gathering system (Item 1700) may be designed or otherwise configured to be removed from a first location and installed in a second location with common or "household" tools, such as a screwdriver and wrench(es). In some instances, the portable wind energy gathering system (Item 1700) may be installed and removed using no tools at all, e.g., the portable wind energy gathering system (Item 1700) is installed and removed with thumb screws, hook and loop fasteners, and the like.

In another example, the portable wind energy gathering system (Item 1700) may be designed or otherwise configured to be readily movable from one location to another location. This may be achieved, for example, by dimensioning, both in size and in weight, the portable wind energy gathering system (Item 1700). For example, the portable wind energy gathering system (Item 1700) is of a weight and size that 90 percent of adults are capable of moving.

In yet another example, the portable wind energy gathering system (Item 1700) may be designed or otherwise configured in such a manner which "invites" the portable system (Item 1700) to be moved from a first location to a second location. For example, removing the portable wind energy gathering system (Item 1700) from a first location and installing the portable wind energy gathering system (Item 1700) in a second location does not require a substantial amount of time, e.g., within a minute or two. In another example, the portable wind energy gathering system (Item 1700) may be "ruggedized" or otherwise constructed to withstand being moved from a first location to a second location.

The above is not intended to be an exhaustive list of characteristics of portability. Nor is the above intended to suggest that a portable wind energy gathering system necessarily possess all of the above characteristics of portability. The above is intended, however, to highlight the distinction between a wind energy gathering system which is adapted to be at least movable from a first location to a second location and a wind energy gathering system which is not. One skilled in the art will readily recognize that this distinction is not lost, but comprehends additional characteristics of portability.

Continuing with FIG. 17A, the configuration (Item 1705) is adapted to be "portable" or otherwise at least capable of being movable from a first location to a second location. In this way, the wind energy gathering device (Item 109), the energy storage system (Item 111), and the means for depositing the stored wind generated energy for system credit (Item 115) of the portable wind energy gathering system (Item 1700), alone or in combination, may be adapted to at least be movable from a first location to a second location, for example, from a first vehicle to a second vehicle (discussed later in greater detail).

In operation, wind or wind energy (Item 1701) is gathered by the wind energy gathering device (Item 109). In turn, the device (Item 109) generates wind generated energy. That is, the wind energy gathering device (Item 109) transforms or otherwise converts the wind energy (Item 1701) into wind generated energy, such as electricity. The wind energy gathering device (Item 109) passes the wind generated energy to the energy storage system (Item 111). The energy storage system (Item 111) stores the wind generated energy generated from the wind energy gathering device (Item 109). The stored wind generated energy is deposited by the means (Item 115) for depositing the stored wind generated energy for system credit. Preferably the deposited wind generated energy (Item 1702) is in a form readily available for downloading, storing or transmitting to a utility (or power) grid, to name a few example forms.

Any combination of the wind energy gathering device (Item 109), the energy storage system (Item 111), the means for depositing the stored wind generated energy for system credit (Item 115), and/or the configuration (Item 1705) may be provided to a participant of the portable wind energy gathering system (Item 1700) for little or substantially no cost. For example, the above are provided to the participant for some fraction of the total cost of the above or even for free. In yet another example, some portion of the system credit "earned" by depositing the stored wind generated energy is applied toward the cost of the above.

Alternatively, in lieu of paying for the above, a deposit may be secured from the participant of the portable wind energy gathering system (Item 1700) to secure the safe return of the wind energy gathering device (Item 109), the energy storage system (Item 111), the means for depositing the stored wind generated energy for system credit (Item 115), or the configuration (Item 1705). Such a deposit may be secured through the participant's financial institution or via a cash deposit.

In this way, participants of the portable wind energy gathering system (Item 1700) may not need to spend significant financial resources (e.g., to purchase equipment) in order to gather wind energy and deposit wind generated energy for system credit. Moreover, participants of the portable wind energy gathering system (Item 1700) may be motivated or otherwise given an incentive to participate in the portable wind energy gathering system (Item 1700).

The system credit may be reimbursed or otherwise credited to the participant of the portable wind energy gathering system (Item 1700) in the form of a toll fee credit, cash payment, credit at a participating business, municipal or governmental tax/fee credit, other public utilities/public works credit, or the like. For example, the system credit may be credited toward the participant's existing account with an electronic toll system, such as FASTLANE or EZPASS. Alternatively, the system credit may be credited toward the participant's account which is monitored and maintained separately from such an electronic toll system. For example, the participant of the portable wind energy gathering system (Item 1700) may use the system credit as credit in transactions with a power company, a consumer goods company or a financial institution.

One skilled in the art will readily recognize that the principles of the present invention are not limited to the examples presented above, but may include other forms of system credit. For example, the participant of the portable wind energy gathering system (Item 1700) may be credited with a combination of one or more of the above examples.

In addition to the participant, the system credit may be divided or otherwise shared with partners of the portable wind energy gathering system (Item 1700). For example, the system credit may be apportioned between a company owning the equipment for the portable wind energy gathering system (Item 1700) (e.g. the wind energy gathering device (Item 109), the energy storage system (Item 111), the means for depositing the stored wind energy for system credit (Item 115), or the configuration (Item 1705)) and a company installing such equipment for the participant's use, such as onto the participant's vehicle. The system credit may be apportioned to additional partners, such as a municipality or a state highway department. The system credit may also be apportioned to fewer partners. For example, rather than separate companies, a single company both owns and installs the equipment for the portable energy gathering system (Item 1700). As such, the portable wind energy gathering system (Item 1700) creates a format for wide-scale distribution of wind energy gathering devices with the potential of having millions of participants.

Figure 17B:
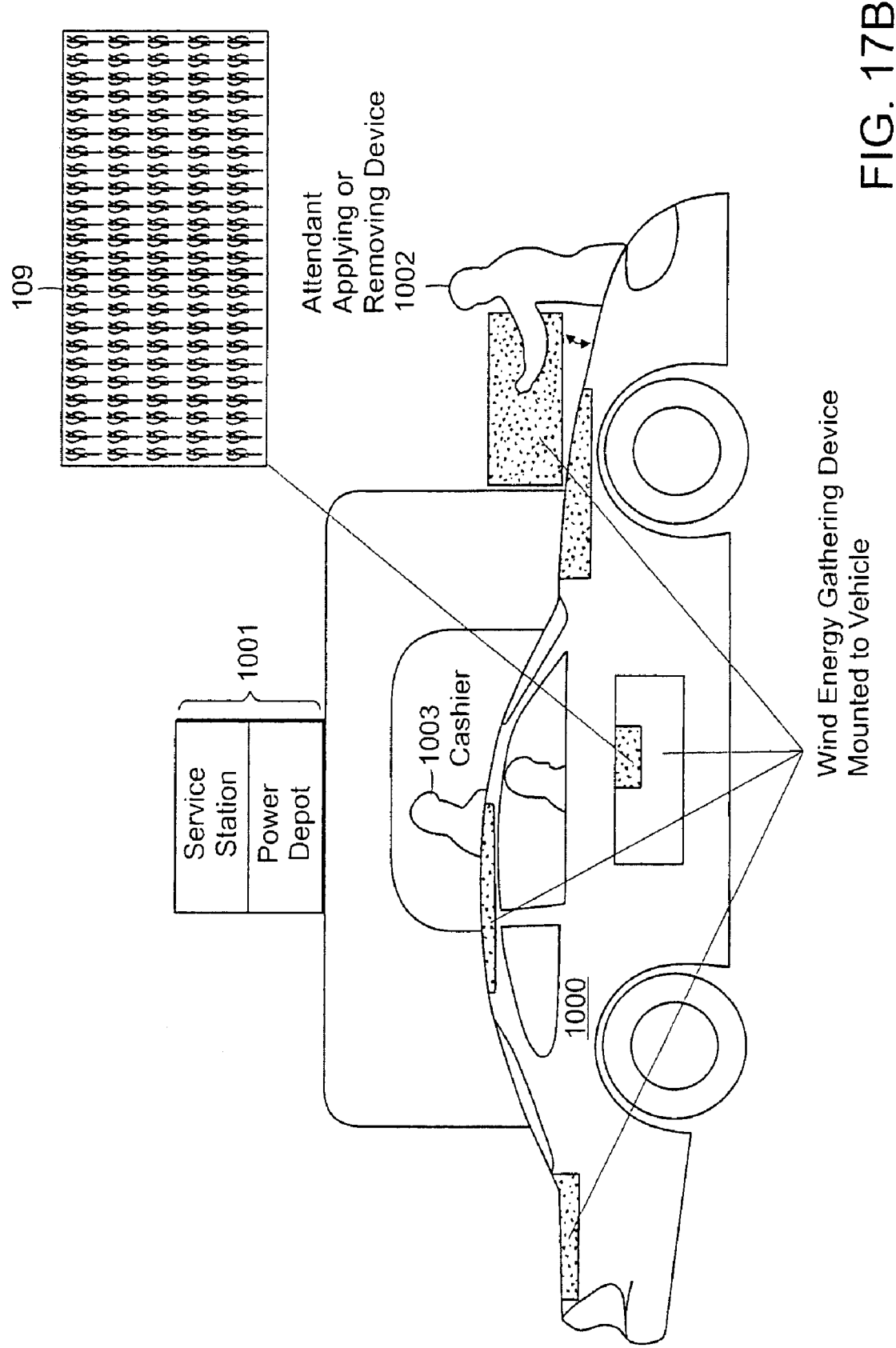
FIG. 17B is a diagram of example implementations of a portable wind energy gathering system in accordance with embodiments of the present invention.

FIG. 17B illustrates example implementations of the portable wind energy gathering system (Items 1700a, 1700b, and 1700c, generally 1700). In FIG. 17B, hand (Item 1712) and handle (Item 1713) are merely representative of the invention wind energy gathering system (Item 1700) being "portable." That is, the portable system (Item 1700) is at least capable of being moved from a first location to a second location. As discussed above, embodiments of the present invention contemplate other characteristics of portability, such as ease of installing and removing the portable system (Item 1700). The handle (Item 1713) is not intended to limit embodiments of the present invention to such a handle. Nor is the hand (Item 1712) intended to limit embodiments of the present invention to a scale suggested by the hand (Item 1712). Rather, the hand (Item 1712) and the handle (Item 1713) are intended to signify that the portable system (Item 1700) is portable and to distinguish the portable system (Item 1700) from other systems which are not portable.

The portable wind energy gathering system (item 1700*a*) includes a configuration (1705*a*) which is adapted to be portable. The configuration (item 1705*a*) is a combination of the wind energy gathering device (Item 109), the energy storage system (Item 111), and the means for depositing stored wind generated energy for system credit (not shown). As such, the combination of the wind energy gathering device (Item 109), the energy storage system (Item 111), and the means for depositing stored wind generated energy for system credit may at least be moved from a first location to a second location. In this way, the portable wind energy gathering system (item 1700*a*) includes a combination whose members are themselves adapted to at least be movable from a first location to a second location.

While the configuration (Item 1705*a*) of the portable wind energy gathering system (item 1700*a*) is illustrated as configured or otherwise packaged into a "single unit," one skilled in the art will readily recognize that the system (item 1700*a*) remains portable regardless of how the configuration (Item 1705*a*) is physically packaged. In this alternative, the portable system (item 1700*a*) is portable because the configuration (Item 1705*a*), i.e., the combination of the wind energy gathering device (item 109), the energy storage system (item 111) and the means for depositing stored wind generated energy for system credit are themselves portable regardless of being physically packaged into a single unit.

The portable wind energy gathering system (Item 1700*b*) includes a configuration (Item 1705*b*) which is adapted to be portable. The configuration (Item 1705*b*) includes the energy gathering system (Item 111). Unlike the previous alternative, the configuration (Item 1705*b*) does not include the wind energy gathering system (Item 109), nor does it include the means for depositing stored wind generated energy for system credit (not shown). As such, the energy storage system (Item 111) is adapted to at least be movable from a first location to a second location, while the wind energy gathering device (item 109) and the means for depositing stored wind generated energy for system credit are not.

The portable wind energy gathering system (Item 1700*c*) includes a configuration (Item 1705*c*) which is adapted to be portable. The configuration (Item 1705*c*) includes the wind energy gathering device (Item 111). Unlike the previous alternative, the configuration (Item 1705*c*) does not include the energy storage system (Item 111), nor does it include the means for depositing stored wind generated energy for system credit (not shown). As such, the wind energy gathering device (Item 111) is adapted to at least be movable from a first location to second location, while the energy storage system (item 109) and the means for depositing stored wind generated energy for system credit are not.

In this way, a portable wind energy gathering system includes a configuration of any one or combination of a wind energy gathering device, energy storage system, and means for depositing stored wind generated energy for system credit. Moreover, the configuration is adapted to at least be movable from a first location to a second location.

In some instances, the first location is a first vehicle and the second location is a second vehicle. Additionally, some or all of the elements of a portable wind energy gathering system are removably affixed to a vehicle. In such instances, the portable wind energy gathering system may be said to be vehicle-based. That is to say, a wind energy gathering system, which is both portable and vehicle-based, is a system capable of at least being movable from a first vehicle to a second vehicle and is removably affixed to the vehicles.

Consider the following example of a family having a first vehicle, a second vehicle and a vehicle-based portable wind energy gathering system. The family may install the vehicle-based portable wind energy gathering system onto the first vehicle by removing the portable system from the second vehicle. This arrangement is advantageous, for example, in instances where one vehicle is primarily used.

Figure 17C:
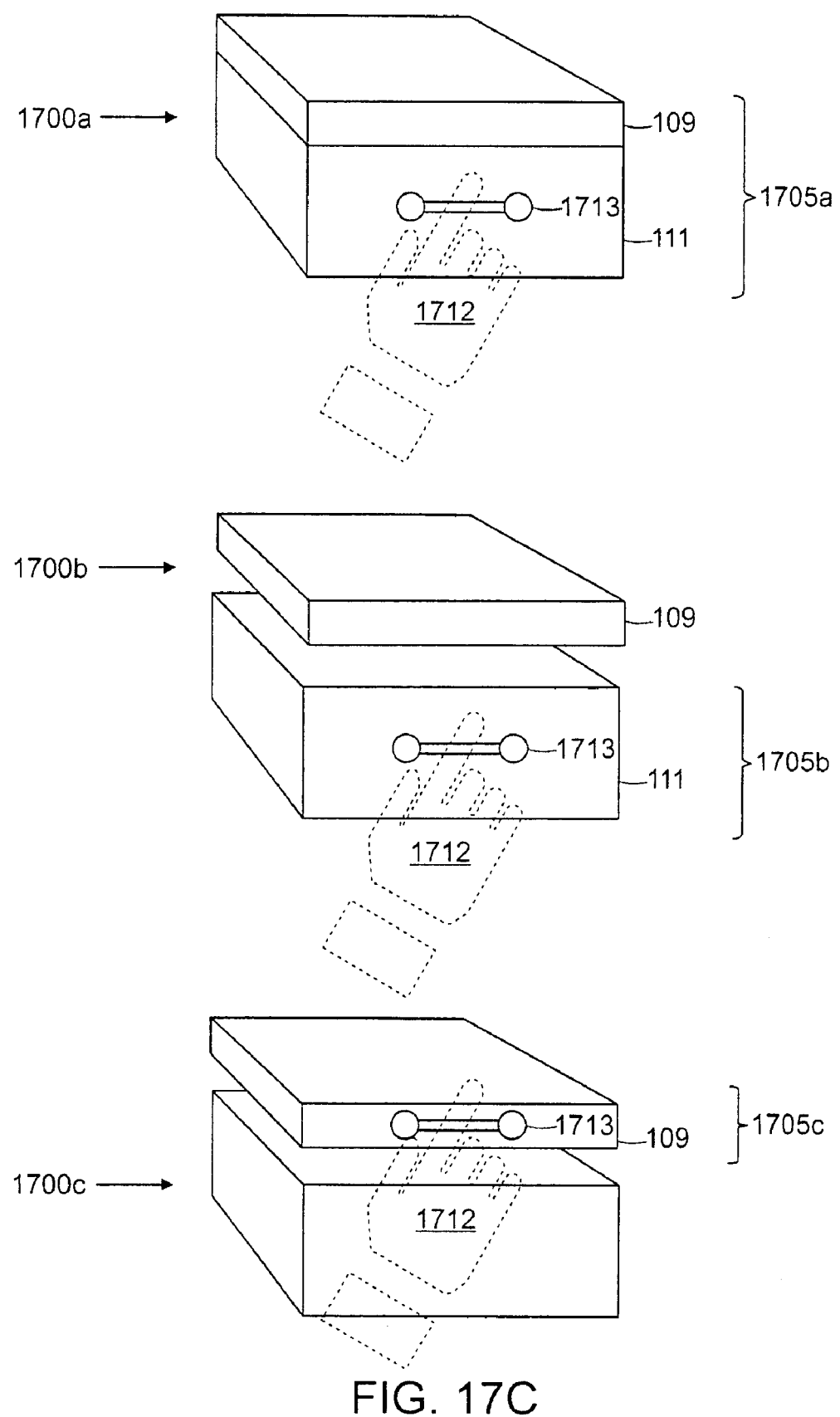
FIG. 17C is a diagram of an example implementation and installation of a portable wind energy gathering system which is removably affixed to a vehicle, in accordance with an embodiment of the present invention.

FIG. 17C illustrates an example implementation and installation of a portable wind energy gathering system (Item 1700) which is vehicle-based or otherwise removably affixed to a vehicle and is at least capable of being moved from a first vehicle to a second vehicle.

In this example, the configuration (Item 1705) of the portable wind energy gathering system includes the wind energy gathering device (Item 109), such as a small helix wind turbine vehicle installation sheet(s). The configuration (Item 1705) is removably affixed to or otherwise installed on a vehicle (Item 1000), for example, an automobile. As such, the wind energy gathering device (Item 109) is itself removably affixed to the vehicle (Item 1000) and is adapted to at least be moved from a first vehicle to a second vehicle.

In contrast, in this example, the configuration (Item 1705) does not include an energy storage system and means for depositing stored energy for system credit. Accordingly, the energy storage system and the means for depositing stored energy for system credit are not removably affixed to the vehicle (Item 1000), nor adapted to at least be moved from a first vehicle to a second vehicle. For example, these elements of the portable wind energy gathering system (Item 1700) may be integrated into the vehicle (Item 1700) or otherwise not readily removed.

The configuration (Item 1705) is installed at an authorized service station and power depot (Item 1001) by a trained service center attendant (Item 1002). The authorized service station and power depot (Item 1001) may be located at a toll booth, rest area, exit or other convenient location with cashiers (Item 1003) for making energy credit, etc. transactions.

In another example, once a vehicle and/or an owner (or a participant) is registered with the portable wind energy gathering system (Item 1700) which is vehicle-based, the configuration (Item 1705) of any one or combination of the wind energy gathering device, the energy storage system, and the means for depositing stored energy for system credit may be self-installed by the participant. As such, one or more elements of the vehicle-based portable wind energy gathering device may in some instances be configured or otherwise adapted to be installed by the participant of the vehicle-based portable wind energy gathering system (Item 1700).

Figure 18:
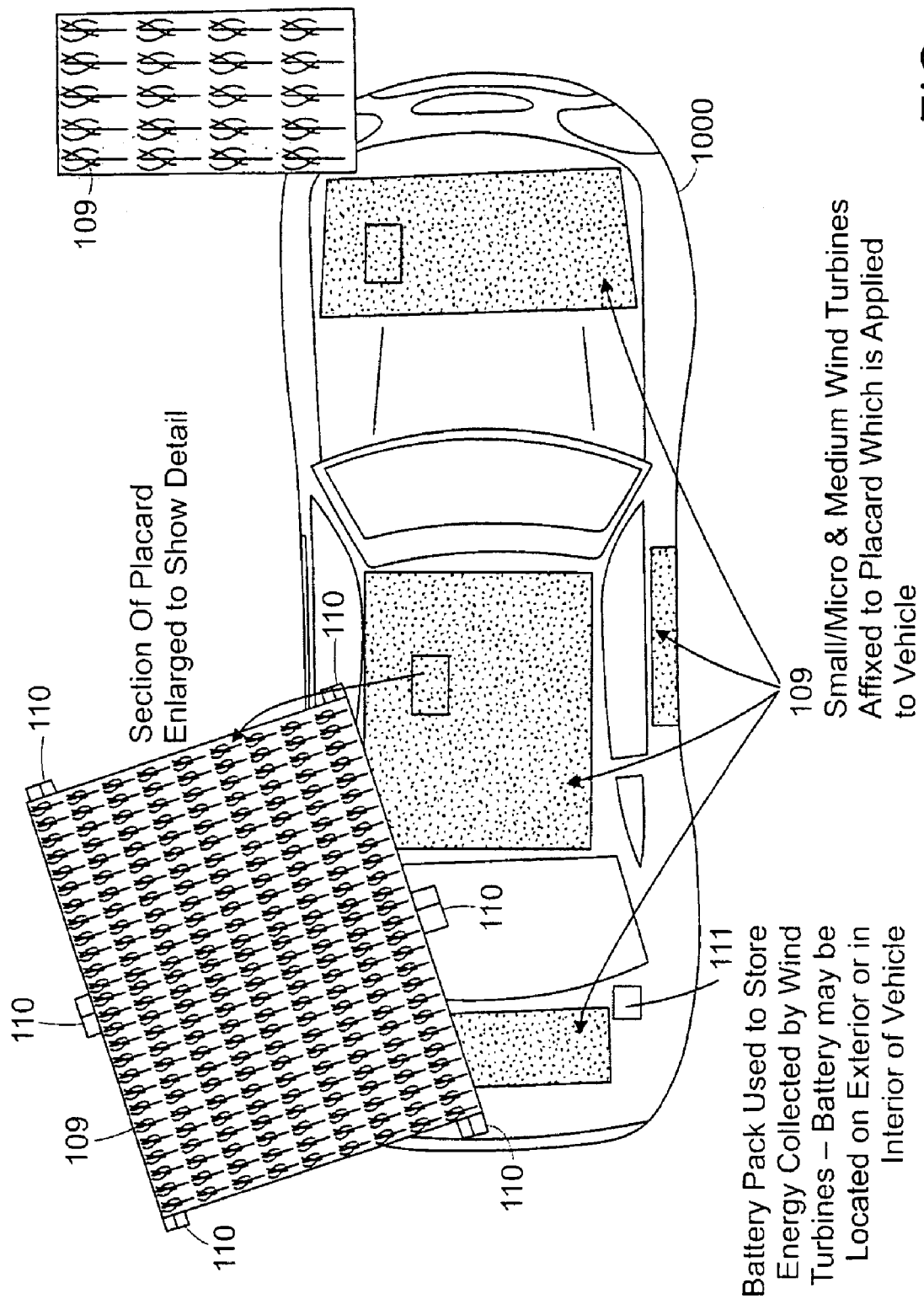
FIG. 18 illustrates small helix wind turbine vehicle installation sheets or placards being removably affixed to a vehicle.

FIG. 18 illustrates removably affixing the configuration (Item 1705) of the portable wind energy gathering system (Item 1700) on the vehicle (Item 1000). In this example, the configuration (Item 1705) includes the wind energy gathering device (Item 109), such as a small helix wind turbine vehicle installation sheet(s). The configuration (Item 1705) is removably affixed to or otherwise installed on the vehicle (Item 1000) via snap-on clips (Item 110) for example.

While not shown, the configuration (Item 1705) may also be removably affixed to the vehicle (Item 1000) via an adhesive, magnetic bonding, suction, bonding by a static electric charge between the surface of the vehicle (Item 1000) and the configuration (Item 1705), hook and loop fastener, a locking screw mounting system which is either permanently or removably mounted during the vehicle manufacturing process, overlay bracing or other means for removably affixing the configuration (Item 1705) to the vehicle (Item 1000). In this way, some elements of the vehicle-based portable wind energy gathering system (Item 1700), such as the wind energy gathering device (item 109), are removably affixed to a vehicle, while other elements are not. Furthermore, the configuration (Item 1705) may be installed on the top, bottom or sides of the vehicle (Item 1000).

In the case of the wind energy gathering device (Item 109) being small helix wind turbine vehicle installation sheets or placards, each vehicle installation sheet or placard may be occupied by or otherwise secure one or more small helix wind turbines. Individually, each small helix wind turbines may be as small as a micron or as large as two feet in length. As such, in some instances, each vehicle installation sheet or placard may be occupied by numerous (e.g., millions) small helix wind turbines. In this way, the small helix wind turbine vehicle installation sheet or placard provides a convenient and manageable way of removably affixing one or more small helix wind turbines to a vehicle.

The portable wind energy gathering system (Item 1700), or one or more elements of the portable system, such as the wind energy gathering device (Item 109), may be adapted to gather wind energy from or created from a variety of sources.

Consider the example of the portable wind energy gathering system (Item 1700) being vehicle-based or otherwise removably affixed to the vehicle (Item 1000) and adapted to at least be moved from a first vehicle to a second vehicle. In this example, the wind energy gathering device (109) of the portable wind energy gathering system (Item 1700) may be adapted to gather wind energy typically experienced by a vehicle.

So called "dirty wind" energy may be created by the movement of a vehicle to which the portable wind energy gathering system (Item 1700) is removably affixed. Alternatively, the dirty wind energy may be created by the movement of another vehicle or vehicles passing by the vehicle to which the portable wind energy gathering system (Item 1700) is removably affixed. As such, a portable wind energy gathering system (Item 1700) which is vehicle-based is adapted to gather wind energy created by the movement of at least one vehicle.

Additionally, the wind energy gathering device (109) of the portable wind energy gathering system (Item 1700) may be adapted to gather wind energy which is naturally occurring (e.g., atmospheric wind). In this way, wind energy is gathered (and thus wind generated energy is generated) even when a vehicle, to which the portable wind energy gathering system (Item 1700) is removably affixed to, is not moving or is otherwise stationary.

Furthermore, the wind energy gathering device (Item 109) of the portable wind energy gathering system (Item 1700) may be adapted to gather wind energy from incident wind, i.e., air movement or current falling or striking the wind energy gathering device (Item 109) or some portion of the wind energy gathering device (Item 109). For example, wind energy may be gathered from a main current of air, such as air moving along the line of travel of a vehicle, striking the wind energy gathering device (Item 109) or some portion of the wind energy gathering device (Item 109). In another example, wind energy may be gathered from a current of air moving contrary to a main current of air (i.e., an eddy) striking the wind energy gathering device (Item 109) or some portion of the wind energy gathering device (Item 109).

Wind or more precisely a current of air may be infinitely divided into smaller currents of air. Furthermore, each individual current of air may be characterized with a directional vector, velocity and other physical characteristics. As such, one skilled in the art will readily recognize principles of the present invention contemplate such individual currents of air and characteristics. For example, while it may be perceived at the human scale that air is not moving, at the granularity of an individual air current, air may nevertheless be moving from which wind energy may be gathered.

Accordingly, wind energy gathered from any combination of sources, such as atmospheric wind, air movement caused by other vehicles or objects, and air movement caused by a moving vehicle to which a portable wind energy gathering device is removably affixed, as well as wind energy gathered from incident wind striking a wind energy gathering device or some portion of the wind energy gathering device is suitable for the present invention.

One skilled in the art will readily recognize that the above discussion of gathering wind energy from or created from a variety of sources applies to a similar extent to a portable wind energy gathering system which is not vehicle-based. For example, a portable wind energy gathering system capable of being moved from a first roadside location to a second roadside location may be adapted to gather wind energy created by any combination of atmospheric wind and air movement caused by other objects, such as passing vehicles. The portable wind energy gathering system may also be adapted to gather wind energy from incident wind striking a wind energy gathering device or some portion of the wind energy gathering device.

Furthermore, the portable wind energy gathering system may be adapted to gather wind energy created from the act of porting or otherwise relocating the portable wind energy gathering system from the a location to a second location. Consider the example where the portable wind energy gathering system is being moved from a house (first location) to a vehicle (second location). While relocating the portable wind energy gathering system from the house to the vehicle, wind energy caused by the relocation may be gathered and wind generated energy may be generated. In addition, wind energy created from, for example, atmospheric wind, passing objects or incident wind striking the portable wind energy gathering system, may also be gathered. In this way, a portable wind energy gathering system may not only gather wind energy and generate wind generated energy at a first and second location, but also while the portable system is being relocated from the first location to the second location.

In addition to being adapted to at least be moved from a first location to a second location, the portable wind energy gathering system may be further adapted or otherwise configured to be relocated via a carrying device, such as a trailer, wheelbarrow, dolly or the like. Consider the following example where the portable wind energy gathering system is being moved from a field (first location) to a house (second location) via a wheelbarrow. In addition to gathering wind energy and generating wind generated energy in the field and at the house, the same is being done while relocating the portable wind energy gathering system from the field to the house.

Wind generated energy generated by the portable wind energy gathering system (Item 1700) is stored by the energy storage system (Item 111), such as a battery or an array of batteries. The energy storage systems (Item 111) may be a "dry cell" battery, a "wet cell" battery, a "gel cell" battery, a fuel cell battery or a battery according to other battery technologies as is known in the art. The energy storage systems (Item 111) may also be, for example, a nanobattery or a battery employing technology at a scale of miniscule particles measuring less than 100 nanometers. The energy storage system (Item 111) may be located in the interior, exterior, trunk, underbelly, or under the hood of the vehicle (Item 1000).

Figure 19:
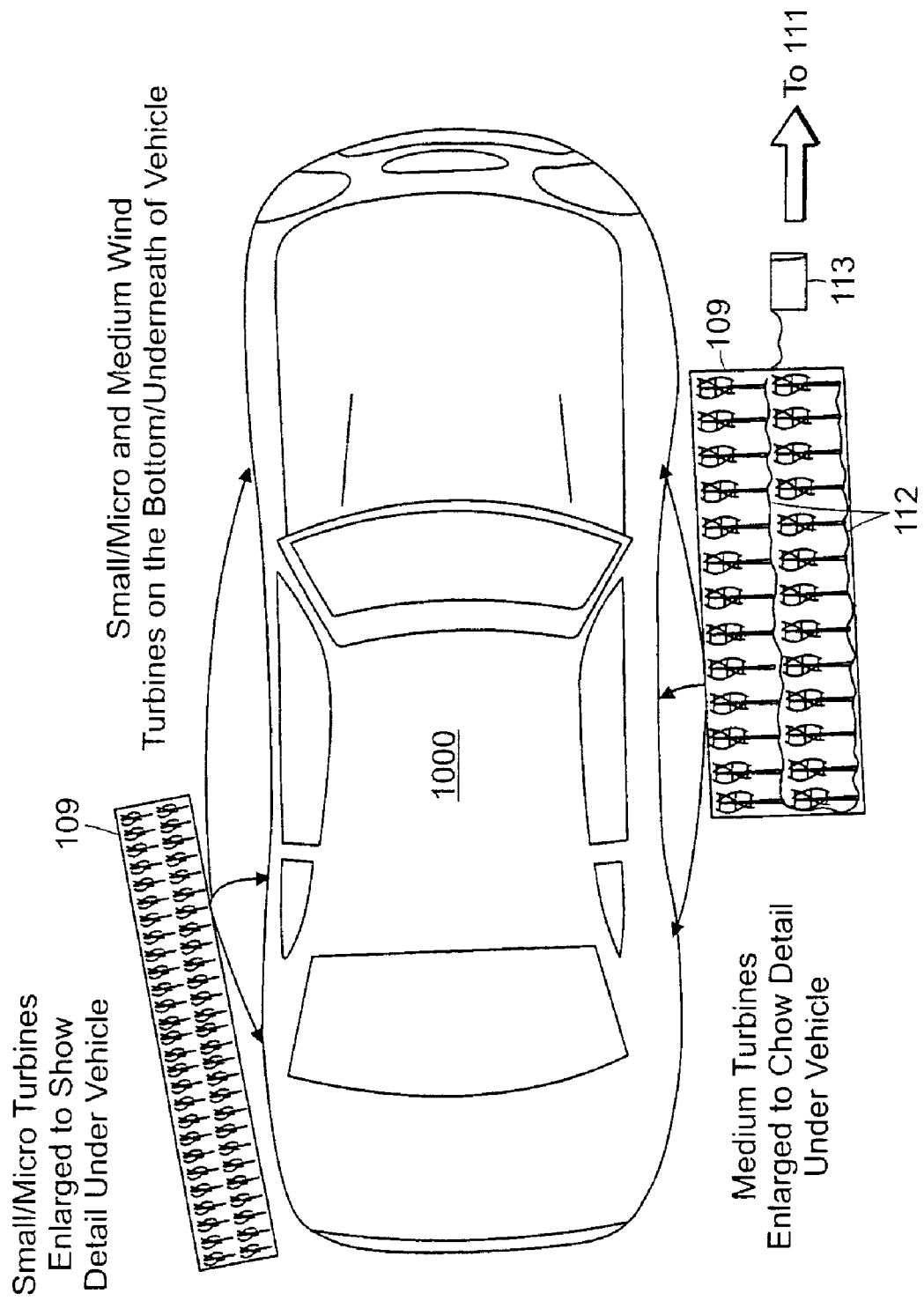
FIG. 19 illustrates small helix wind turbine vehicle installation sheets or placards removably affixed to other areas of a vehicle besides the top in accordance with an embodiment of the present invention.

FIG. 19 illustrates that the wind energy gathering device (Item 109) of the portable wind energy gathering system (Item 1700), such as small helix wind turbine vehicle installation sheets or placards, may be mounted on other areas of a vehicle (Item 1000) besides the top, such as the bottom or underbelly of the vehicle (Item 1000). The lack of uniform wind energy and the presence of "dirty wind" energy make the use of the wind energy gathering device (Item 109) advantageous and efficient for gathering wind energy from different areas of a moving vehicle.

In the example illustrated by FIG. 19, the small helix wind turbine vehicle installation sheet or placard, in addition to securing individual small helix wind turbines also forms a matrices grid of wiring (Item 112). The matrices grid of wiring (Item 112) is comprised of wiring taken from each individual small helix wind turbine. The matrices grid of wiring from each small helix wind turbine is delivered by one integrated wired output connection (Item 113) or wiring harness to the energy storage system (Item 111).

FIG. 20 illustrates an overhead view of vehicles (Item 1000a and 1000b) deployed with the wind energy gathering device (Item 109), such as small helix wind turbine vehicle installation sheets or placards. FIG. 20 further illustrates a detailed view of the wind energy gathering device (Item 109).

In operation, as the vehicle (Item 1000a) travels along a roadway, the vehicle (Item 1000a) gathers wind energy and generates wind generated energy. The wind generated energy is locally stored in the energy storage system (Item 111) of the vehicle (Item 1000a). The stored wind generated energy is deposited for system credit using a means for depositing the stored wind generated energy for system credit.

In the example illustrated in FIG. 20, the vehicle 1000a passes through a toll booth service area (Item 1001) and deposits the stored wind generated energy by exchanging a charged battery with an uncharged battery (not shown). System credit is credited in an automated manner or by a cashier (Item 1003) of FIG. 17B according to an amount of wind generated energy deposited by the charged battery. As such, one means for depositing the stored wind generated energy for system credit is a first battery adapted to be readily exchanged with a second battery.

In some instances, while the first and second batteries are adapted to be readily exchanged, such batteries may not be adapted to be readily exchanged with a third battery, i.e., the third battery is incompatible with the first and second batteries. In this way, wind generated energy stored in a vehicle participating in a first vehicle-based portable wind energy gathering system may not be deposited in a second vehicle-based portable wind energy gathering system.

In other instances, batteries used to deposit stored wind generated energy are universally compatible (e.g., via an adapter or a converter) amongst various vehicle-based portable wind energy gathering systems. As such, stored wind generated energy may be deposited in a vehicle-based portable wind energy gathering system regardless of participation in a particular vehicle-based portable wind energy gathering system.

Another means for depositing stored wind generated energy for system credit is an electrical connector, such as a plug, socket, paddle, or combinations thereof through which stored wind generated energy is transferred, transmitted or otherwise deposited.

Yet another means for depositing stored wind generated energy for system credit is one or more elements of the vehicle (Item 1000a) adapted to be directly powered by wind generated energy. A participant is credited with system credit for the wind generated energy used or consumed by such elements of the vehicle (Item 1000a). In this way, participant is "rewarded" for consuming wind generated energy to power elements of the vehicle.

For example, an air conditioner of a vehicle is adapted to be directly powered by wind generated energy in addition to gasoline. The participant is rewarded system credit when the air conditioner is powered by wind generated energy and not by gasoline.

Yet another means for depositing the stored wind generated energy for system credit includes any combinations of one or more of the above examples. As such, stored wind generated energy may be deposited for system credit in one or more ways, thus providing flexibility and/or universality.

In addition to depositing stored wind generated energy, the toll booth service areas (Item 1001) may also install, remove or maintain a vehicle-based portable wind energy gathering system or one or more elements of the portable system, such as the wind energy gathering device (Item 109), the energy storage system (Item 111), and the means for depositing wind generated energy for system credit (e.g., the means 115 of FIG. 17A). The toll booth service areas (Item 1001) may also provide account information of vehicles and/or participants of the vehicle-based portable wind energy gathering system.

Figure 21A:
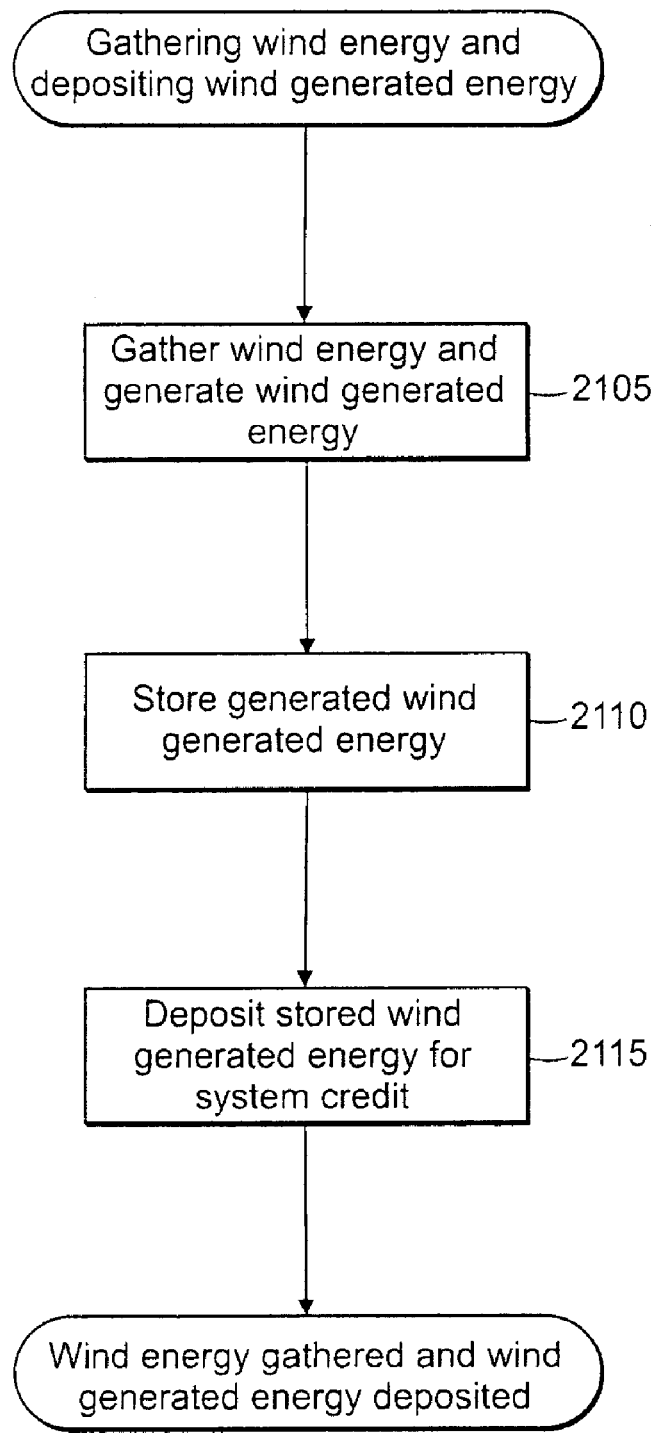
FIG. 21A is a flow chart for gathering wind energy and depositing wind generated energy for system credit in accordance with an embodiment (e.g., vehicle-based) of the present invention.

FIG. 21A illustrates an example process of the portable wind energy gathering system (Item 1700) for gathering wind energy and depositing wind generated energy for system credit. The portable system (Item 1700) gathers (Item 2105) wind energy and generates wind generated energy using a wind energy gathering device (e.g., Item 109 of FIG. 17A). The portable system (Item 1700) stores (Item 2110) the generated wind generated energy in a energy storage system (e.g., Item 111 of FIG. 17A). The portable system (Item 1700) deposits (Item 2115) the stored wind generated energy for system credit. Optionally, the portable system (Item 1700) configures (not shown) any one or combination of the wind energy gathering device, the energy storage system, and the means of depositing stored wind generated energy into a configuration adapted to at least be moved from a first location to a second location.

Figure 21B:
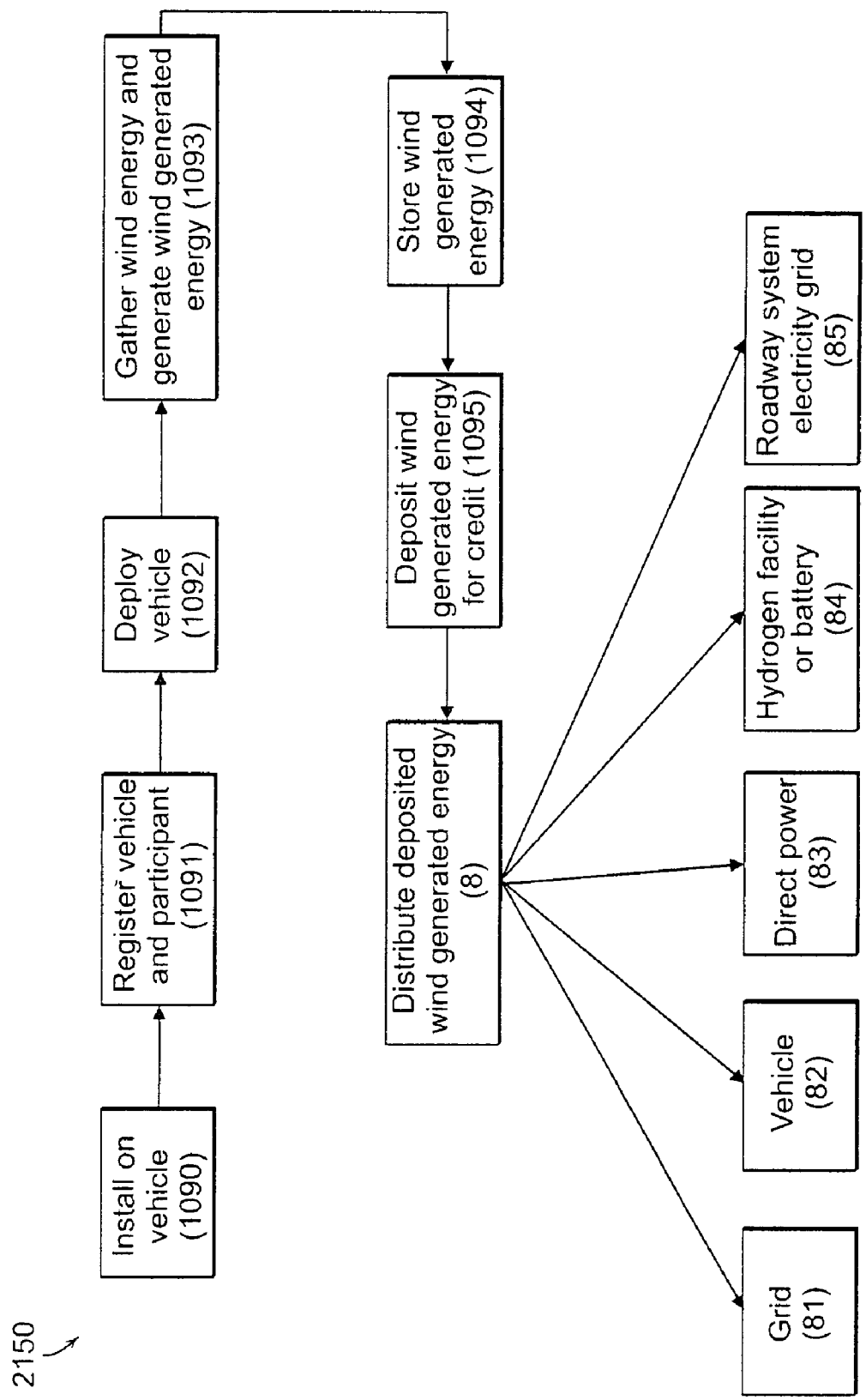
FIG. 21B is a flow chart for gathering wind energy and depositing wind generated energy for system credit in accordance with another embodiment of the present invention.

FIG. 21B illustrates an example process of another embodiment of the portable wind energy gathering system (Item 2150) for gathering wind energy and depositing wind generated energy for system credit. The example portable system (Item 2150) installs (Item 1090) a configuration of any one or combination of a wind energy gathering device (e.g., Item 109 of FIG. 17A), such as small helix wind turbine installation sheets or placards, a energy storage system (e.g., Item 111 of FIG. 17A), such as a battery or array of batteries, and means for depositing stored wind generated energy for system credit (e.g., Item 115 of FIG. 17A) into or onto a subject vehicle (e.g., Item 1000a of FIG. 20).

The example system (Item 2150) registers (Item 1091) the vehicle (Item 1000) and a participant (e.g., an owner of the vehicle) with the portable wind energy gathering system (Item 2150). The example portable system (Item 2150) deploys (Item 1092) the vehicle (Item 1000) onto a road or roadway system. The example portable system (Item 2150) gathers (Item 1093) wind energy and generates wind generated energy (or power) using the wind energy gathering device (e.g., Item 109 of FIG. 17A). The example portable system (Item 2150) stores (Item 1094) wind generated energy in the energy storage system (e.g., Item 111 of FIG. 17A).

The example portable system (Item 2150) deposits (Item 1095) the stored wind generated energy by turning in or exchanging the battery or the array of batteries at, for example, a service center (e.g., Item 1001 of FIG. 20). The example portable system (Item 2150) identifies (not shown)

the deposited wind generated energy as being deposited by the vehicle and/or the participant registered with the vehicle-based portable wind energy gathering system (Item 2150). The example portable system (Item 2150) credits the identified vehicle and/or participant.

The example portable system (Item 2150) distributes (Item 8) the deposited wind generated energy to, for example, a utility grid (Item 81). In the case of the example portable system (Item 2150) distributing (Item 8) the deposited wind generated energy to the utility grid (Item 81), the example portable system (Item 2150) power conditions (not shown) the wind generated energy using an inverter.

In another example, the example portable system (Item 2150) distributes (Item 8) the deposited wind generated energy directly to a vehicle (Item 82).

In yet another example, the example portable system (Item 2150) distributes (Item 8) the deposited wind generated energy directly to a business or home (Item 83), i.e., direct power.

In yet still another example, the example portable system (Item 2150) distributes (Item 8) the deposited wind generated energy to an auxiliary battery or array of batteries (Item 84) for energy storage or for hydrogen electrolysis.

In another example, the example portable system (Item 2150) distributes (Item 8) the deposited wind generated energy to a roadway system electricity grid (Item 85) described in the U.S. patent application Ser. No. 11/624,987 entitled "SYSTEM AND METHOD FOR CREATING A NETWORKED INFRASTRUCTURE DISTRIBUTION PLATFORM OF SOLAR ENERGY GATHERING DEVICES," filed Jan. 19, 2007, assigned to GENEDICS LLC, which is hereby incorporated by reference in its entirety.

Figure 22:
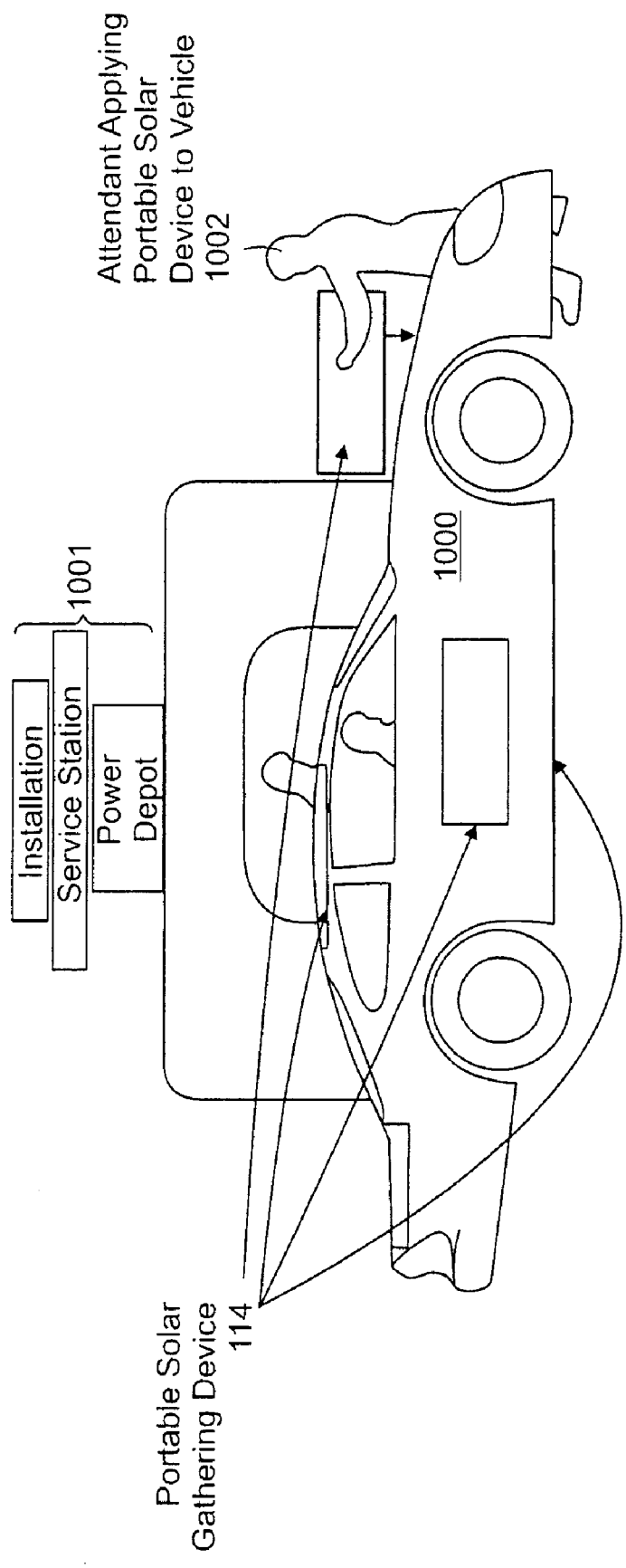
FIG. 22 illustrates the installation of a portable solar energy gathering system at a qualified service area.

FIG. 22 illustrates the installation of a portable solar energy gathering system (Item 114) at a qualified service area (Item 1001) installed on a vehicle (Item 1000) by a service center trained installer (Item 1002). The solar installation sheets (Item 114) may be affixed to the vehicle via snap on clips, adhesive, magnetic bonding, bonded by a static charge between the vehicle surface and the installation sheet, by a locking screw mounting system, permanently or removable installation of a mounting during the vehicle manufacturing process or overlay bracing. The battery to store the power or battery array may be on the interior, exterior, trunk or underbelly, or under the hood of the vehicle. The solar installation sheets may be mounted on the top, hood, trunk or sides of a vehicle.

Figure 23:
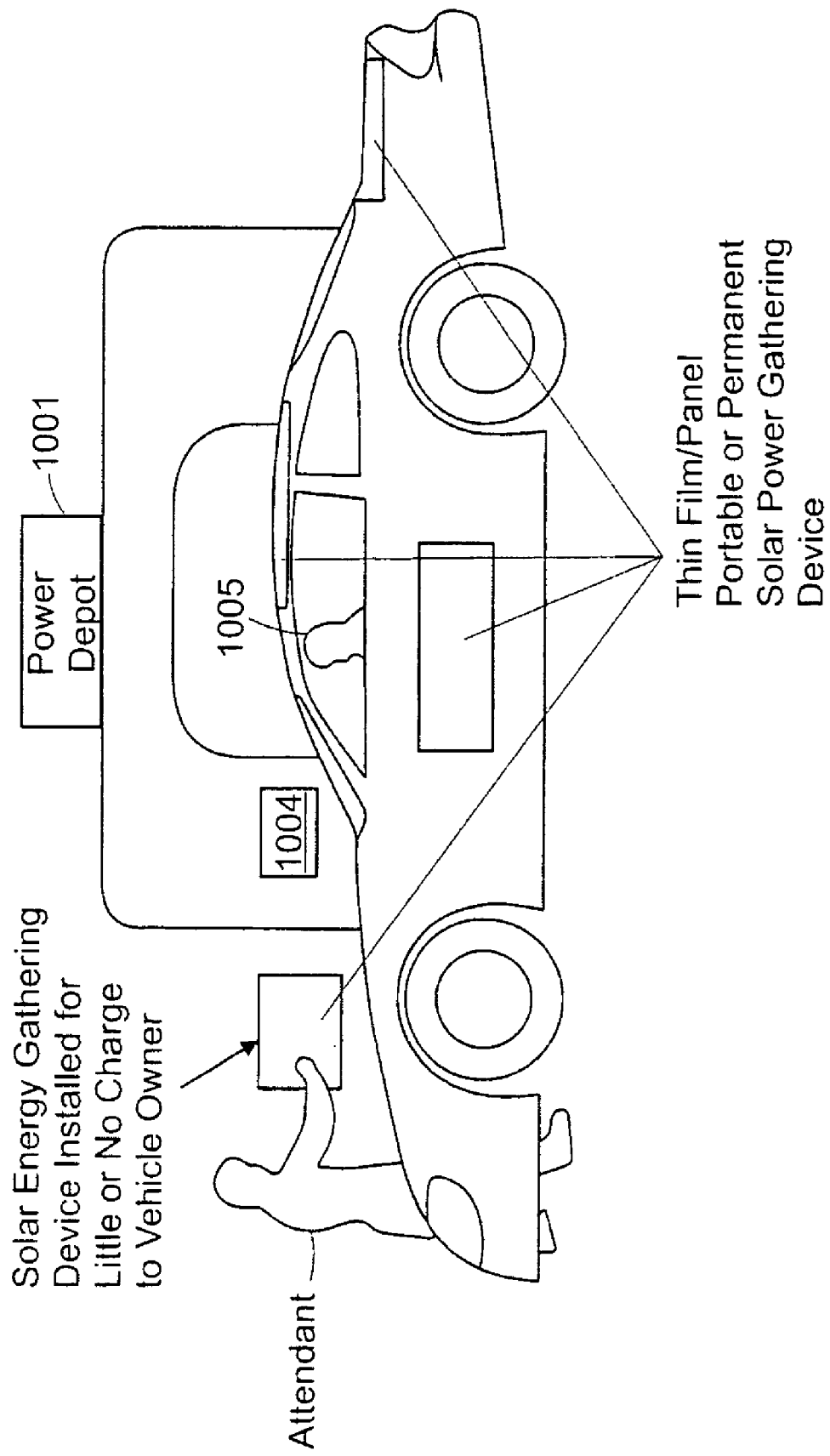
FIG. 23 illustrates that no cash transaction occurs at the time of installation at the power depot service station area.

FIG. 23 illustrates that no cash transaction occurs at the time of installation at the power depot service station area (Item 1000), with the exception of a credit card or other security registration/deposit system (Item 1004). By charging the vehicle owner (Item 1005) nothing, very little and possibly securing a deposit against the value of the equipment the vehicle owner (Item 1005) gains incentive to create value for himself by participating in the gathering of clean energy with no financial investment needed.

Figure 24:
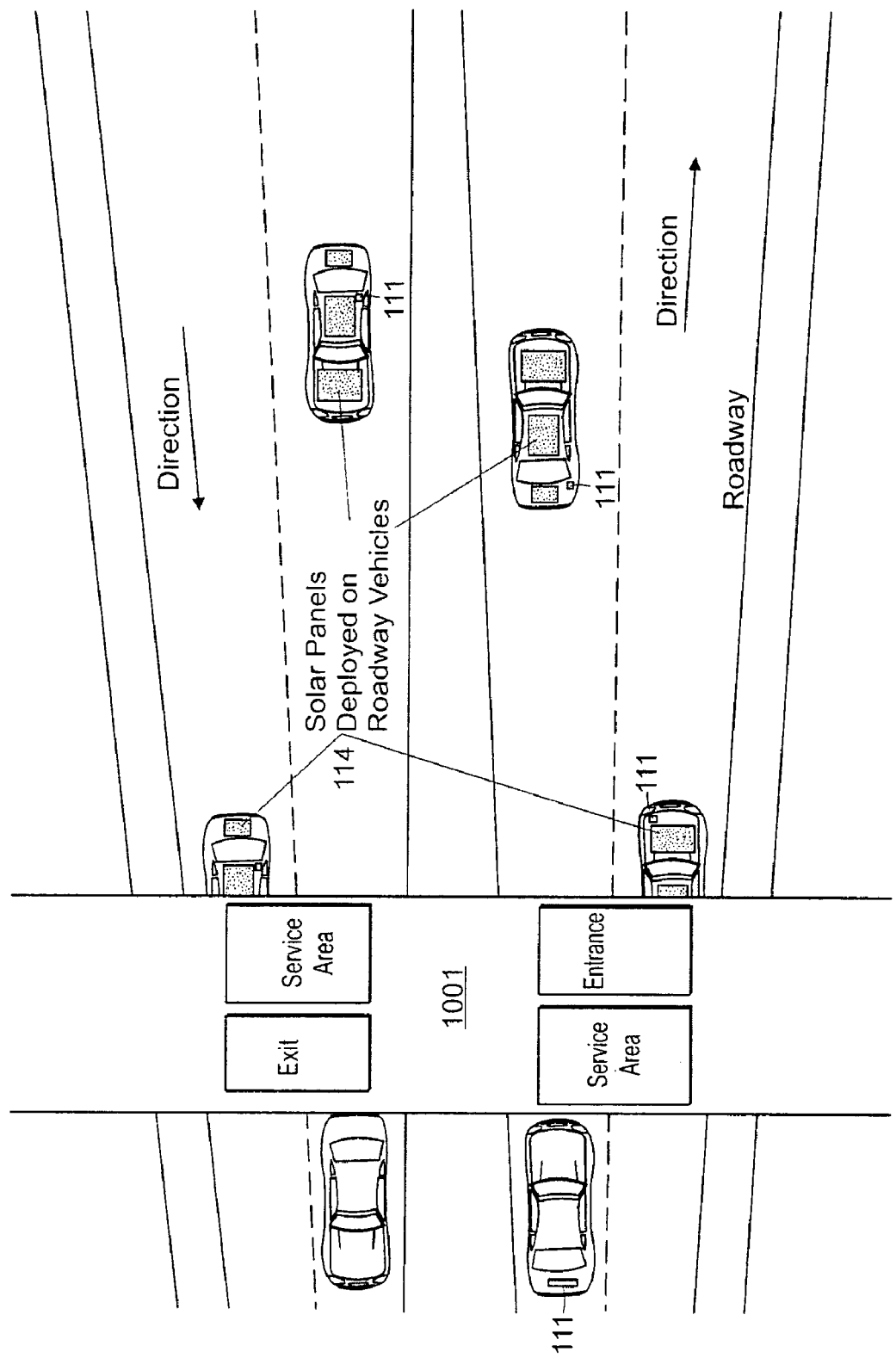
FIG. 24 illustrates an overhead view of vehicles with solar installation sheets traveling down the roadway.

FIG. 24 illustrates an overhead view of vehicles with solar installation sheets (Item 114) traveling down a road along with the integration of a service area (item 1001) in a familiar toll plaza along the roadway route. Similar to the wind installation system, the solar installation sheets may be coupled to a battery outside or inside the vehicle (Item 111).

Figure 25:
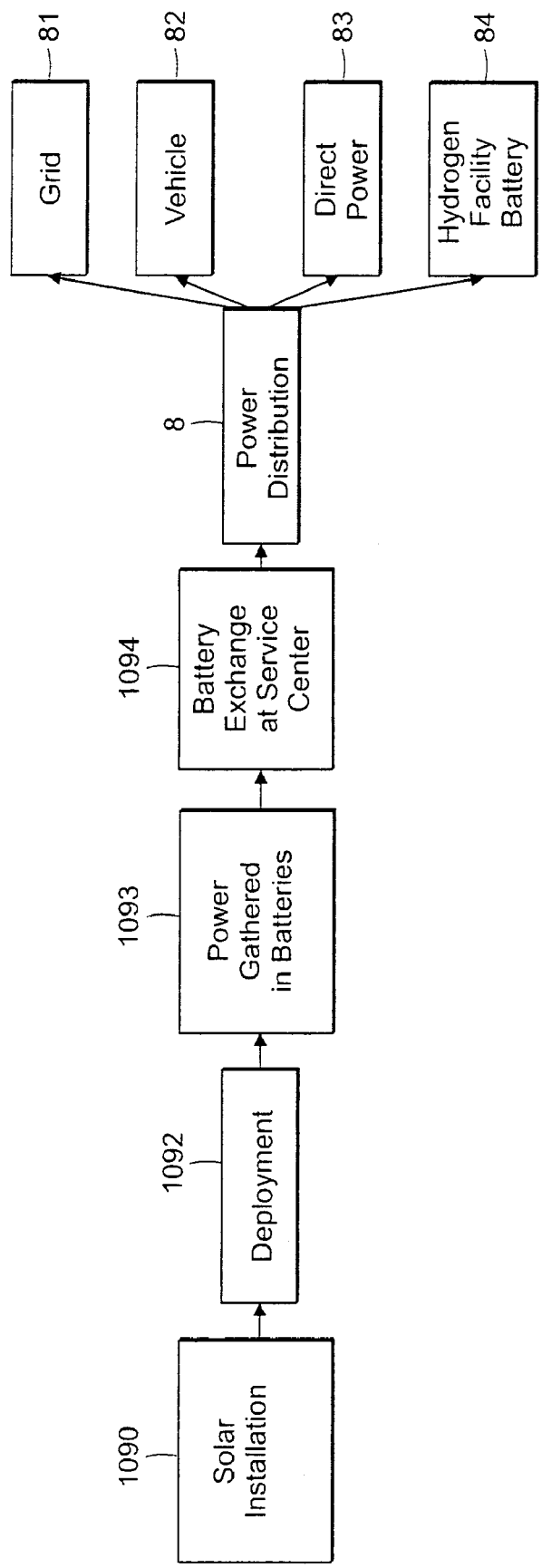
FIG. 25 illustrates a flow chart where the solar installation sheets and battery configuration are installed in the vehicle.

FIG. 25 illustrates a flow chart where one or more solar installation sheets and battery configuration are installed in a vehicle (Item 1095). The vehicle is deployed, registered within the system with the installation sheets installed (Item 1092) and activated to capture and store energy in the batteries (Item 1093). Power is then gathered in the batteries and stored as electricity (Item 1094) for power distribution (Item 8). The batteries then feed the instant vehicle with power that is metered or the batteries are exchanged at a service center (1094) and the power gathered in the batteries is used feed power into the grid (Item 81) after being sent through an inverter which brings the power into the proper technical condition for the grid according to specifications provided by the grid operator, or to power another vehicle (Item 82), direct power a business or home (Item 83) or to have the energy stored in a reserve power form such as batteries or via a manufacture and storage of hydrogen by using the extra power to fuel the electrolysis of water to create hydrogen (Item 84).

Figure 26:
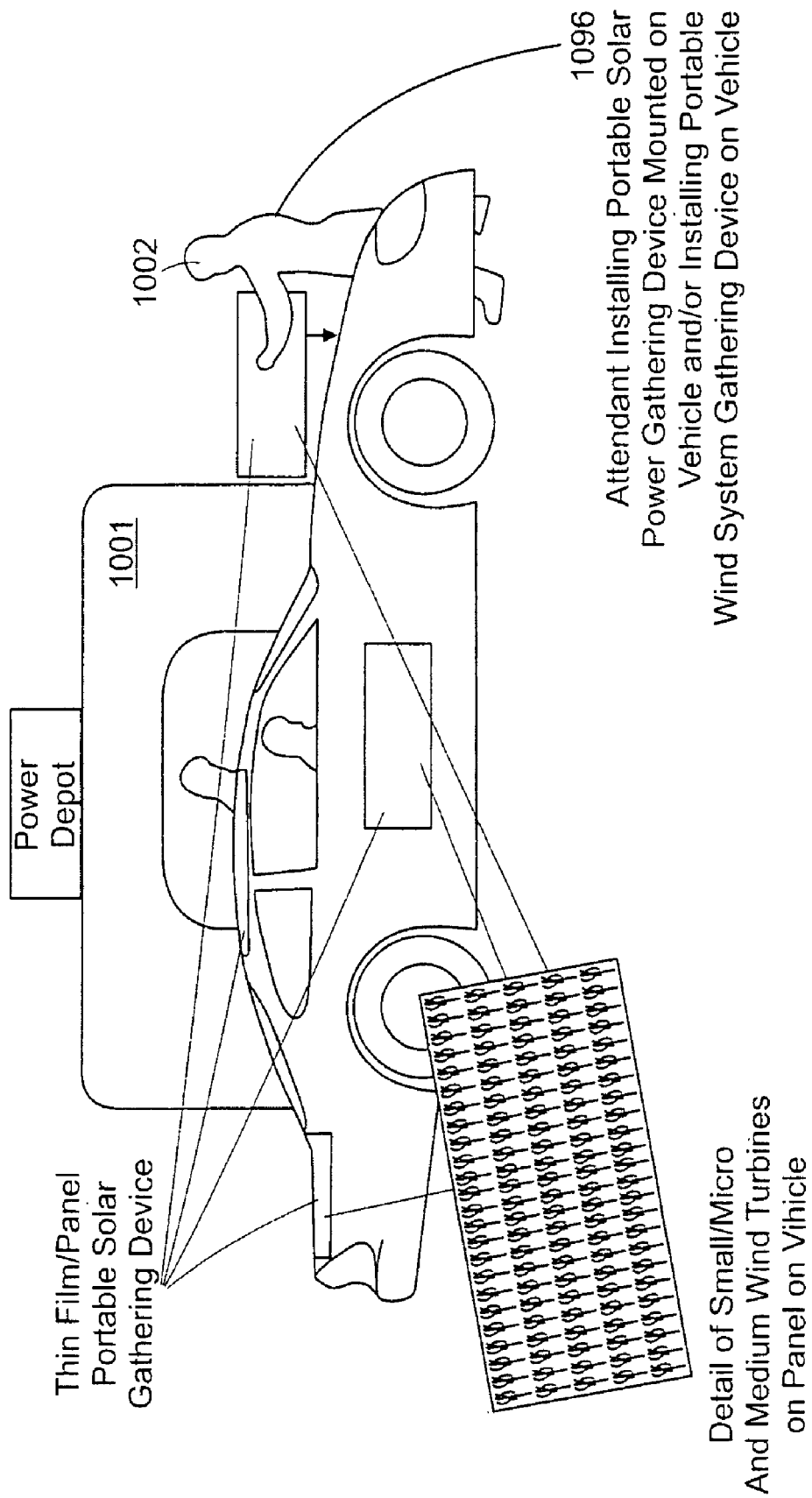
FIG. 26 illustrates portable solar and wind installation sheets being used in tandem separately and as unified, single sheets gathering both wind and solar energy simultaneously.

FIG. 26 illustrates portable solar and wind installation sheets being installed (1096) in tandem separately and as unified, single sheets gathering both wind and solar energy simultaneously. The installation, acquisition and customer service station centers (Item 1001) function identically as in the previous Figures. The surfaces of the turbine sheets including the turbines themselves may be sprayed with spray on power cells to maximize the potential of simultaneous solar and wind energy gathering from the same installation panel. Alternatively the solar material may be non-silicon film or standard silicon panelized structure. Wiring on the installation sheets may be dual in nature with solar energy going into specific batteries and wind energy into its own batteries or the energy may be put into the same batteries. Solar energy may also be used to power the wind turbines, thus creating only wind energy that is being used to charge the battery or battery array.

Figure 27:
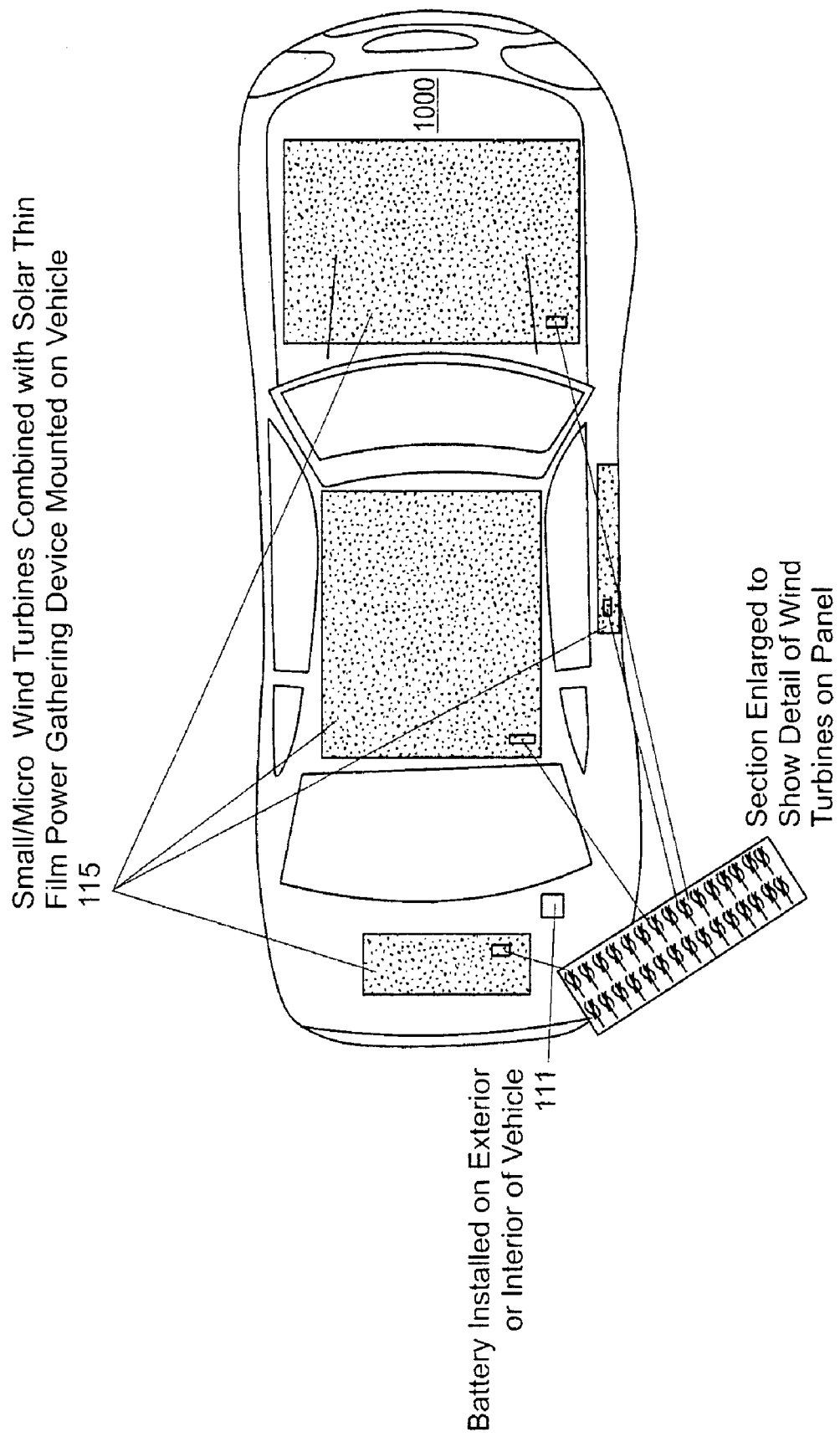
FIG. 27 illustrates an overhead view of a vehicle installed with the solar and wind integrated panels.

FIG. 27 illustrates an overhead view of a vehicle installed with the solar and wind integrated panels (Item 115). These panels may incorporate both solar and wind gathering systems in a single installation sheet or separately with wind alone installation sheets and solar alone installation sheets functioning and simultaneously deployed on a vehicle (Item 1000) participating in the system. The composite illustration of the installation sheet once again demonstrates tiny helix designed turbines, too small to be legibly seen without composite form drawing deployed on the vehicle with attendant solar gathering materials incorporated within the surface of the same installation sheets. Energy gathered by the sheets is transferred to the battery array (Item 111).

Figure 28:
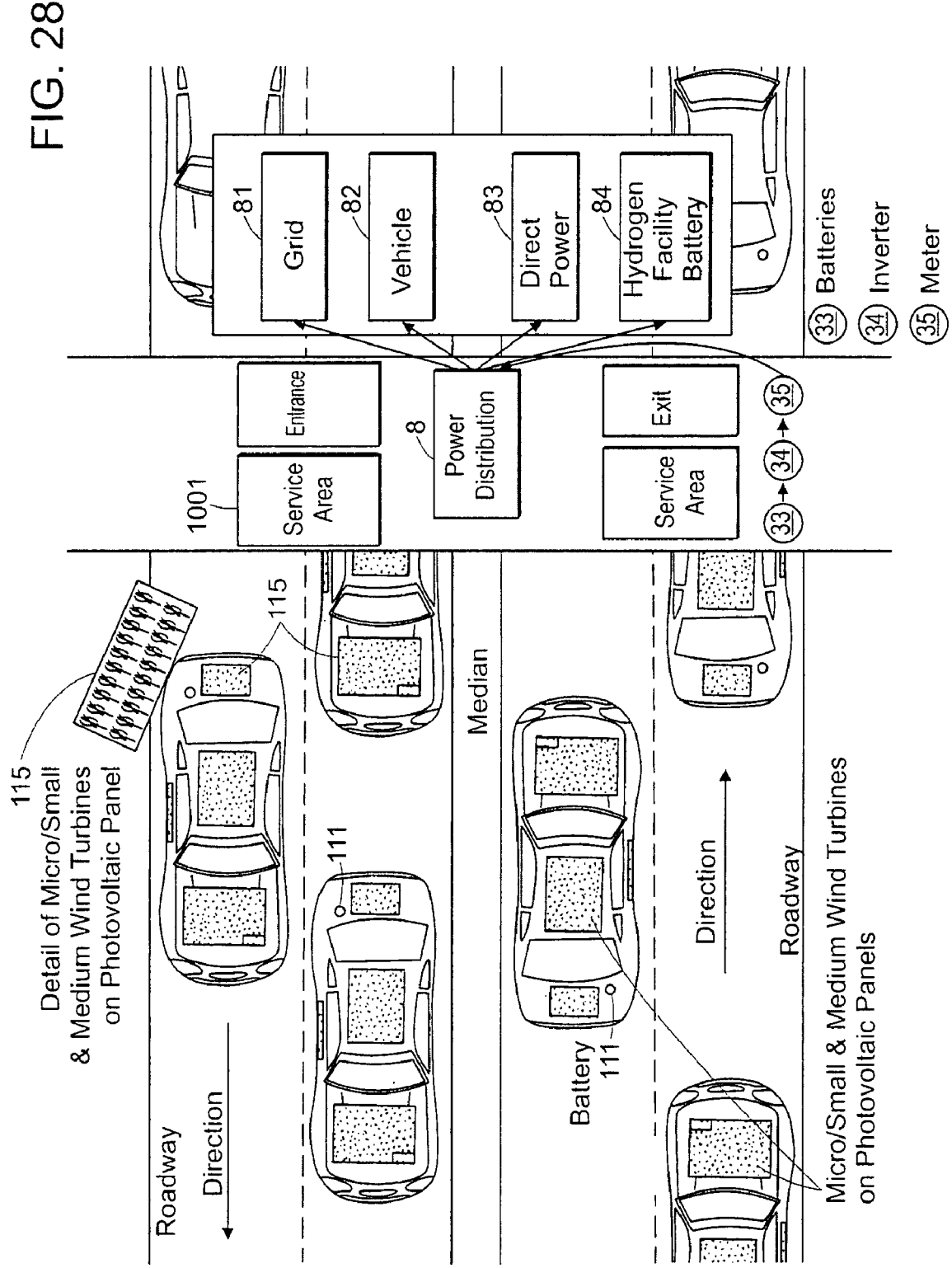
FIG. 28 illustrates an overhead view of vehicles deployed with solar and wind installation sheets moving in and out of service center areas for the installation, registration, updating and maintenance of said systems.

FIG. 28 illustrates an overhead view vehicles deployed with solar and wind installation sheets (Item 115) moving in and out of service center areas (Item 1001) for the installation, registration, updating and maintenance of the solar and wind energy generating devices. System installation sheets are displayed deployed on vehicles and composite diagrams give a feel for the large amount of tiny wind turbines that can be deployed on a single vehicle installation sheet. As charged batteries (Item 111) are collected at the service center (Item 1001) power is distributed using inverters and meters to store, condition, transmit and track power distributed from the system for direct use in vehicles (Item 82), for use in the utility grid (Item 81), for use in 3rd party vehicles (Item 82), which may pick up charged batteries as they pass through the service center, for direct powering of homes and businesses (Item 83) and for storage as reserve battery power or utilizing the battery energy to conduct the electrolysis of hydrogen for use in hydrogen powered systems as well as for storage of reserve energy (Item 84).

Figure 29:
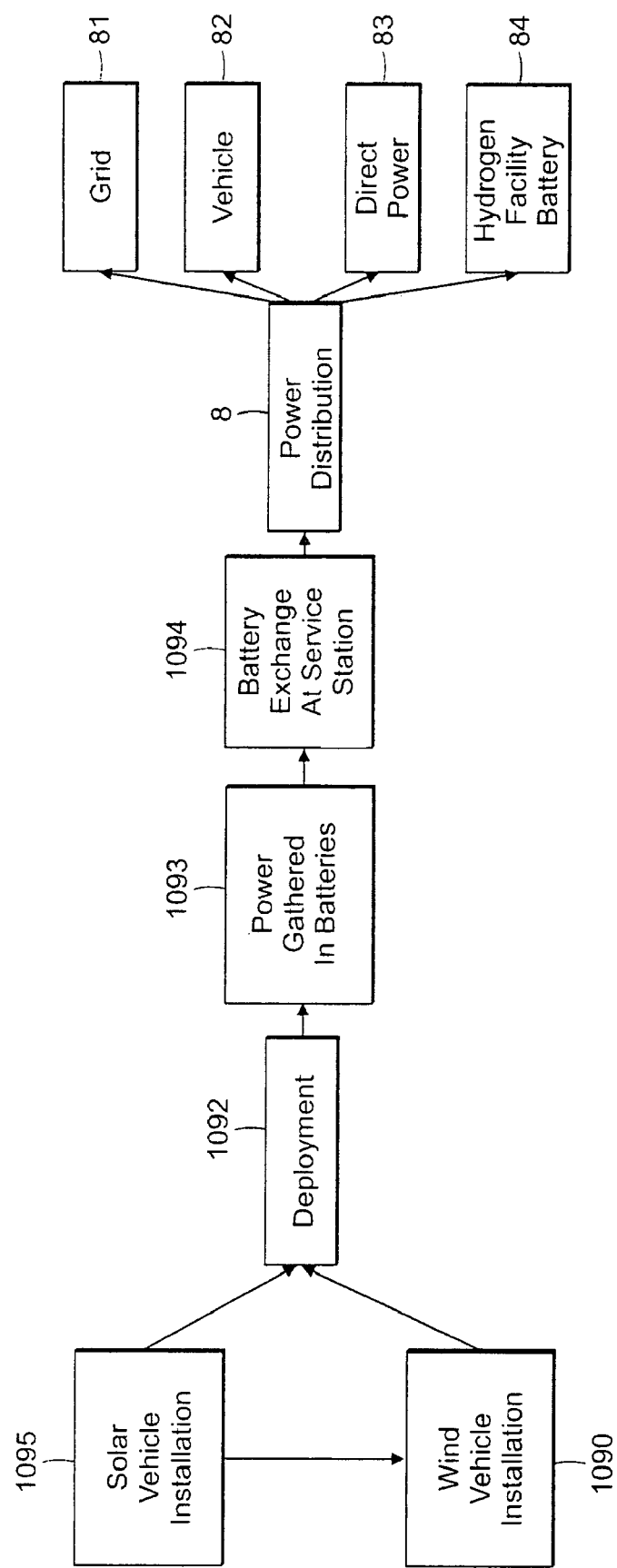
FIG. 29 illustrates a flow chart that combines the flow of energy generated by both wind and solar installation sheets.

FIG. 29 illustrates a flow chart that combines the flow of energy generated by both wind (Item 1090) and solar installation sheets (Item 1095) into the portable vehicle system (Item 1092), or solar energy may be used to power the wind energy installation and create a uniform, wind energy only, power source flowing into the battery or battery array (Item 1093). The vehicle is deployed (Item 1092), registered within the system with the installation sheets installed and activated to capture and store energy in the batteries (Item 1093). Power is then gathered in the batteries and stored as electricity. The batteries then feed the instant vehicle with power that is metered or the batteries are exchanged at a service center (Item 1094) and the power gathered in the batteries is distributed (Item 8) to be used feed power into the grid (Item 81) after being sent through an inverter which brings the power into the proper technical condition for the grid according to specifications provided by the grid operator, or to power another vehicle (Item 82), direct power a business or home (Item 83) or to have the energy stored in a reserve power form such as batteries or via a manufacture and storage of hydrogen by using the extra battery power to fuel the electrolysis of water to create hydrogen, which may be stored compressed and utilized for hydrogen engines or converted back to electricity using hydrogen fuel cell technology and distributed to third parties at times when peak energy needs create premium pricing demand (Item 84).

Figure 30:
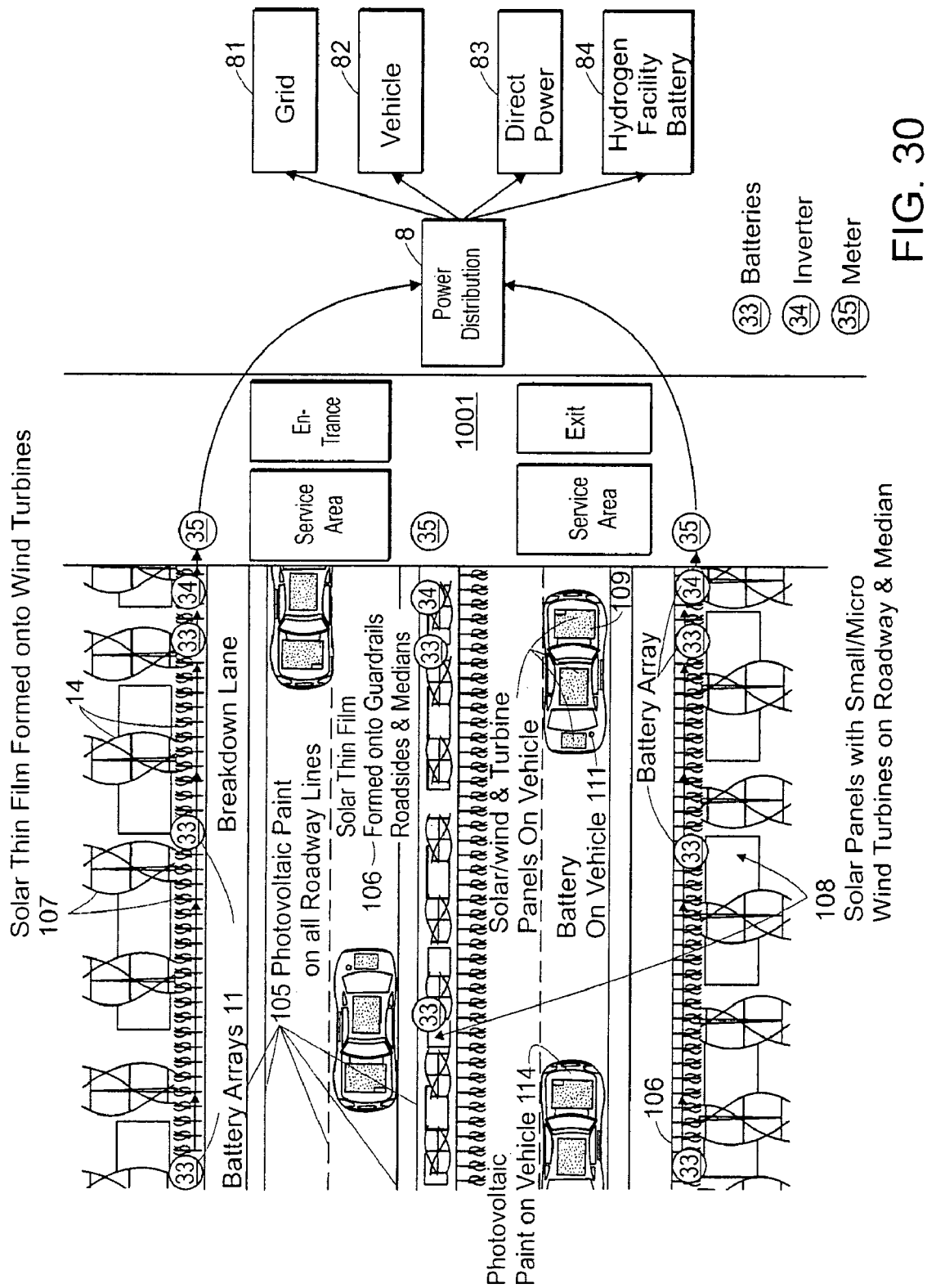
FIG. 30 illustrates a full integration of the fixed & portable roadway integrated wind and solar energy gathering roadway system.

FIG. 30 illustrates an integration of the fixed & portable roadway integrated wind and solar energy gathering roadway system. Ground and vehicle-based wind energy generating devices of different type along with ground and vehicle-based solar energy generating devices of different type are shown schematically (e.g., solar thin film formed on wind turbine generators of different size (Item 107), photovoltaic paint on roadway lines (Item 105), solar thin film formed onto roadside and median guardrails (Item 106), photovoltaic paint on vehicles (Item 114), solar/wind turbine generator panels/installation sheets on vehicles (Item 109), solar panels with small/micro wind turbines on roadway median and edge of breakdown lane (Item 108). Power gathered these various energy generating devices is transferred ground and vehicle based energy storage systems, for example, ground and vehicle-based batteries and battery arrays (Items 33 and 111) for storing. The batteries then feed the system with power that is metered (Item 35) or the batteries are exchanged at a service center (Item 1001) and the power gathered in the batteries (Item 111) is used feed power, either at a service center (Item 1001) or along a convenient roadway location into a utility grid (Item 81) after being sent through an inverter (Item 35) which brings the power into the proper technical condition for the grid according to specifications provided by the grid operator, or to power another vehicle (Item 82), direct power a business or home (Item 83) or to have the energy stored in a reserve power form such as batteries or via a manufacture and storage of hydrogen by using the extra battery power to fuel the electrolysis of water to create hydrogen, which may be stored compressed and utilized for hydrogen engines or converted back to electricity using hydrogen fuel cell technology and distributed to third parties at times when peak energy needs create premium pricing demand (Item 84). This integrated 4 pronged approach creates a comprehensive clean energy power gathering system that may be deployed throughout entire roadway and highway systems converting the massive available space and energy available to conversion into a stable clean energy source with efficient geographical infrastructure for distribution.

Figure 31:
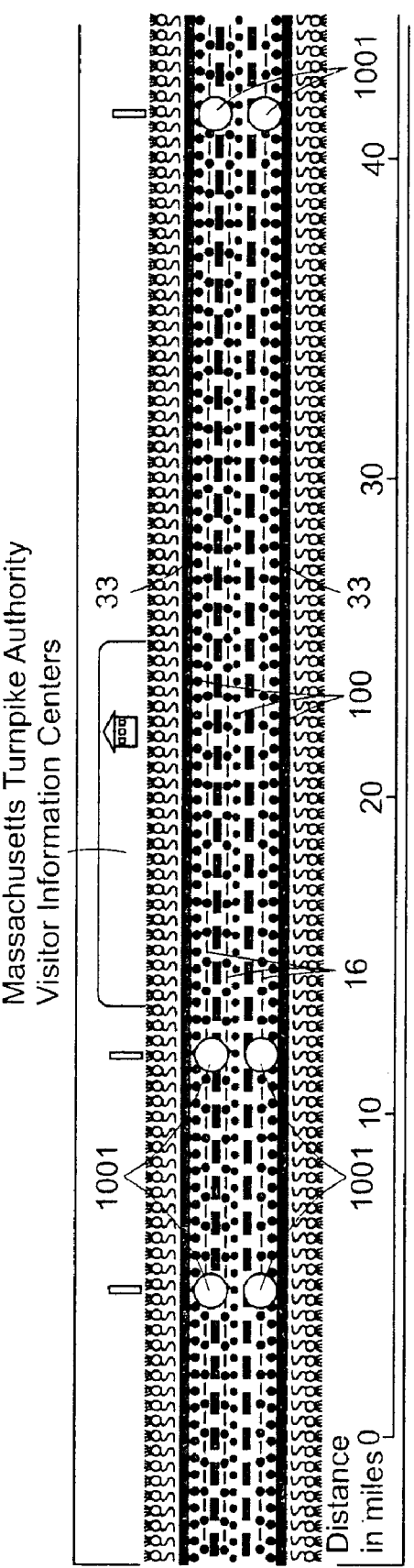
FIG. 31 illustrates the implementation of a roadway system across the entirety of a major roadway for the example of the Massachusetts Turnpike.
Figure 32:
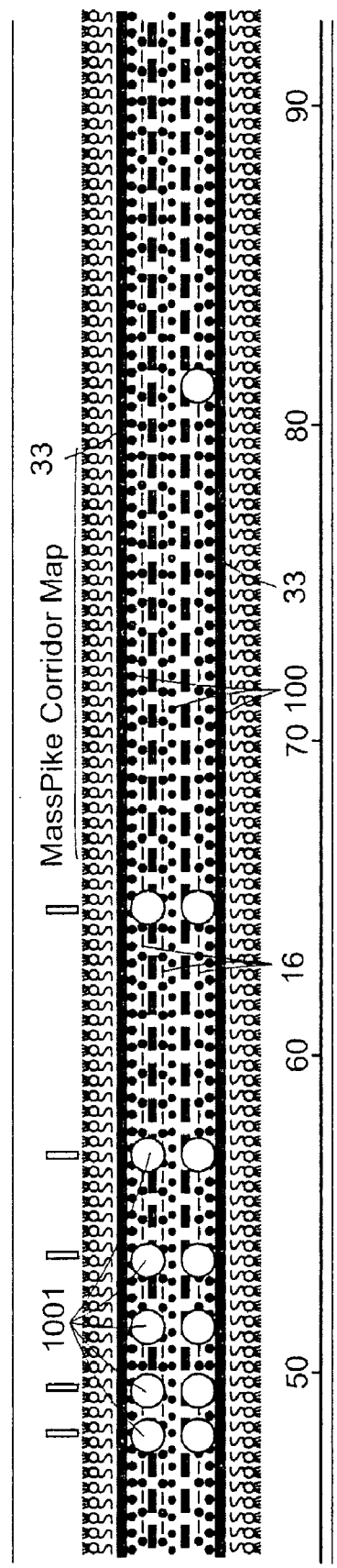
FIG. 32 illustrates the implementation of a roadway system across the entirety of a major roadway for the example of the Massachusetts Turnpike.
Figure 33:
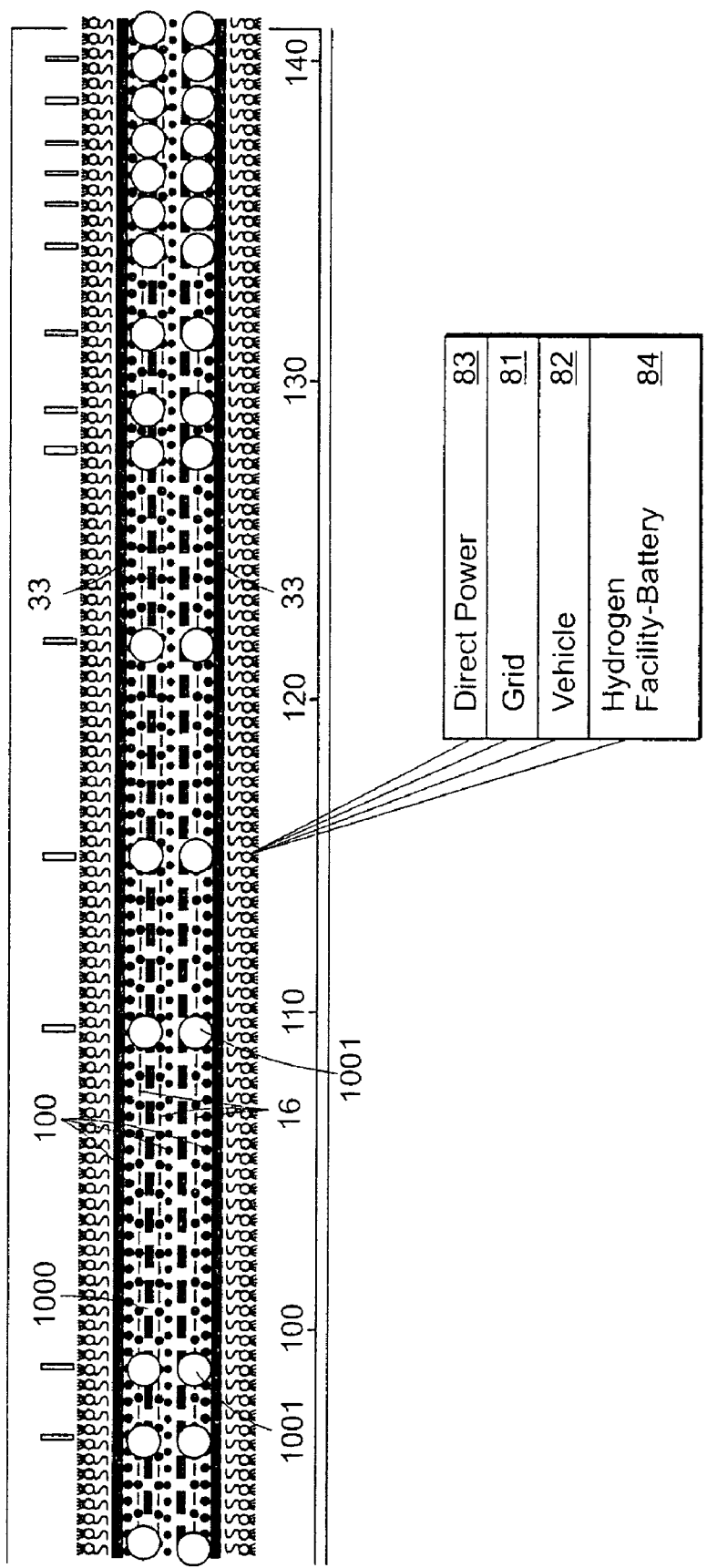
FIG. 33 illustrates the implementation of a roadway system across the entirety of a major roadway for the example of the Massachusetts Turnpike.
Figure 34:
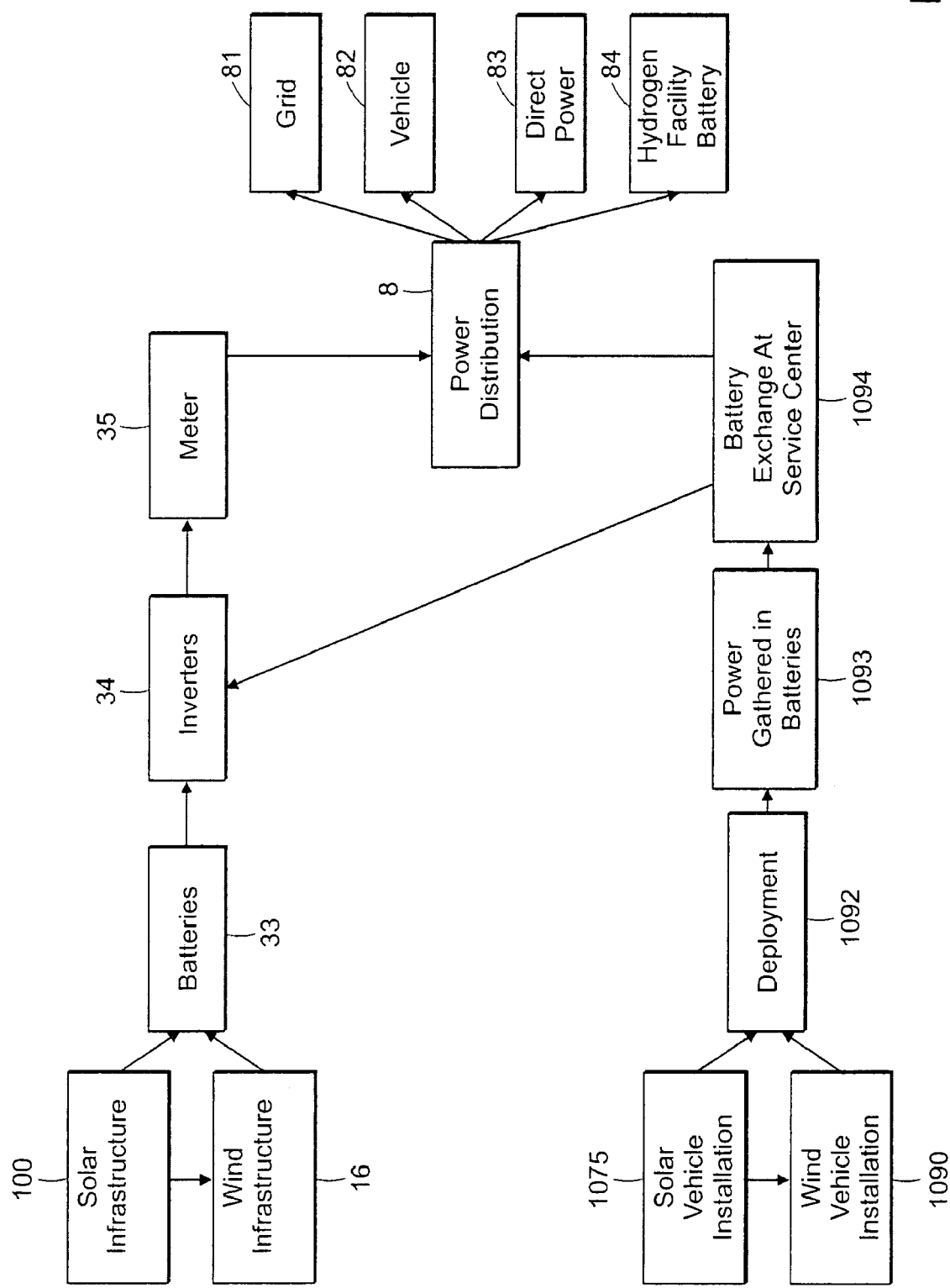
FIG. 34 illustrates the flow chart of the full integration of the wind and solar energy gathering roadway system.

FIGS. 31 to 33 illustrate the implementation of the system across the entirety of a major roadway, herein being the Massachusetts Turnpike. In each of these Figures, a service area is shown as dot (Item 1001). Battery arrays which although represented in the Figure in a contiguous manner due to spacing issues are actually (i.e., in the roadway system) spaced apart in implementation and are represented as solid black areas (Item 33). Roadway fixed solar and wind systems, in which the technologies may be utilized within the same implementation sheet, panel or turbine or utilized as separate technologies with wind turbine generators shown as dash-dotted areas (Item 16) and solar arrays shown as dotted areas (Item 100) and roadway lanes shown as dashed areas. FIGS. 31 and 32 show the first about 90 miles of the Massachusetts Turnpike. FIG. 33 represents the distribution of gathered power fed through the inverters and registered in meters to the various end distribution points including direct powering of businesses (item 83), powering being sold back to the grid system (Item 80), power being utilized by vehicles (Item 82) or stored as excess generated energy in the form of auxiliary battery arrays or via the conversion to hydrogen by electrolysis and the subsequent storage of compressed hydrogen in tanks to be sold back to the utility at times of peak need or value (Item 84). Vehicles outfitted with portable solar and wind gathering systems contemplated by this system would travel along this roadway and utilize the service areas and toll booths to install, maintain and in some cases receive credit for energy gathered by the system installed upon the vehicle (Item 1000).

FIG. 32 illustrates the flow chart of a full integration of the wind and solar energy gathering roadway system. This flow chart features both solar and wind gathering fixed and portable systems (Items 100, 16, 1095 and 1090) integrated into the flow chart with the portable vehicle system flow of energy generated by both wind and solar installation sheets into the portable vehicle system, or solar energy may be used to power the wind energy installation and create a uniform, wind energy only, power source flowing into the battery or battery array (Items 34 and 1093). The one or more vehicles are deployed (Item 1092), registered within the system with the installation sheets installed and activated to capture and store energy in the batteries (Item 1093). Power is then gathered in the batteries and stored as electricity. The batteries then feed the instant vehicle with power that is metered or the batteries (Item 1093) are exchanged at a service center (Item 1094) and the power gathered in the batteries is used to feed power into the grid after being sent through an inverter which brings the power into the proper technical condition for the grid (Item 81) according to specifications provided by the grid operator, or to power another vehicle (Item 9), direct power a business or home (Item 83) or to have the energy stored in a reserve power form such as batteries or via a manufacture and storage of hydrogen by using the extra battery power to fuel the electrolysis of water to create hydrogen, which may be stored compressed and utilized for hydrogen engines or converted back to electricity using hydrogen fuel cell technology and distributed to third parties at times when peak energy needs create premium pricing demand (Item 84). The fixed wind and solar roadway systems illustrates a flow chart where both wind and solar energy gathering devices as described in FIG. 14 transfer their energy to batteries (Item 33) then to inverters (Item 34) then registering the amount of energy via the meters (Item 35) before being distributed to the utility grid (Item 81), vehicles (Item 82), direct distribution of homes (Item 83) and businesses or utilized as stored energy via large battery arrays or via conversion to hydrogen to be held in compressed tanks via the creation of hydrogen via electrolysis (Item 84).

While this invention has been particularly shown and described with references to example embodiments thereof, it will be understood by those skilled in the art that various changes in form and details may be made therein without departing from the scope of the invention encompassed by the appended claims.

What is claimed is:

1. A portable wind energy gathering system to gather wind energy and deposit wind generated energy for system credit, the system comprising:
    a wind energy gathering device to gather wind energy and generate wind generated energy;
    a energy storage system, electrically coupled to the wind energy gathering device, to store wind generated energy;
    means for depositing the stored wind generated energy for system credit; and
    a configuration of any one or combination of the wind energy gathering device, the energy storage system, and the means for depositing the stored wind generated energy for system credit, the configuration adapted to at least be movable from a first location to a second location.

2. The portable system of claim 1 wherein the configuration is provided to a participant of the portable wind energy gathering system at substantially no cost.

3. The portable system of claim 1 wherein the configuration is adapted to be installed and removed by a participant of the portable wind energy gathering system with no technical skill or training.

4. The portable system of claim 1 wherein the configuration is adapted to be installed and removed by a participant of the portable wind energy gathering system with common tools or no tools.

5. The portable system of claim 1 wherein the configuration is dimensioned to be movable from the first location to the second location by a participant of typical build and strength.

6. The portable system of claim 1 wherein the configuration is constructed to withstand being moved from the first location to the second location.

7. The portable system of claim 1 further comprising means for removably affixing the configuration to a vehicle participating in the portable wind energy gathering system.

8. The portable system of claim 1 wherein the wind energy gathering device is at least one small helix wind turbine.

9. The portable system of claim 8 wherein the at least one small helix wind turbine is secured to a small helix wind turbine installation sheet.

10. The portable system of claim 1 wherein the wind energy gathering device is adapted to gather wind energy created by any combination of: atmospheric wind, air movement caused by other vehicles or objects, and air movement caused by a moving vehicle to which the portable wind energy gathering system is removably affixed.

11. The portable system of claim 1 wherein the wind energy gathering device is adapted to gather wind energy from incident wind striking the wind energy gathering device or some portion of the wind energy gathering device.

12. The portable system of claim 1 wherein the energy storage system is any one or combination of: a dry cell battery, a wet cell battery, a gel cell battery, a fuel cell battery, a thin film battery, and a nanobattery.

13. The portable system of claim 1 wherein the means for depositing the stored wind generated energy for system credit is a first battery adapted to be readily exchanged with a second battery.

14. The portable system of claim 1 wherein the means for depositing the stored wind generated energy is any one or combination of an electrical connector of type: plug, socket and paddle.

15. The portable system of claim 1 further comprising means for distributing deposited wind generated energy.

16. The portable system of claim 15 wherein the means for distributing the deposited wind generated energy is a roadway system electricity grid.

17. The portable system of claim 1 further comprising an inverter to power condition the wind generated energy.

18. A method for gathering wind energy and depositing wind generated energy for system credit, the method comprising:
    gathering wind energy and generating wind generated energy using a wind energy gathering device;
    storing the generated wind generated energy in an energy storage system; and
    depositing the stored wind generated energy for system credit in a portable wind energy gathering system.

19. The method of claim 18 wherein gathering wind energy includes gathering any combination of: atmospheric wind, air movement caused by other vehicles or objects, and air movement caused by a moving vehicle to which the wind energy gathering device is removably affixed.

20. The method of claim 18 wherein gathering wind energy includes gathering wind energy from incident wind striking the wind energy gathering device or some portion of the wind energy gathering device.

21. The method of claim 18 wherein depositing the stored wind generated energy for system credit includes exchanging a first battery for a second battery.

22. The method of claim 18 wherein depositing the stored wind generated energy for system credit includes crediting a participant according to an amount of stored wind generated energy deposited.

23. The method of claim 22 wherein crediting the participant includes crediting the participant with any type of a toll fee credit, cash payment, credit at a participating business, and combinations thereof.

24. The method of claim 18 wherein depositing the stored wind generated energy for system credit includes crediting a participant according to an amount of stored wind generated energy used to power elements of a participating vehicle.

25. The method of claim 18 further comprising configuring any one or combination of the wind energy gathering device, the energy storage system, and means for depositing the stored wind generated energy for system credit into a configuration, the configuration adapted to at least be movable from a first location to a second location.

26. The method of claim 25 wherein configuring includes adapting the configuration to be installed and removed by a participant of the portable wind energy gathering system with no technical skill or training.

27. The method of claim 25 wherein configuring includes adapting the configuration to be installed and removed by a participant of the portable wind energy gathering system with common tools or no tools.

28. The method of claim 25 wherein configuring includes dimensioning the configuration to be moved from the first location to the second location by a participant of typical build and strength.

29. The method of claim 25 wherein configuring includes constructing the configuration to withstand being moved from the first location to the second location.

30. A portable apparatus for gathering wind energy and depositing wind generated energy for system credit, the apparatus comprising:
    means for gathering wind energy and generating wind generated energy;
    means for storing the generated wind generated energy; and means for depositing the stored wind generated energy for system credit in a portable wind energy gathering system.

31. The portable apparatus of claim 30 further comprising means for configuring any one or combination of the means for gathering wind energy and generating wind generated energy, the means for storing the generated wind generated energy, and the means for depositing the stored wind generated energy for system credit, the means for configuring adapted to be at least movable from a first location to a second location.

* * * * *